United States Patent [19]
Pickett

[11] Patent Number: 5,184,317
[45] Date of Patent: Feb. 2, 1993

[54] METHOD AND APPARATUS FOR GENERATING MATHEMATICAL FUNCTIONS

[76] Inventor: Lester C. Pickett, 178 Centre, Suite 21, Mountain View, Calif. 94041

[21] Appl. No.: 623,238

[22] Filed: Jan. 30, 1991

Related U.S. Application Data

[63] Continuation of Ser. No. 366,376, Jun. 14, 1989, abandoned.

[51] Int. Cl.$^5$ .......................... G06F 15/32; G06F 7/38
[52] U.S. Cl. ..................................... 364/735; 364/718; 364/748.5
[58] Field of Search ....................... 364/735, 718, 748.5, 364/746.2, 723

[56] References Cited

U.S. PATENT DOCUMENTS 5,068,816  11/1991  Noetzel ................................ 364/718

Primary Examiner—Long T. Nguyen
Attorney, Agent, or Firm—Brooks & Kushman

[57] ABSTRACT

A method and apparatus for general-purpose generation of digital mathematical functions in connection with a computer processor enabling computation of such functions as exponential, logarithmic, hyperbolic and trigonometric functions, as well as numerous special-purpose engineering functions. The invention employs compact look-up tables accessed by look-up techniques and value interpolation to determine values not found in the tables. In specific embodiments, specific techniques are employed for table generation and value interpolation to attain results at desired levels of speed, precision, economy, and reliability. Applications include alternatives to conventional hardware multipliers and numerical processors. Individual embodiments may be realized either directly in hardware or in software. Multiple embodiments may be realized as software or hardware function libraries. Coupled multiple embodiments may be realized as general-purpose hardware or software mathematical processors.

35 Claims, 8 Drawing Sheets

METHOD AND APPARATUS FOR GENERATING MATHEMATICAL FUNCTIONS

This is a continuation of copending application(s) Ser. No. 0/366,376 filed on Jun. 14, 1989, now abandoned.

REFERENCE TO A RELATED APPLICATION

Reference is made to the patent application Ser. No. 07/366,080 filed Jun. 14, 1989 concurrently with the present invention in the name of the present inventor and entitled "Method and Apparatus for Exponential/-Logarithmic Computation." The concurrent application is now abandoned. It addresses the generation of fixed-point functions of generally wide range possessing derivatives of generally unrestricted magnitude with the generated functions corresponding to an implementation of general-purpose floating-point operations and functions. The present invention addresses the generation of restricted-range fixed-point mathematical functions of restricted-range arguments with the functions possessing derivatives of restricted magnitude.

BACKGROUND OF THE INVENTION

A portion of the disclosure of this patent document contains material to which a claim of copyright protection is made. The owner has no objection to the facsimile reproduction of the patent document or the patent disclosure, at it appears in the Patent and Trademark Office patent file or records, but reserves all other rights whatsoever.

The present invention is related to numerical processing and more particularly to a method and computer-based apparatus involving the use of a new fundamental architecture using look-up tables for particularly efficient generation of general-purpose mathematical transformations (i.e., mappings) of numerical data. In particular, highly efficient general-purpose exponential and logarithmic generators are provided.

Prior art general-purpose logarithmic operations, compared with additions and subtractions and multiplications, have been inefficient and expensive—so much so that the inefficiency and expense are widely regarded as inevitable penalties on the logarithmic operation itself. For example, a commercial conventional numerical processor might execute logarithmic operations ten to twenty times slower than even its comparatively expensive multiply operation.

The present invention targets problems which have been thought unsolvable, problems which have not been recognized as problems, and problems which are major obstacles to practical implementation of general function generators. Major problems not recognized as such in the prior art include areas of analysis, notation, and terminology associated with such commonly used functions as the elementary exponentials and logarithms. These areas need to be extended in a number of distinctly fundamental directions.

DESCRIPTION OF THE PRIOR ART

Function Generation by Polynomial Approximation

Polynomial approximation forms, and particularly minimax polynomials, have been used most widely for generating fixed-point functions or floating-point functions of restricted range. However, such polynomial function generators usually require many multiplication operations and, therefore, cannot be as fast as a basic arithmetic operation. Two exemplary references are "Near-Minimax Polynomial Approximations and Partitioning of Intervals," by W. Fraser and J. F. Hart, in the *Communication of the ACM*, August, 1964, 486–489 and "Floating Point Algorithm Design," in *Computer Design*, June, 1987, 107–114 by R. L. Cassola.

Function Generation by Direct Table Look-up

Direct table look-up is one technique for rapidly generating logical or mathematical functions. This technique has generally required the least-possible execution time when generating fixed-point numerical functions. However, direct table look-up can require massive tables even for comparatively minor levels of precision.

A completely general radix-r m-digit-wide logical or mathematical function of an n-digit-wide radix-r argument requires $r^n$ table entries of m digits per entry for a total of $mr^n$ digits of table. For m=n this is $nr^n$ which grows to astronomical proportions long before reaching the levels of precision needed for general-purpose computation. This well-known extreme growth rate of direct-look-up tables as a function of the n digits of precision is clearly shown for r=2 by the following bit-width:byte-size pairs: 8-bits:256-bytes; 16-bits:131,072-bytes; 24-bits:44,040,192-bytes; 32-bits:17,179,869,184-bytes.

The steep growth exhibited here is but an absolute upper limit which is always applicable because absolutely all possible combinations of such inputs and outputs for every such particular function can be specified completely in a table of such size, even when no special properties of the function have been identified. Thus there can be no n-digit function of an n-digit argument demanding more than the indicated direct-look-up table size.

A table look-up process is known to be functionally equivalent to a rule-like process implemented with logic gates. An exemplary reference is "Minimal Sets of Distinct Literals for a Logically Passive Function," authored by R. C. De Vries in the *Journal of the Association for Computing Machinery*, 431–443, July, 1971. For example, when a major portion of a table contains the same value, then that portion of the table may be replaced by comparatively simple logical operations. Hence the possibility remains that for particular functions the table requirements may well be but a tiny fraction of the upper limits given above.

Therefore, when the tables for direct table look-up are too large and expensive, other methods are needed to obtain the desired results. In particular, indirect table look-up techniques may be used, i.e., employing any kind of operation which can be construed to be usefully available together with some form of abbreviated look-up. [Such an operation may possibly include yet other look-ups.] In particular, interpolation of comparatively sparse table entries permits a drastic reduction in the number of required table entries when the generation of fixed-point approximations of differentiable functions is desired.

Attempts have been made to develop table look-up schemes applicable to generating mathematical functions which are not limited by the large function table requirements of direct table look-up techniques. One such technique that is limited to generating particular trigonometric functions is described in the U.S. Pat. No. 4,077,063 to Lind.

U.S. Pat. No. 4,078,250 to Windsor et al. purports to describe a technique applicable to the generation of logarithms and exponentials. The disclosure thereof however is, when analyzed, incorrect and inoperative. While the Singer Company, assignee of the U.S. Pat. No. 4,078,250, may well have attempted to make an operative form of such a system, no report thereof was found in a search of the technical literature by the present inventor.

Other function generators are known. Exemplary references of logarithmic and/or exponential function generation are as follows: U.S. Pat. No. 3,036,774 to Brinkerhoff, U.S. Pat. No. 3,099,742 to Byrne, U.S. Pat. No. 3,194,951 to Schaefer, U.S. Pat. No. 3,402,285 to Wang, U.S. Pat. No. 3,436,533 to Moore et al., U.S. Pat. No. 4,046,999 to Katsuoka et al., U.S. Pat. No. 4,062,014 to Rothgordt et al., and U.S. Pat. No. 4,158,889 to Monden.

Exponential function generation employing vectorized floating-point multiplications in the interpolation of table look-up values is known. An exemplary reference is "Cyber 205: A Fast Vectorized Exponential Function," in *Supercomputer* 13, May, 1986.

Generation of other functions is known, e.g., an exemplary reference of arctangent generation is U.S. Pat. No. 4,164,022 to Rattlingourd et al.

During the period from about January to March 1979 the inventor herein contracted with the AiResearch Manufacturing Company of the Garrett Corporation (now the AiResearch Los Angeles Division of the Allied-Signal Aerospace Company) of Torrance, Calif. to design and develop software for microprocessor-based controllers of aircraft cabin pressure. In the course of that work, the inventor herein developed and built a system which used mathematical functions which were precursors of the present invention. In particular, the double-byte fractions $\log_2(1+x)$ and $2^x-1$ as functions of a double-byte fraction argument x were generated indirectly from tables. These tables allowed comparatively direct look-up of all 256 double-byte values of each of these double-byte functions as functions of a general single-byte fraction argument.

However, straightforward logarithmic calculation of single-byte interpolating corrections for both functions was used in that system in order to produce the double-byte values of both functions that were not in the tables. In particular, when the least significant byte of the argument was nonzero, the calculation included logarithmizing that nonzero byte value. The standard iterative technique was employed for normalizing this byte value as $2^m(1+g)$ in terms of an iteratively decremented integer value m and a nonnegative fraction byte g derived from iterative left shifting. The byte value g was then used as a look-up index into the table of fractional logarithmic table values to complete the logarithmization. The multiplications and divisions of the calculation were mapped into additions and subtractions, respectively, of logarithms. The resulting single-byte mantissa was used as a look-up index into the table of fractional exponential values. After adding the value one to the looked-up fraction, the antilogarithm (i.e., exponential) was then completed by straightforward iterative denormalization to yield the single-byte correction value.

The operations for normalization and denormalization required not only the 8L+8R=16 bit places of comparatively economical left-right "fixed" or "constant" shifting, but also up to a maximum of 8L+9R=17 bit places of comparatively expensive left-right "variable" shifting which has been determined to be comparatively inefficient in retrospect. At that time the calculation represented the best available solution to the difficult problem of real-time calculation of logarithms and exponentials with both precision and performance adequate for use in high-performance sampled-data control systems based on a microprocessor containing no instruction for direct multiplication. Thus no improvements were suggested or even suspected of being possible. The present invention represents an advance over the inventor's prior unpublished but commercially exploited work. No work is known which suggests the present invention.

SUMMARY OF THE INVENTION

According to the invention a generalized method and apparatus for generation of mathematical functions in connection with a computer processor enabling extremely rapid computation of such functions as the logarithmic, exponential, trigonometric and hyperbolic functions, as well as numerous special-purpose engineering functions. The invention employs compact look-up tables and, in order to determine values not found in the tables, uses value interpolation which, according to the invention, is oriented toward reducing the required range of quantities used in the value interpolation. In particular, the evaluation of logarithmic quantities of minimal range requires zero or minimal left-right digit-place shifting, which provides economy and greatly speeds up the computation of a value interpolation that uses logarithmic quantities.

In specific embodiments, specific techniques are employed for table generation and value interpolation to attain results at desired levels of speed, precision, economy, and reliability. Applications include alternatives to conventional hardware multipliers and numerical processors. Individual embodiments may be realized either directly in hardware or in software. Multiple embodiments may be realized as software or hardware function libraries. Coupled multiple embodiments may be realized as general-purpose hardware or software numerical processors.

The highest speeds of computation are achieved when the invention is implemented directly in dedicated hardware for general-purpose computation as well as for more specialized applications such as signal and image processing requiring particularly high performance. The hardware and its associated operations can, however, be implemented particularly simply. This simplicity permits economical firmware and software implementations of the invention to provide new levels of performance which approach that of existing hardware function generators. Such software and firmware implementations provide qualitatively new levels of combined performance, function, economy, and ease-of-use even on the simpler microprocessors possessing no instruction for direct multiplication.

This invention can be used for numerical computation, mathematical special functions, mathematical function libraries, specialized application functions, logarithmic converters and normalizers, exponential converters and denormalizers, and generally in applications related to fixed-point computation, floating-point computation, real-time sampled-data control, process control, signal processing, signal conditioning, telemetry, engine control, motor control, guidance, navigation, statistical analysis, data reduction, avionics, bionics, nucleonics, radar, sonar, microprocessors, pipelined processors, parallel processors, reduced-instruction-set computers (RISC), and stand-alone processors;

and for lower life-cycle costs: more function, greater performance, greater reliability, easier design and design update, less and simpler hardware, less weight, less space, less power, fewer parts, fewer suppliers, fewer delivery schedules, easier built-in-test (BIT), and more economical repair.

DESCRIPTION OF THE SPECIFIC EMBODIMENTS

Figure 1:
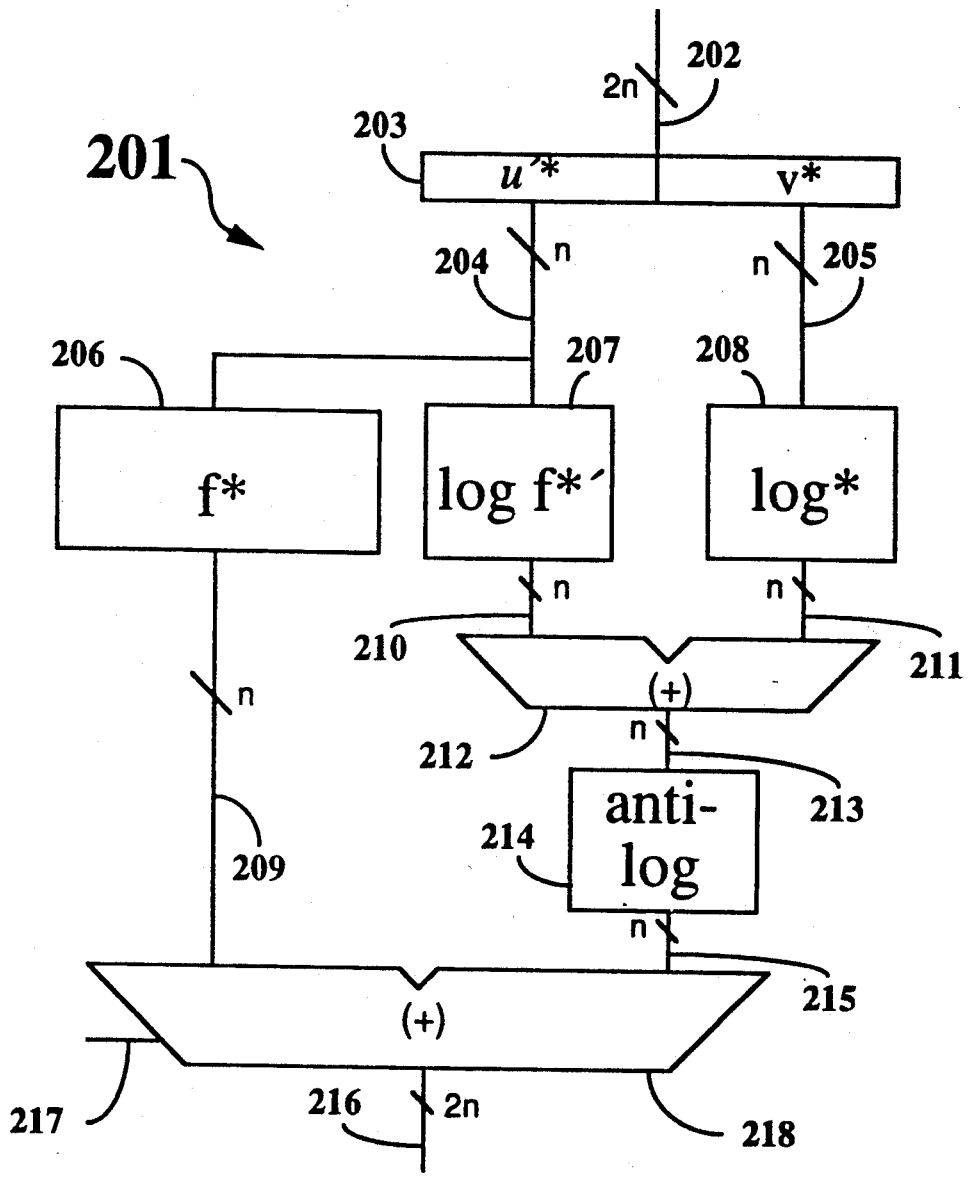
FIG. 1 is a block diagram of a general-purpose function generator employing a compact look-up table and exponential/logarithmic interpolation computation requiring minimal left-right digit-place shifting according to the invention.

In order to assist in understanding the invention, the following definitions and terminology are used.

Conventions, Notation, and Terminology

General Terminology. The terms computer, data processing system, number processing system, and number processor are used interchangeably in the following descriptions. The term "object" refers to any basic system construct such as a look-up table, function generator, look-up-table value interpolator, memory page or segment, or pipe-line stage. Whenever digit, bit, byte, or word positions are described using numerical indices, position zero is the position immediately to the left of the radix point with positive positions further to the left. Negative positions are to the right of the radix point. Thus a shift of $+k$ bit places corresponds to a k-bit-place left shift or a right shift of $-k$ bit places.

For the purposes herein, the computer system's memory is considered to be split into two major portions: core memory and disk memory. The term core memory refers to high-speed memory used by the data processing system for current calculations, i.e., memory to which the computer has comparatively direct access. High-speed memories currently have access times typically ranging from 1 nanosecond to 250 nanoseconds. More generally, high-speed or "core" memory has an access time of no more than 10 times (and typically no more than 3 times) the length of the basic instruction cycle of the computer's central processing unit (CPU). Using current technology, core memory typically includes 1 Megabyte (1 Mbyte) to 1 Gigabyte (1 Gbyte = $10^9$ bytes) of high-speed semiconductor memory, possibly including a mix of very-high-speed cache memory and medium-speed memory. Many of the smaller microprocessors, however, may have only 64 kilobytes (64 kbyte) of memory or but a fraction thereof. The term "core memory" does not imply the use of magnetic-core-technology memories. Furthermore, the system's core memory may be either physically and/or logically divided into many components corresponding to different objects and sets of objects in the system.

The basic objects used in the invention usually perform unscaled (e.g., fixed-point) numerical operations. The set of such objects includes signal detectors and modulators configured as logical gates, data registers, adders, subtracters, shifters, function look-up tables, function-value interpolators, exponential function generators, logarithmic function generators, and scientific-library-function generators, particularly as based upon the product-of-exponentials and "continued-exponential" series expansions as introduced for the first time hereinafter and in the concurrently filed copending application mentioned above. However, the expensive component of a conventional floating-point processor, i.e., the fixed-point multiplier, usually is not required.

Notation for Logarithms and Exponentials. The following definitions are used herein:

$$\text{axp } u = a^u \text{ and alg } u = \log_a u \qquad (1)$$

for $0 < a$. Other letters or symbols can be substituted for a, except that usually $$\text{bxp } u = 2^u \text{ and blg } u = \log_2 u, \qquad (2)$$

(i.e., $b \equiv 2$ wherein the "b" is a mnemonic for "binary"), $$\text{dxp } u = 10^u \text{ and dlg } u = \log_{10} u, \qquad (3)$$

(i.e., $d \equiv 10$ wherein the "d" is a mnemonic for "decimal") and $$\text{exp } u = e^u \text{ and elg } u = \log_e u = \ln u. \qquad (4)$$

There are also the constants defined as follows:

$$q_a \equiv \text{alg } e = 1/\ln a \quad (5)$$

$$Q_a \equiv \text{alg } q_a = (\ln(1/\ln a))/\ln a \quad (6)$$

wherein e is the base of the natural logarithm. When $a=2\equiv b$, the subscript is often omitted, i.e., $$q \equiv \text{blg } e = 1/\ln 2 \quad (7)$$

$$Q \equiv \text{blg } q = (\ln(1/\ln 2))/\ln 2. \quad (8)$$

Furthermore, the newly named "diff-exponentials" are defined as follows:

$$\text{axd } u \equiv -1 + \text{axp } u \equiv a^u - 1 \quad (9)$$

$$\text{bxd } u \equiv -1 + \text{bxp } u \equiv 2^u - 1 \quad (10)$$

$$\text{exd } u \equiv -1 + \exp u \equiv e^u - 1, \text{ etc.} \quad (11)$$

The respective inverse "diff-logarithms" are defined as follows:

$$\text{ald } u \equiv \text{alg}(1+u) \quad (12)$$

$$\text{bld } u \equiv \text{blg}(1+u) \quad (13)$$

$$\text{eld } u \equiv \text{elg}(1+u) \equiv \ln(1+u) \quad (14)$$

and so on. Thus for a given base the diff-logarithm and diff-exponential are inverse functions.

There is the further convention that the uppercase forms AXP, AXD, ALG, and ALD refer to functions whose arguments are restricted to particular domains chosen by the designer, e.g., for implementation in hardware. However, the arguments for the upper-case BLD and BXD functions are specifically restricted to be nonnegative fractions, thereby also restricting the BLD and BXD values themselves to this same fraction range.

These extended logarithmic and exponential notational conventions are given in more detail in the attached Appendix A.

General Function Generation by Look-up-Table Value Interpolation Using E/L Computation Introduction. Ultrafast function generation by direct look-up from tables is known to be much too expensive except for very low precision. Hence such table-based generation has been regarded as virtually useless.

Nevertheless, according to the invention, this ultrafast generation of the low-precision logarithmic and exponential functions is employed to effect a comparatively low-precision exponential/logarithmic computation that requires minimal iterative left-right digit-place shifting to interpolate values within a compact look-up table for a net gain in precision while retaining high levels of performance and economy.

Furthermore, extending the interpolation correction to higher orders without direct multiplication operations suggests the use of logarithms and exponentials only if these transformations can be generated particularly rapidly and economically, a circumstance usually considered to be distinctly uncharacteristic of these functions. Thus, the following description and analysis shows that, according to the invention, the elimination of nearly all iterative left-right digit-place shifting from the interpolation computation achieves drastic improvements in efficiency and economy, in the generation of exponential and logarithmic functions, in the generation of generalized functions, and thence in conventional and novel applications of these efficient function generators.

First and Second-Order Interpolation. This technique is useful where the desired function is to be characterized as $f(x)$. Generation of a radix-r fixed-point function $f(x)$ as a function of a radix-r fixed-point argument x may proceed according to the partitioning $x = u^* + hv^*$ wherein a dominant value $u^*$ and an adjunct value $v^*$ are, respectively, the values of the most significant and next most significant portions of the digits of x. A constant integer bias $\xi$ may be introduced such that $u^* + hv^* = (u^* - h\xi) + h(\xi + v^*) = u + hv$, $u = u^* - h\xi$, $v = \xi + v^*$ for integer constant $\xi$ wherein $0 \le |\xi| \le r-1$, $|h| = r^{-n} \ll 1$ for positive integer n, $0 \le v^* < 1$, and $\xi \le v < \xi + 1$.

The generator employs an interpolation computation that includes first and second-order differential effects to interpolate values in a comparatively sparse look-up table. According to the invention, exponential/logarithmic computational techniques oriented toward requiring minimal iterative left-right digit-place shifting provides this interpolation.

Using the notation: $\text{rlg } x \equiv \log_r x$ and $\text{rxp } x \equiv r^x$, $f \equiv f(u) = f(u^* - h\xi) \equiv f^*(u^*)$, and indicating the derivative with respect to u by a prime, the following approximation is used:

$$f(u + hv) \approx X + h\alpha\psi r^{-\lambda}\xi + h\psi r^{-\lambda}v^* + hs_w\text{rxp}W, \quad (15)$$

$$X \equiv X(u^*) = f + (1-\alpha)h\psi r^{-\lambda}\xi, \quad (16)$$

$$W = W^* + hC^*, \; W^* = V + Y, \quad (17)$$

$$C^* = s_w s_d \text{rxp}(Q_r + V - Y + D), \quad (18)$$

$$s_w = s_v s_y, \; s_d = \text{sign } f', \quad (19)$$

$$s_v = \text{sign } v, \; s_y = \text{sign}(f' - \psi r^{-\lambda}), \quad (20)$$

$$V = \text{rlg}|v|, \; Y = \text{rlg}|f' - \psi r^{-\lambda}|, \quad (21)$$

$$D \equiv D(u^*) = \text{rlg}\left|\frac{1}{2}f''\right|, \quad (22)$$

wherein $\alpha$ is an arbitrary constant, $\psi$ and $\lambda$ are signed integer constants of small magnitude chosen according to the invention in conjunction with the choice of $f$ such that the quantity $f_{\bullet}^{*\prime}(u^*) \equiv |f' - \psi r^{-\lambda}|$ is of restricted dynamic range. That is, $f_{\bullet}^{*\prime}$ is of the form $r^m g$ wherein $1 \le g < r$, and the range of values of the signed integer m is substantially independent of n and comparatively restricted.

The multiplication $v^{-\lambda} \times v^*$ may be implemented by minimal shifting. Similarly, the multiplication $\psi \times (v^{-\lambda}v^*)$ may be efficiently realized with only a very few additions or subtractions. These parameters permit a useful degree of adjustment to the allowed range of $f'$ without reducing the digit-width of $v^*$ and thus sacrificing precision. The values of X, Y, and D are functions only of $u^*$. Hence, even at worst, these values may be generated efficiently, either individually or in various combinations, with or without $Q_r$, from look-up tables of but modest size.

More importantly, when the relevant interval of $f'$ includes values near zero, particular choices of values for these parameters can greatly reduce both the dynamic range and the associated quantity of required digit places of expensive left-right "variable" shifting associated with the normalization-denormalization of the E/L calculation. However, the fixed "constant" shifting relative to particular data register boundaries is comparatively economical, e.g., an 8-bit shift in a byte-oriented processor is economically effected directly as a data transfer rather than an expensive iterative process.

Thus, instead of an expensive large amount of left-right shifting, there is but the minor cost of adding or subtracting a small multiple of an only slightly shifted $v^*$. Hence, second-order interpolation (i.e., with a double-width correction) can be generated provided only that the rlg and rxp functions are made available with an absolute error whose magnitude is less than or on the order of $h^2$. High-performance forms of such double-width generators for the rlg and rxp functions may be constructed similarly, but with first-order (i.e., single-width) rlg and rxp tables for the single-width interpolation computation. First-order interpolation corresponds to omitting the $C^*$ term which depends upon $f''$.

Hereinafter there is a specific example of the first-order method applied to an ultrafast machine-language software generator for a two-byte binary fixed-point value of $f(\theta) = \sin\theta\pi/2$ as a function of a two-byte fraction $\theta$. With $a1$, $\xi = 1$, $\lambda = 0$, evaluation is partitioned into two regions: one region wherein $\psi = 0$ and the other wherein $\psi = -1$ reduces the dynamic range (and expensive left-right shifting) of the interpolation calculation.

Third and Higher-Order Interpolation. The foregoing second-order interpolation method can be extended to third and higher orders by following the same general principles which extend the first-order method to second order.

Hardware Generalized Function Generator. FIG. 1 shows the combinatorial flow-through organization of the general 2n-digit generalized function generator 201. The function generator 201 employs an exponential/logarithmic computation of an (unsigned) correction value that is used for interpolating values not in a look-up table 206. Pipe-lining is particularly easy for such a combinatorial (i.e., no feed-back loops) circuit. The circuit can be clocked as a single unit, or else synchronizing delays can be distributed throughout the circuit in order to reduce the execution time of the pipe-line stages, thereby allowing a corresponding increase in the clocking rate.

The generalized function generator 201 comprises an at least 2n-digit input first data bus 202 coupled to a partitioning means 203. The partitioning means 203 partitions the digits of the input first data bus 202 into at least two n-digit portions, which are a most significant (MS) dominant second data bus 204 and a next most significant (NS) adjunct third data bus 205 corresponding to values $u^*$ and $v^*$, respectively. The second bus line 204 is coupled to the input of the $f^*$ look-up table means 206. The 2n-digit fourth data bus output 209 of the $f^*$ look-up table means 206 is a value of the function $f^*(u^*) \equiv f(u^* - h\xi) \equiv f(u)$ wherein $\xi$ is an arbitrary (positive) bias value. The second bus 204 is coupled to a first function generating means 207 for generating the function value $\log_a|f^{*\prime}(u^*)| \equiv \log_a|f'(u^* - h\xi)| \equiv \log_a|f'(u)|$, wherein $0 < a$, as the output value on the fifth data bus 210. The fifth data bus 210 is coupled to a first data input of an n-digit first adder 212.

The adjunct third data bus 205 which possesses a value $v^*$, is coupled to an adjunct second function generating means 208 for generating an approximation of the modified logarithmic function value $\log^*_a(v^*) \equiv \log_a|\xi + v^*| \equiv \log_a|v|$. The arbitrary bias value $\xi$ is chosen to reduce the dynamic range of the quantity $|v| \equiv |\xi + v^*|$, thereby reducing the amount of left shifting required in evaluating $\log_a|v| \equiv \log_a|\xi + v^*|$ and in turn reducing the amount of right shifting required in evaluating a subsequent antilogarithm. The output of the adjunct second function generating means 208 as the sixth data bus 211 is coupled to the second data input of the n-digit first adder 212. The output from the first adder 212 is coupled to a seventh data bus 213. The seventh data bus 213 is coupled to the input of a third function generating means 214 providing the base-a antilogarithm function value as the output coupled to an eighth data bus 215. The data value output of the antilogarithm generating means 214 is an (unsigned) interpolation correction value. The 2n-digit fourth data bus 209 is coupled to the LS n-digit portion of a first data input of a 2n-digit second adder 218. The eighth data bus 215 is coupled to the second data input of the 2n-digit second adder 218. The output of the second adder 218 is coupled to the ninth data bus 216 for generating the output of the generalized function generator 201.

Signed Interpolation Correction Values. Permitting the bias value, the derivative value, and the adjunct portion value to be signed quantities allows further latitude in the foregoing interpolation. In particular, a signed interpolation correction value is provided in an elementary manner by:

1) coupling a sign providing means (not shown) to said partitioning means 203 for extracting a sign corresponding to the product of the sign of $f^{*\prime}(u^*)$ times the sign of the quantity $v \equiv \xi + v^*$ as output and 2) coupling the output of said sign providing means (not shown) to the output of said antilogarithm generating means for attaching the provided sign to the output of said antilogarithm generating means to produce a signed interpolation correction value.

Improved Speed and Economy. The speed and economy may be improved by narrowing the digit-width of the 2n-digit second adder 218 for including only about n digits, and by standard techniques propagating the carry-out 217 from such a narrowed adder 218 across the balance of the MS n digits of the value on the fourth data bus 209.

Improved Precision. Improved precision results from extending, by about 1-3 low-order guard digits, the digit-widths of the outputs of the look-up table 206, the first and second function generating means 207 and 208, respectively, and the inputs and outputs of the first adder 212, the third function generating means 214 and the second order 218.

General Logarithmic Function Generation by
Look-up-Table Value Interpolation Using E/L
Computation Introduction. This technique is useful where the desired function is to be characterized as $\log_r f(x)$. Such functions are particularly useful in a generalized base-r exponential/logarithmic (E/L) computational system which is described by the present inventor for the first time in the concurrently filed copending application "Method and Apparatus for Exponential/Logarithmic Computation."

In a generalized base-r E/L computational system, general positive exponential quantities $\hat{g}$ and $\hat{z}$ are represented by fixed-point logarithmic quantities G and Z, respectively, wherein $\hat{g}=r^G$ and $\hat{z}=r^Z$. Evaluating $\hat{g}(\hat{z})$ as a general E/L function of $\hat{z}$ corresponds to generating $G(r^Z)=$rlg $\hat{g}(r^Z)$ as a fixed-point function of the fixed-point argument Z.

The generation of such functions by conventional techniques is often even more difficult than a pair of expensive exponential or logarithmic operations. This severe inefficiency, which has frustrated the design and construction of general-purpose E/L processors, may be remedied according to the invention as follows.

First and Second-Order Interpolation. The E/L function $(f(rlgz)\equiv f(rlgr^Z)\equiv rlgf(Z))$ is effected by generating rlg $f(Z)$ as a radix-r fixed-point function of the radix-r fixed-point argument Z. The digits of Z can be partitioned such that $Z=u^*+hv^*$ wherein $h=r^{-n}<<1$ with $0\leq v^*<1$. Upon biasing $v^*$ by an integer $\xi$ of small magnitude, there is rlg $f(Z)=$rlg $f(u^*+hv^*)=$rlg $f(u^*-h\xi+h(\xi+v^*))=$rlg $f(u+hv)$ wherein $u=u^*-h\xi$ and $v=\xi+v^*$.

A generator for the function rlg $f(u+hv)$ uses values interpolated in a look-up table and may employ an interpolation computation that includes first and second-order differential effects. According to the invention, this interpolation employs exponential/logarithmic computational techniques oriented toward requiring minimal left-right digit-place shifting.

Indicating the derivative with respect to u by a prime, the following approximation is used:

$$rlgf(u + hv) \approx X + hs_w rxpW. \quad (23)$$

$$W' = W^* + hC^*(W^*,u). \quad (24)$$

$$W^* = rlg\left|vq_r\frac{f'}{f}\right| = V + Q_r - X + Y. \quad (25)$$

$$C^*(W^*, u) = s_w s_d rxp(W^* + D), \quad (26)$$

$$f \equiv f(u), X \equiv X(u) = rlgf. \quad (27)$$

$$V = rlg|v|, Y = rlg|f'|. \quad (28)$$

$$q_r \equiv rlge, Q_r = rlgq_r. \quad (29)$$

$$s_w = (\text{sign } v)(\text{sign } f')(\text{sign } f). \quad (30)$$

$$s_d = \text{sign}\left(\frac{ff''}{f'f'} - 1\right). \quad (31)$$

$$D \equiv D(u) = rlg\left(\frac{1}{2}\left|\frac{ff''}{f'f'} - 1\right|\right). \quad (32)$$

wherein each scaling by h can be effected as a right shift of n digit-places. The value for $\xi$ is chosen to reduce the dynamic range (and expensive left-right shifting) of the calculation. The values of X, Y, and D are functions only of u. Thus, even at worst, these values may be generated efficiently, either individually or in various combinations, without or with $Q_r$, from look-up tables of but modest size. Although exponential and logarithmic transformations are required at execution time, given the D values (possibly from a look-up table), direct fixed-point multiplication operations (other than by signs or by h) are not needed.

The corresponding relations for first-order interpolation are derived simply by omitting $C^*$ which is equivalent to assigning $W=W^*$.

Third and Higher-Order Interpolation. The foregoing second-order interpolation method can be extended to third and higher orders by following the same general principles which extend the first-order method to second order.

In the attached Appendix B, detailed description of the foregoing sets of interpolation equations are provided. This appendix is intended as technical documentation to enable those of ordinary skill in the art to fully specify the function of the generators in accordance with the invention. However, all of the functions are straight-forward implementations of the foregoing description based on specific application of generalized principles.

General ALG and AXP Function Generators

The Basic Equations. The foregoing methods of interpolation can be applied to the generation of logarithms and exponentials of general base a using radix-r numbers.

The generalized base-a logarithmic and exponential functions L(x) and E(x) are defined as follows:

$$L(x) = f(a,A,C,x) = A + alg(C+x) \quad (33)$$

$$E(x) = g(a,F,x) = -F + axp\ x. \quad (34)$$

Defining $x=u^*+hv^*=u+hv$ wherein $u=u^*-hd$, $v=d+v^*$, and $h=r^{-n}$; the continued-exponential series expansion for L(x) can take the form of:

$$L(u+hv) = L(u) + h(F + E(R - h(F + E(R' - h(-F + E(R''+\ldots)))))) \quad (35)$$

wherein $R=L(v')+Q_a-L(u)$, $v'=v-C$, $Q_a=alg\ q_a$, $q_a=alg\ e$, $R'=R+alg(\frac{1}{2})$, and $R''=R+alg(5/12)$.

The product-of-exponentials series expansion for E(x) can take the form of an exponential of a sum as follows:

$$E(u + hv) = E(u) + h\left(F + E\left(L(v') - Q_a' + u^* + \right.\right. \quad (36)$$
$$\left.\left. h\frac{1}{2}v^* + \sum_{j=1}^{\infty}(-1)^{j+1}h^{2j}(F + E(K_j + j2L(v')))\right)\right).$$

$$|hv| < 2\pi q_a, Q_a' = Q_a + A + h\frac{1}{2}d.$$

$$K_j = alg|B_{2j}/(2j(2j)!q_a^{2j-1})| - j2A$$

wherein $B_{2j}$ is the 2j-th Bernoulli number. The first few of the Bernoulli numbers are: $B_0=1$, $B_1=-\frac{1}{2}$, $B_2=1/6$, $B_3=0$, $B_4=-1/30$, $B_5=0$, $B_6=1/42$, $B_7=0$, $B_8=-1/30$, $B_9=0$, $B_{10}=5/66$, $B_{11}0$, $B_{12}=-691/2730$, $B_{13}=0$ and $B_{14}=7/6$.

The halving of $v^*$ is easily handled in most fixed-point number systems in popular use wherein the radix is a multiple of two. (This division can be performed with the L and E functions if necessary.) The term $j2L(v')$ is efficiently implemented as a sequence of additions of $L(v')$ or $2L(v')$. The remaining multiplications by h are efficiently realized by shifting as all quantities are taken to be radix-r values. The extent of each table must be sufficient to accommodate at least the full ranges of all indices accessing that table.

First-Order Interpolation for L2(u+hv). Retrieve the look-up table value $L12(u)\approx L(u)$ with an absolute error on the order of $h^2$. Indicating by L1, E1, and $Q1_a$, respectively, the approximations of the L and E operations (as derived from direct table look-up, say) and the constant value $Q_a$ with errors less than or on the order of h, evaluate: $R = L1(v') + Q1_a - L1(u)$, wherein $v' = v - C = d + v^* - C$, and $L2(u + hv) = L12(u) + h(-F + E1(R))$, which corresponds to an L operation with an absolute error on the order of $h^2$.

First-Order Interpolation for $E2(u + hv)$. Retrieve the look-up talbe value $E12(u) \simeq E(u)$ with an absolute error on the order of $h^2$. Indicating by L1, E1, and $Q1'_a$, respectively, the approximations of the L and E operations and the constant value $Q'_a$ with errors on the order of h, evaluate: $R = L1(v') - Q1'_a + u^*$, wherein $v' = v - C$, and $E2(u + hv) = E(u) + h(F + E1(R))$, which corresponds to an E operation possessing an absolute error on the order of $h^2$.

Second-Order Interpolation for $L3(u + hv)$. Retrieve the look-up table value $L123(u) \simeq L(u)$ with an absolute error on the order of $h^3$. With L1, E1, L2, E2 and L12 as described above and $Q12_a$ as an approximation of the constant value $Q_a$ with an error on the order of $h^2$, evaluate: $R = L2(v') + Q12_a - L12(u)$ wherein $v' = v - C$, $R' = R + alg(\frac{1}{2})$, $T = R - h(F + E1(R'))$, and finally $L3(u + hv) = L123(u) + h(F + E2(T))$, which corresponds to an L operation possessing an absolute error on the order of $h^3$.

Second-Order Interpolation for $E3(u + hv)$. Retrieve the look-up table value $E123(u) \simeq E(u)$ with absolute error on the order of $h^3$. With L1, E1, L2, and E2 as described above and $Q12'_a$ as an approximation of the constant value $Q'_a$ with an error on the order of $h^2$, evaluate: $R = L2(v') - Q12'_a + u^* + h\frac{1}{2}v^*$ wherein $v' = v - C$, $R' = R + alg(\frac{1}{2})$, $T = R - h(F + E1(R'))$, and finally $E3(u + hv) = E123(u) + h(F + E2(T))$, which corresponds to an E operation possessing an absolute error on the order of $h^3$.

Generators Based on Third and Higher-Order Interpolation. Third and higher-order interpolations involve using more terms from the approximating series expansions and table values of successively higher precision together with the generators of lower orders. Each required fixed-point multiplication is degenerate, in that it can always be implemented either as a single (or at most a double) addition or as a shift.

When $a = r$, the foregoing methods for generating exponentials and logarithms are particularly simple and efficient because scaling by a can then be realized efficiently as a shift. This permits the look-up tables to be much smaller than in the general case. In any such case, as for $a = r = 2$, the above description requires little modification in order to account for the fact that the base-r exponential of an integer argument is most efficiently realized as a shift. The values of the various parameters are chosen at the convenience of the system designer with the required quantity of table entries and the necessary precision of such entries depending on those choices. Such tradeoffs are analogous to those which are required for functional approximation in floating-point systems.

BLD and BXD Function Generators

Definitions. Regarding notation, $$bldx \equiv blg(1 + x) \equiv \log_2(1 + x) \tag{37}$$

$$bxdx \equiv -1 + bxpx \equiv 2^x - 1 \tag{38}$$

$$q \equiv blge = 1/\ln 2 \tag{39}$$

$$Q \equiv blgq = (\ln(1/\ln 2))/\ln 2. \tag{40}$$

Also, x and $\{x\}$ represent, respectively, the signed integer and unsigned fraction portions of x. F2 and F3, respectively, refer to 2n-bit and 3n-bit unsigned fractions. The bits of the (n+m)-bit unsigned fraction value F are partitioned into a MS n-bit fraction value u and a LS m-bit fraction value v such that $F = u + h v = u' + h(1 + v)$, $0 \leq u < 1$, $0 \leq v < 1$, $u' = u - h$ and $h = 2^{-n} << 1$. However, both BLD $F \equiv$ bld F and BXD $F \equiv$ bxd F are defined only for $0 \leq F < 1$. Thus, $0 \leq$ BLD $F < 1$ and $0 \leq$ BXD $F < 1$ with BLD(BXD F) $\equiv$ BXD(BLD F) $\equiv$ F. High-performance implementations of these fraction BLD and BXD functions are particularly desirable in a binary exponential/logarithmic (E/L) computational system that is described by the present inventor for the first time in the concurrently filed copending application "Method and Apparatus for Exponential/Logarithmic Computation."

The Basic Equations. According to the invention, the interpolations of the invention are based on the general relations of the combination of equations (41) through (46) as follows implemented in a computer system. The basic interpolation relations are $$bxd(u + hv) = bxdu' + (bxpu')bxdh(1 + v) \tag{41}$$

$$bld(u + hv) = bldu' + bld(hq^{-1}2^R) \tag{42}$$

$$R = bldv + Q - bldu'. \tag{43}$$

Thus, $R = BLD v + Q - BLD u'$ when $u \neq 0$ and $r = BLD v + Q + 1 - BLD(1 - 2h)$ when $u = 0$.

The above general product-of-exponentials series expansion for the binary function bxd h(1 + v) may be written in "binary notation" as $$bxdh(1 + v) = hbxp\left(BLD - Q + h\frac{1}{2}(1 + v) + \sum_{j=1}^{\infty}(-1)^{j+1}h^{2j}bxp(d_j + j2BLDv)\right), \tag{44}$$

$$d_j = blg|B_{2j}/(2j(2j)!q^{2j-1})|$$

wherein $B_{2j}$ is the 2j-th Bernoulli number. For the binary function $bld(hq^{-1}2^R)$, the above general continued-exponential series expansion can be extended and written in "binary notation" as $$bld(hq^{-1}2^R) = hbxp\left(R - h\frac{1}{2}bxp\left(R - h\frac{5}{12}bxp\left(R - h\frac{47}{120}bxp\left(R - h\frac{12917}{33840}bxp\left(R - h\frac{329458703}{874222560}bxp(R + \ldots)\right)\right)\right)\right)\right) \tag{45}$$

$$= hbxp(R - hbxp(R' - hbxp(R'' - hbxp(R''' + \ldots)))), \tag{46}$$

$R' = R + blg(1/2)$, $R'' = R + blg(5/12)$, $R''' = R + blg(47/120)$.

The most significant n-bit and 2n-bit portions of Q may be identified as Q1 and Q12, respectively. Look-up tables BLDT, BXDT, BLDT*, and BXDT* are constructed to provide at least (n+m)-bit values of bld g, bxd g, {bld(g−h)}, and {bxd(g−h)}, respectively, for any n-bit fraction g. The most significant n-bit, 2n-bit, and 3n-bit portions of the entries of the four tables may be identified, respectively, as

| | | |
|---|---|---|
| BLDT1(g), | BLDT12(g), | BLDT123(g); |
| BXDT1(g), | BXDT12(g), | BXDT123(g); |
| BLDT1*(g), | BLDT12*(g), | BLDT123*(g); and |
| BXDT1*(g), | BXDT12*(g), | BXDT123*(g). |

The fraction quantities BLDT1(g), BLDT2(g), and BLDT3(g), respectively, are defined to be the most significant (MS), next most significant (NS), and least significant (LS) n-bit portions of BLDT123(g). Corresponding quantities are defined similarly for the MS, NS, and LS n-bit portions of the BXDT123(g), BLDT123*(g), and BXDT123*(g). These quantities have fraction values such that $$BLDT123(g) = BLDT1(g) + hBLDT2(g) + h^2 BLDT3(g) \quad (47)$$

$$BXDT123(g) = BXDT1(g) + hBXDT2(g) + h^2 BXDT3(g) \quad (48)$$

$$BLDT123^*(g) = BLDT1^*(g) + hBLDT2^*(g) + h^2 BLDT3^*(g) \quad (49)$$

$$BXDT123^*(g) = BXDT1^*(g) + hBXDT2^*(g) + h^2 BXDT3^*(g). \quad (50)$$

First-Order Interpolation for BLD2(F2). For F2 = u+hv (i.e., m=n), there is bld u'+bld(hq$^{-1}2^R$)≈bld u'+h bxp R. Thus BLD2(u+hv), as an approximation of BLD(u+hv) to about 2n-bits of precision, can be generated as follows:

If u≠0, then: 1) Look up BLDT12(u'); 2) Look up BLDT1(v); 3) Sum R = BLDT1(v)+Q1−BLDT1(u'); 4) Partition the digits of R into m.f, wherein m = $\lfloor R \rfloor$ is the signed integer portion of R, (−1≤m≤1), and f={R} is the unsigned fraction portion of R; 5) Look up BXDT1(f); and 6) Form the sum BLD2(u+hv) = BLDT12(u) + h2$^m$(1+BXDT1(f)) as the output;

Or else, if u=0, then: 1) Look up BLDT1(v); 2) Form the sum R = BLDT1(v)+Q1+1−BLDT1(1−2h); 3) Partition the digits of R into m.f, wherein 0≤m= $\lfloor R \rfloor$ ≤1 and f={R}; 4) Look up BXDT1(f); and 5) Form the sum BLD2(u+hv) = −1+BLDT12(1−2h)+h2$^m$(1+BXDT1(f)) as the output.

First-Order Interpolation for BXD2(F2). For F2=u+hv (i.e., m=n), there is bxd u'+(bxp u')bxd h(1+v)≈bxd u'+h bxp(BLD v−Q+u'). Thus BXD2(u+hv), as an approximation of BXD(u+hv) to about 2n bits of precision, can be generated as follows:

If u≠0, then: 1) Look up BXDT12(u'); 2) Look up BLDT1(v); 3) Form the sum R = BLDT1(v)−Q1+u'; 4) Partition the digits of R into m.f, wherein −1≤m= $\lfloor R \rfloor$ ≤1 and f={R}; 5) Look up BXDT1(f); and 6) Form the sum BXD2(u+hv) = BXDT12(u')+h2$^m$(1+BXDT1(f)) as the output.

Or else, if u=0, then: 1) Look up BLDT1(v); 2) Form the sum R = BLDT1(v)−Q1−h; 3) Partition the digits of R into m.f, wherein −1≤m= $\lfloor R \rfloor$ ≤0 and f={R};

4) Look up BXDT1(f); and, 5) With D12 as a 2n-bit approximation of the constant D = 1+bxd(−h) = ½+½BXD(1−h), form the sum BXD2(u+hv) = −1+D12+h2$^m$(1+BXDT1(f)) as the output.

Second-Order Interpolation for BLD3(F3). For F3=u+hv (i.e., m=2n), there is bld u'+bld(hq$^{-1}2^R$)≈bld u'+h bxp(R−h½R). Thus BLD3(u+hv), as an approximation of BLD(u+hv) to about 3n bits of precision, can be generated as follows:

If u≠0, then: 1) Look up BLDT123(u'); 2) Generate BLD2(v); 3) Sum R = BLD2(v)+Q12−BLDT12(u'); 4) Partition the digits of R into m.f, wherein −1≤m= R ≤1 and f={R}; 5) Look up BXDT1(f); 6) Subtract the correction: R' = R−h½2$^m$(1+BXDT1(f)); 7) Partition the digits of R' into m'.f', wherein −1≤m'= $\lfloor R' \rfloor$ ≤1 and f'={R'}; 8) Generate BXD2(f'); and 9) Form the sum BLD3(u+hv) = BLDT123(u')+h2$^{m'}$(1+BXD2(f')) as the output;

Or else, if u=0, then: 1) Generate BLD2(v); 2) Form the sum R = BLD2(v)+Q12+1−BLDT12(1−2h); 3) Partition the digits of R into m.f, wherein −1≤m= $\lfloor R \rfloor$ ≤1 and f={R}; 4) Look up BXDT1(f); 5) Subtract the correction: R' = R−h½2$^m$(1+BXDT1(f)); 6) Partition the digits of R' into m'.f', wherein −1≤m'= $\lfloor R' \rfloor$ ≤1 and f'={R'}; 7) Generate BXD2(f'); and 8) Form the sum BLD3(u+hv) = −1+BLDT123(1−2h)+h2$^{m'}$(1+BXD2(f')) as the output.

Second-Order Interpolation for BXD3(F3). For F3=u+hv (i.e., m=2n), there is bxd u'+(bxp u') bxd h(1+v)≈bxd u'+h bxp(BLD v−Q+u'+h½(1+v)). Thus BXD3(u+hv), as an approximation of BXD(u+hv) to about 3n bits of precision, can be generated as follows:

If u≠0, then: 1) Look up BLDT123(u'); 2) Generate BLD2(v); 3) Form the sum R = BLD2(v)−Q12+u'+h½(1+v); 4) Partition the digits of R into m.f, wherein −1≤m= $\lfloor R \rfloor$ ≤1 and f={R}; 5) Generate BXD2(f); and 6) Form the sum BXD3(u+hv) = BXDT123(u')+h2$^m$(1+BXD2(f)) as the output.

Or else, if u=0, then: 1) Generate BLD2(v); 2) Form the sum R = BLD2(v)−Q12−h+h½(1+v); 3) Partition the digits of R into m.f, wherein −1≤m= $\lfloor R \rfloor$ ≤0 and f={R}; 4) Generate BXD2(f); and 5) With D123 as a 3n-bit approximation of the constant D = 1+bxd(−h) = ½+½BXD(1−h), form the sum BXD3(u+hv) = −1+D123+h2$^m$(1+BXD2(f)) as the output.

Third and Higher-Order Interpolation. The third and higher-order interpolations merely involve employing successively more terms from the series expansions and successively more accurate table values together with the generators of lower orders.

Byte-Sized Approximations. Disclosed herein for the first time are the following (equivalent) approximations:

$$bldf \approx 1 - bxd(1 - f - \epsilon) - \epsilon, \quad (51)$$

$$bld(1 - f - \epsilon) \approx 1 - bxdf - \epsilon, \quad (52)$$

$$1 - bldf - \epsilon \approx bxd(1 - f - \epsilon), \quad (53)$$

$$1 - bld(1 - f - \epsilon) - \epsilon \approx bxdf. \quad (54)$$

which for any unsigned fraction $f$ are valid to 7.90 and 8.23 bits of precision for $\epsilon=0$ and $\epsilon=1/256$, respectively. Hence the simpler and more economical one's complement operation produces slightly better results than does the more complicated and more expensive two's complement operation. According to the invention, these approximate substitutions represent new operations that provide added speed and economy in applications employing byte-sized data and are particularly useful in the construction of general function generators based on logarithmic/exponential computation for interpolating double-byte look-up table values.

In the attached Appendix C, specific embodiments of the foregoing generalized functions are disclosed. This appendix is intended as technical documentation to enable those of ordinary skill in the art to fully specify the function of the generators in accordance with the invention, as well as to document the derivations of the functions. However, all of the functions are straight-forward implementations of the foregoing description based on specific application of generalized principles.

Figure 2:
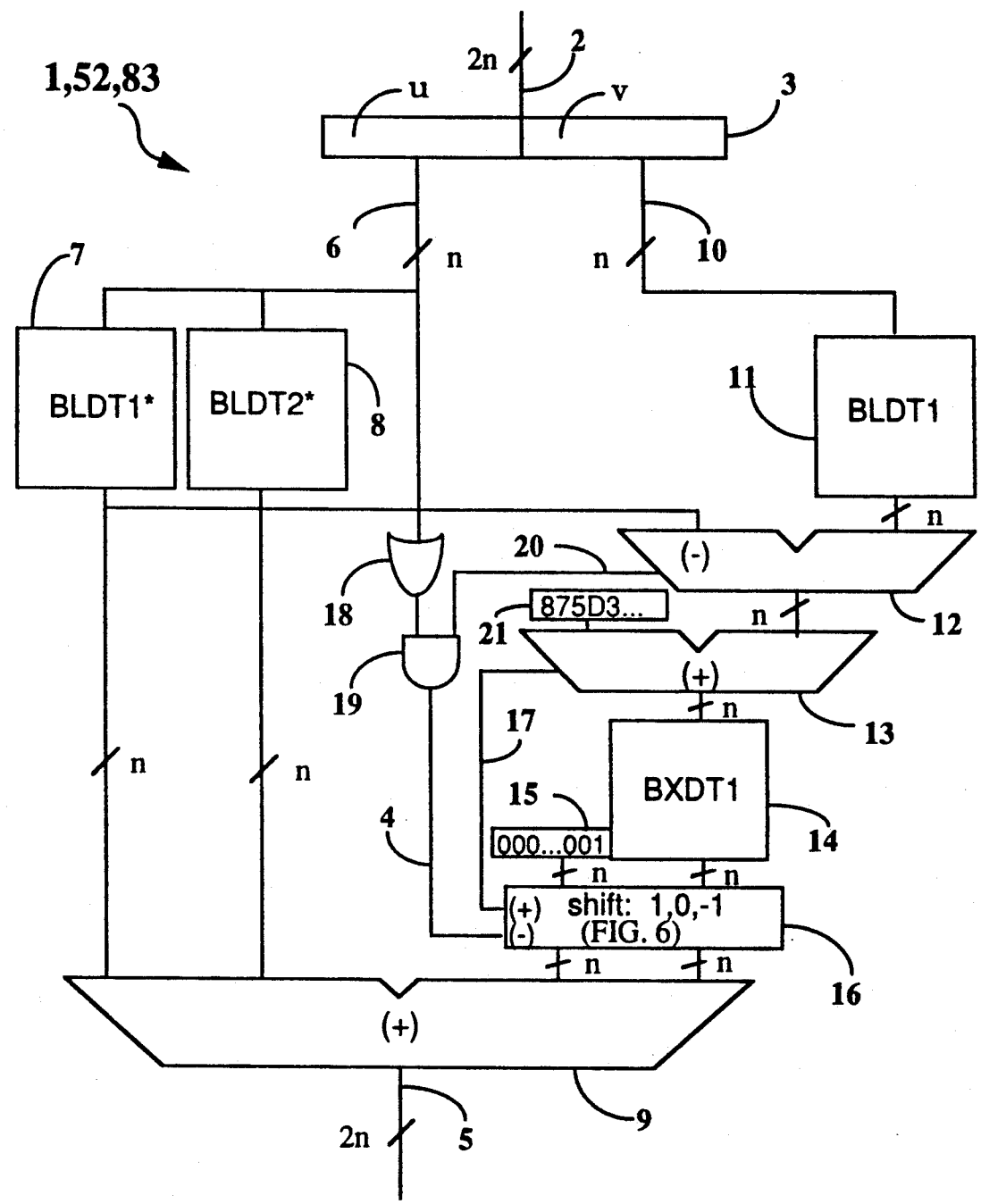
FIG. 2 is a block diagram of the general 2n-bit generator of the binary logarithm of (1+the 2n-bit-fraction argument), i.e., the BLD2 function.

Hardware BLD2 Generator. FIG. 2 shows the combinatorial flow-through organization of the general 2n-bit BLD2 function generator 1. Pipe-lining is particularly easy for such a combinatorial (i.e., no feed-back loops) circuit. The circuit can be clocked as a single unit, or else synchronizing delays can be distributed throughout the circuit in order to reduce the execution time of the pipe-line stages, thereby allowing a corresponding increase in the clocking rate.

The BLD2 function generator 1 comprises an at least 2n-bit input first data bus 2 coupled to a partitioning means 3. The partitioning means 3 partitions the MS 2n bits of the input data bus 2 into two n-bit data busses, which are a most significant (MS) second bus 6 and a least significant (LS) third bus 10. The second bus line 6 is coupled to the inputs of the first and second look-up tables 7 (BLDT1*) and 8 (BLDT2*), respectively.

The n-bit third bus 10 is coupled to the input of the third look-up table 11 (BLDT1). The n-bit output of the BLDT1 look-up table 11 is coupled to the first input of an n-bit subtracter 12. The n-bit output of the first look-up table 7 (BLDT1*) is coupled to the second input of the subtracter 12. The input bits of a first port of an n-bit first adder 13 are determined by a fixed value input from a first element 21, which is set to the n-bit constant fraction Q1 (an n-bit approximation of the constant fraction $Q=blg\ blg\ e=0.875D3\ldots_{16}$). The n-bit output of the subtracter 12 is coupled to the second input of the first adder 13. The n-bit output of the first adder 13 is coupled to the input of the fourth look-up table 14 (BXDT1).

The n-bit second bus 6 is coupled to the inputs of a nonzero-detector n-input OR gate 18. The output of the OR gate 18 is coupled to a first input of a 2-input AND gate 19. The carry-out borrow 20 of the subtracter 12 is coupled to the second input of the 2-input AND gate 19. The output 4 of the AND gate 19 is coupled to the $(-)$ control input of the shifter 16. The carry-out 17 of the first adder 13 is coupled to the $(+)$ control input of the shifter 16.

Figure 6:
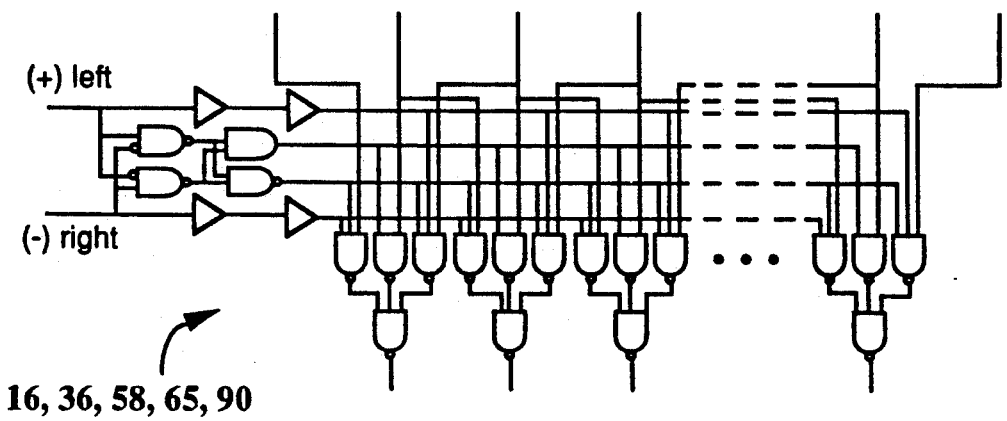
FIG. 6 is a schematic diagram of a barrel shifter for dynamically shifting $k+1$, k, or $k-1$ bit places, wherein the arbitrary fixed k bit places of shift represents a hard-wired displacement of the output relative to the input.

The n-bit output of the fourth look-up table 14 (BXDT1) is coupled to the LS n-bit input of the 2n-bit shifter 16 (FIG. 6 configured with a 0-bit-place hard-wired displacement of the output relative to the input). The MS n-bit input of the shifter 16 is determined by a fixed value input from a second element 15, which clears the MS n−1 bits all to 0s and sets the LS bit to 1.

The $(+)$ and $(-)$ control inputs of the shifter 16 determine the 1, 0, or $-1$ bit-places of (left) shifting of the 2n-bit output of the shifter 16 which is coupled to a first input of the 2n-bit second adder 9. The n-bit outputs of the first and second look-up tables 7 and 8, respectively, are coupled to the second port of the 2n-bit second adder 9 wherein they, respectively, constitute the MS and LS n-bits of a 2n-bit approximation of the unsigned fraction value $\{bld(u-h)\}$ wherein u is the n-bit fraction value on the n-bit second data bus 6. The 2n-bit output of the 2n-bit second adder 9 constitutes the 2n-bit output of the BLD2 function generator 1.

Improved Speed and Economy. The speed and economy may be improved by narrowing the bit-width of the 2n-bit shifter 16 for including only its LS n+1 input bits, thereby producing only n+2 output bits coupled to a reduced-width (n+2)-bit second adder 9, and by standard techniques propagating the carry-out of such a narrowed second adder 9 across the balance of the MS n−2 output bits of the first look-up table 7 (BLDT1*).

Improved Precision. Improved precision results from extending by about 1–3 low-order guard bits the bit-widths of the Q1-value of the first element 21, the outputs of the look-up tables 8 (BLDT2*) and 11 (BLDT1), and the inputs and outputs of the look-up table 14 (BXDT1), the subtracter 12, the adders 13 and 9, and the shifter 16.

Figure 3:
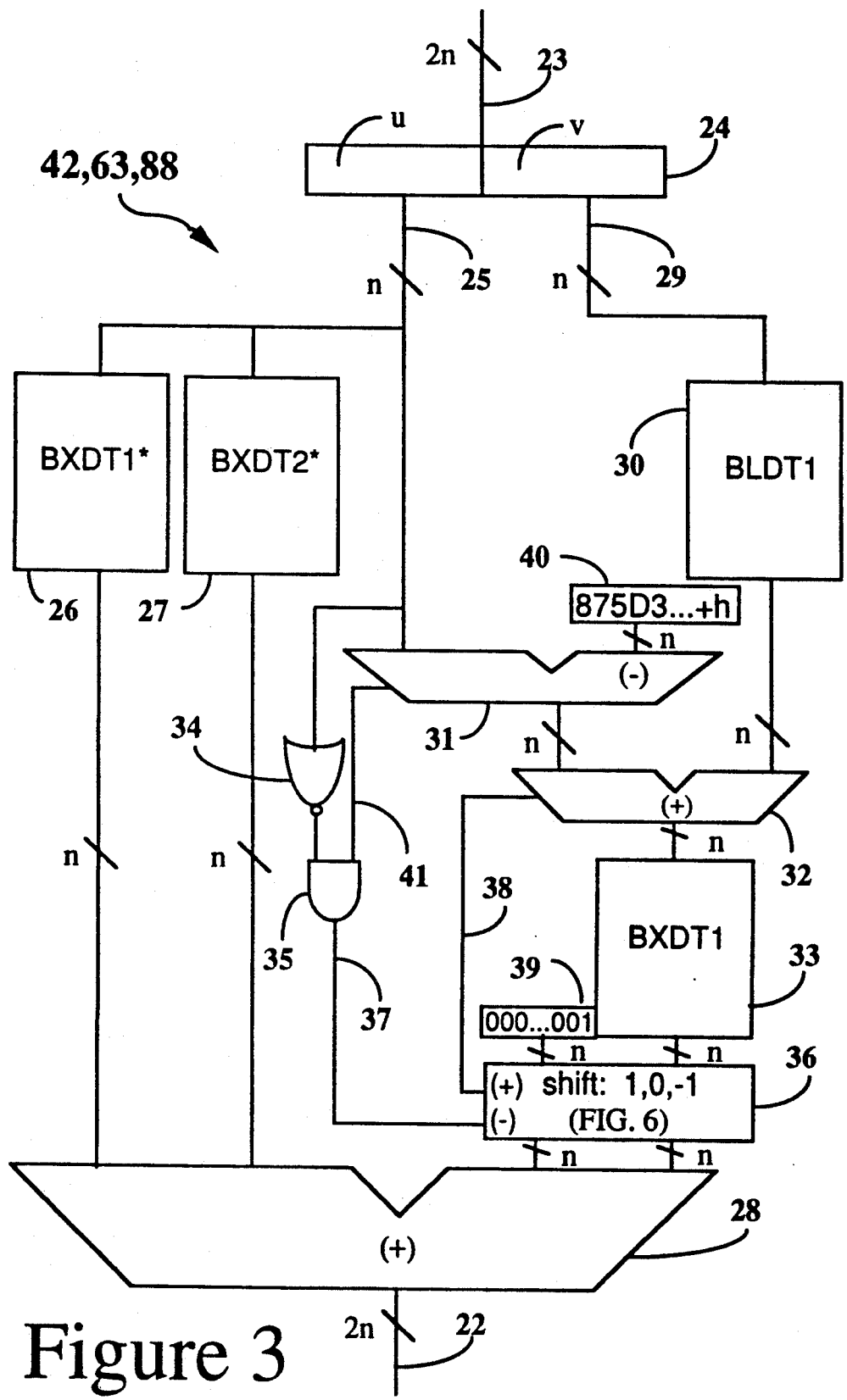
FIG. 3 is a block diagram of the general 2n-bit generator of the binary (exponential) function ($-1+2^{**}$(2n-bit-fraction argument)), i.e., the BXD2 function.

Hardware BXD2 Generator. FIG. 3 shows the combinatorial flow-through organization of the general 2n-bit BXD2 function generator 42 comprising an at least 2n-bit input first data bus 23 coupled to a partitioning means 24. The partitioning means 24 partitions the MS 2n bits of the input data bus 23 into two n-bit data busses, which are a MS second bus 25 and a LS third bus 29. The n-bit second bus line 25 is coupled to the inputs of the first and second look-up tables 26 (BXDT1*) and 27 (BXDT2*), respectively.

The second bus line 25 is coupled to the first input of an n-bit subtracter 31. The third bus line 29 is coupled to the input of the third look-up table 30 (BLDT1). The n-bit output of the third look-up table 30 (BLDT1) is coupled to a first input of an n-bit first adder 32. The input bits of the second port of the n-bit subtracter 31 are determined by a fixed value input from a first element 40, which is set to the value Q1+h (an n-bit approximation of the constant fraction $Q=blg\ blg\ e=0.875D3\ldots_{16}$ incremented by h). The n-bit output of the subtracter 31 is coupled to the second input of the first adder 32. The output of the first adder 32 is coupled to the input of a fourth look-up table 33 (BXDT1).

The n-bit second bus 25 is coupled to the inputs of a zero-detector n-input NOR gate 34. The output of the NOR gate 34 is coupled to a first input of a 2-input AND gate 35. The carry-out borrow 41 of the subtracter 31 is coupled to the second input of the AND gate 35. The output 37 of the AND gate 35 is coupled to the $(-)$ control input of a 2n-bit shifter 36. The carry-out 38 of the n-bit first adder 32 is coupled to the $(+)$ control input of the shifter 36.

The n-bit output of the fourth look-up table 33 (BXDT1) is coupled to the LS n-bit input of the 2n-bit shifter 36 (FIG. 6 configured with a 0-bit-place hard-wired displacement of the output relative to the input). The MS n-bit input of the shifter 36 is determined by a fixed value input from a second element 39, which clears the MS n−1 bits all to 0s and sets the LS bit to 1. The $(+)$ and $(-)$ control inputs of the shifter 36 determine the 1,0, or $-1$ bit-places of (left) shifting of the 2n-bit output of the shifter 36 which is coupled to a first input of a 2n-bit second adder 28. The n-bit outputs of the first and second look-up tables 26 and 27, respectively, are coupled to the second input of the 2n-bit second adder 28 wherein they, respectively, constitute the MS and LS n bits of a 2n-bit approximation of the fraction value {bxd(u−h)} wherein u is the n-bit fraction value of the n-bit second bus 25. The 2n-bit output 22 of the 2n-bit adder 28 constitutes the 2n-bit output of the BLD2 function generator 42.

Improved Speed and Economy. The speed and economy may be improved by narrowing the bit-width of the 2n-bit shifter 36 for including only its LS n+1 input bits, thereby producing only n+2 output bits for coupling to a reduced-width (n+2)-bit second adder 28, and by standard techniques propagating the carry-out of such a narrowed second adder 28 across the balance of the MS n−2 output bits of the first look-up table 26 (BXDT1*).

Improved Precision. Improved precision results from extending by about 1-3 low-order guard bits the bit-widths of the n-bit value Q1+h of the first element 40, the outputs of the second and third look-up tables 27 (BXDT2*) and 30 (BLDT1), respectively, and the inputs and outputs of the fourth look-up table 33 (BXDT1), the subtracter 31, the first and second adders 32 and 28, respectively, and the shifter 36.

Figure 4:
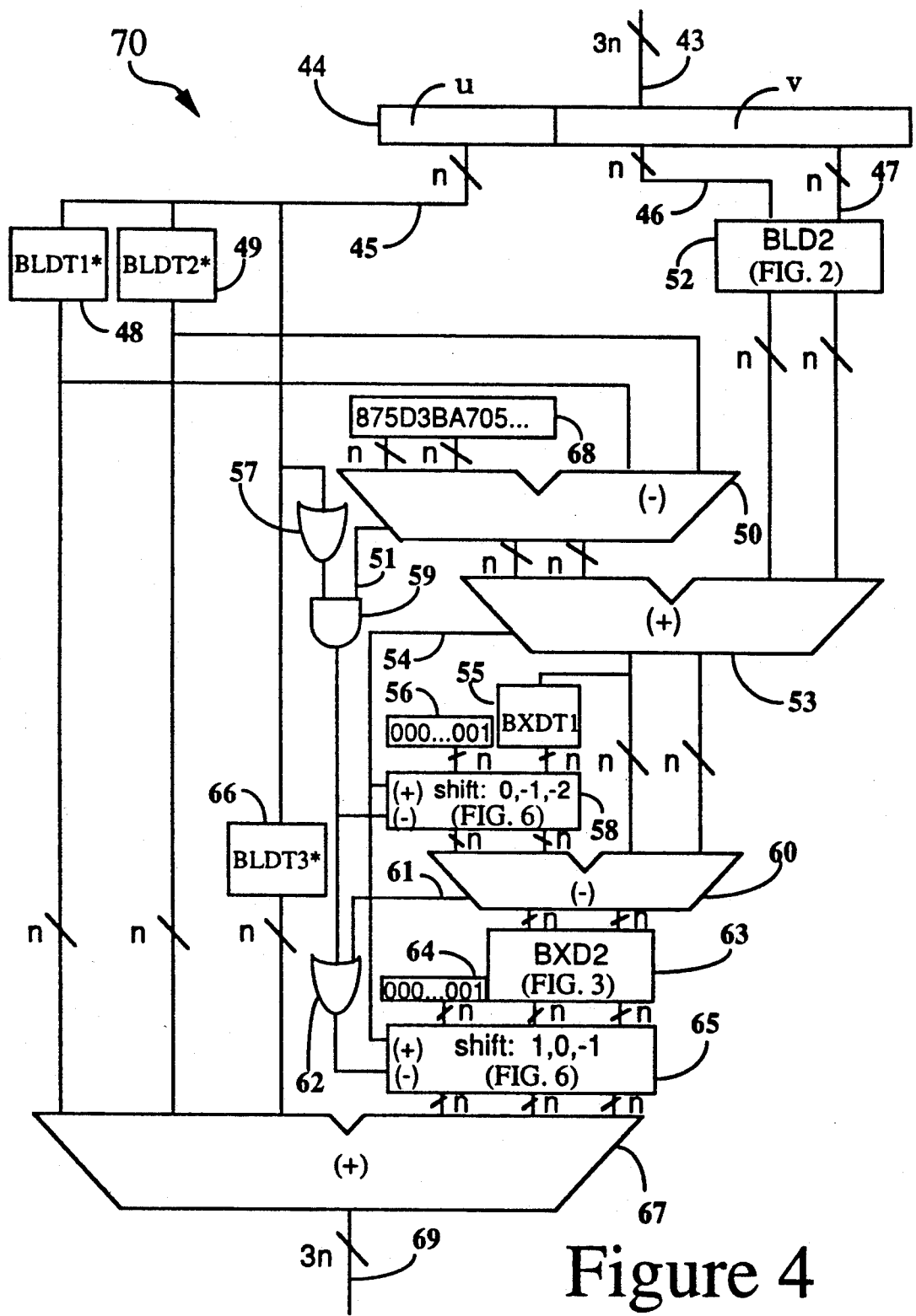
FIG. 4 is a block diagram of the general 3n-bit BLD3 generator.

Hardware BLD3 Generator. FIG. 4 shows the combinatorial flow-through organization of the general 3n-bit BLD3 function generator 70 comprising an at least 3n-bit input first data bus 43 coupled to a partitioning means 44. The partitioning means 44 partitions the MS 3n bits of the input first data bus 43 into three n-bit data busses, which are a MS second bus 45, a NS third bus 46 and a LS fourth bus 47. The second bus line 45 is coupled to the inputs of the first, second and third look-up tables 48 (BLDT1*), 49 (BLDT2*) and 66 (BLDT3*), respectively.

The third and fourth busses 46 and 47, respectively, are coupled to the MS and LS n-bit inputs, respectively, of a 2n-bit BLD2 function generator 52 (FIG. 2). The 2n-bit output of the BLD2 function generator 52 is coupled to a first input of a 2n-bit first adder 53. The input bits of the first port of a 2n-bit first subtracter 50 are determined by a fixed value input of from a first element 68, which is set to the value Q12 (a 2n-bit approximation of the constant fraction Q=blg blg e=0.875D3BA705...₁₆). The n-bit outputs of the first and second look-up tables 48 and 49, respectively, are coupled to the MS and LS n-bit inputs, respectively, of the second port of the first subtracter 50. The 2n-bit output of the first subtracter 50 is coupled to the second input of the 2n-bit first adder 53. The 2n-bit output of the first adder 53 is coupled to a first input of a 2n-bit second subtracter 60.

The MS n bits of the 2n-bit output of the first adder 53 is coupled to the input of a fourth look-up table 55 (BXDT1). The n-bit output of the fourth look-up table 55 (BXDT1) is coupled to the LS n-bit data input of a 2n-bit first shifter 58 [FIG. 6 configured with the output hard-wired −1 bit-place displacement to the left (i.e., +1 bit-place to the right) relative to the input]. The MS n-bit input of the 2n-bit first shifter 58 is determined by a fixed value input of a second element 56, which clears the MS n−1 bits all to 0s and sets the LS bit to 1. The (+) and (−) control inputs of the first shifter 58 determine the 0, −1, or −2 bit places of (left) shifting of the 2n-bit output of the first shifter 58. The output of the first shifter 58 is coupled to the second input of the 2n-bit second subtracter 60. The 2n-bit output of the second subtracter 60 is coupled to the 2n-bit input of a 2n-bit BXD2 function generator 63 (FIG. 3).

The n-bit second bus 45 is coupled to the inputs of a nonzero-detector n-input first OR gate 57. The output of the first OR gate 57 is coupled to a first input of a 2-input AND gate 59. The carry-out 54 of the first adder 53 is coupled to the (+) control input of the 2n-bit first shifter 58. The carry-out borrow 51 of the first subtracter 50 is coupled to the second input of the AND gate 59. The output of the AND gate 59 is coupled to the (−) control input of the first shifter 58. The output of the AND gate 59 is coupled to a first input of a 2-input second OR gate 62. The carry-out borrow 61 of the second subtracter 60 is coupled to the second input of the second OR gate 62. The output of the second OR gate 62 is coupled to the (−) control input of a 3n-bit second shifter 65. The carry-out 54 of the first adder 53 is coupled to the (+) control input of the 3n-bit second shifter 65.

The 2n-bit output of the second subtracter 60 is coupled to the input of a 2n-bit BXD2 function generator 63 (FIG. 3). The 2n-bit output of the BXD2 function generator 63 is coupled to the LS 2n-bit data input of the 3n-bit second shifter 65 (FIG. 6 configured with a 0-bit-place hard-wired displacement of the output relative to the input). The MS n-bit input of the second shifter 65 is determined by a fixed value input of a third element 64, which clears the MS n−1 bits all to 0s and sets the LS bit to 1. The (+) and (−) control inputs of the second shifter 65 determine the 1, 0, or −1 bit places of (left) shifting of the 3n-bit output of the second shifter 65. The output of the second shifter 65 is coupled to a first input of a 3n-bit second adder 67. The n-bit outputs of the first, second, and third look-up tables 48, 49, and 66, respectively, are coupled to a second input of the 3n-bit second adder 67 wherein they constitute, respectively, the MS, NS and LS n-bit portions of a 3n-bit approximation of the unsigned fraction value {bld(u−h)} wherein u is the n-bit fraction value of the n-bit second bus 45. The 3n-bit output 69 of the second adder 67 constitutes the output of the BLD3 function generator 70.

Improved Speed and Economy. The speed and economy may be improved by narrowing the bit-width of the 2n-bit first shifter 58 for including only its LS n+1 input bits, thereby producing only n+2 output bits coupled to a reduced-width (n+2)-bit second subtracter 60, and by standard techniques propagating the carry-out borrow from such a narrowed subtracter 60 across the balance of the MS n−2 bits of the output of the first adder 53. Further speed and economy results from similarly narrowing the 3n-bit width of the second shifter 65 for including only its LS 2n+1 input bits, thereby producing only 2n+2 output bits coupled to a reduced-width (2n+2)-bit second adder 67, and by standard techniques propagating the carry-out from such a narrowed second adder 67 across the balance of the MS n−2 output bits of the first look-up table 48 (BLDT1*).

Improved Precision. Improved precision results from extending by about 1-5 low-order guard bits the bit-widths of the value Q12 of the first element 68, the outputs of the third look-up table 66 (BLDT3*) and the BLD2 function generator 52, and the inputs and outputs of the fourth look-up table 55 (BXDT1), the BXD2 function generator 63, the first and second subtracters 50 and 60, respectively, the first and second adders 53 and 67, respectively, and the first and second shifters 58 and 65, respectively.

Figure 5:
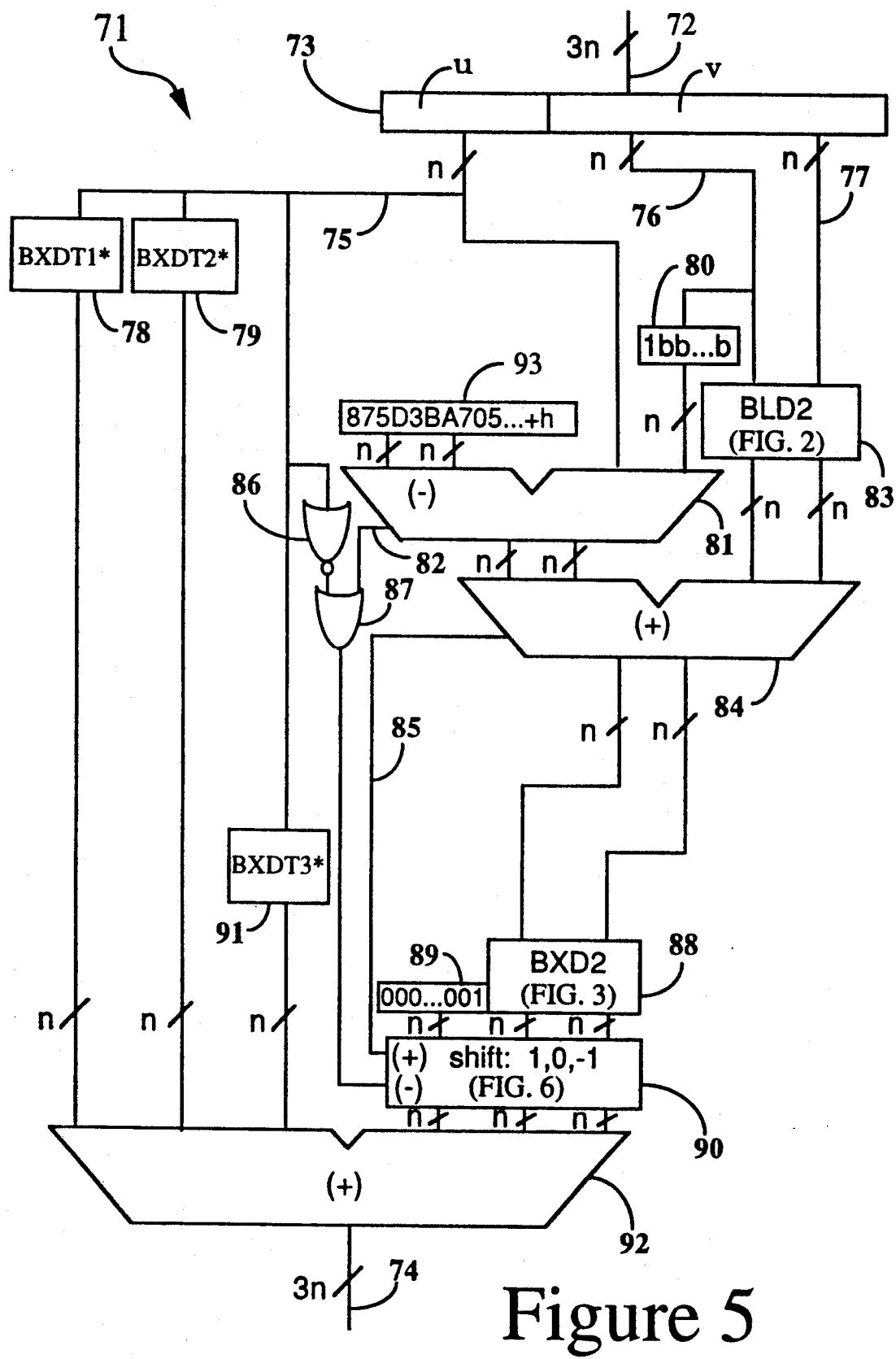
FIG. 5 is a block diagram of the general 3n-bit BXD3 generator.

Hardware BXD3 Generator. FIG. 5 shows the combinatorial flow-through organization of the general 3n-bit BXD3 function generator 71 comprising an at least 3n-bit input first data bus 72 coupled to a partitioning means 73. The partitioning means 73 partitions the MS 3n bits of the input first data bus 72 into three n-bit data busses, which are a most significant (MS) second bus 75, a next most significant (NS) third bus 76, and a least significant (LS) fourth bus 77. The second bus line 75 is coupled to the inputs of the first, second, and third look-up tables 78 (BXDT1*), 79 (BXDT2*), and 91 (BXDT3*), respectively.

The third and fourth busses 76 and 77, respectively, are coupled to the MS and LS n-bit inputs of a 2n-bit BLD2 function generator 83 (FIG. 2). The 2n-bit output of the BLD2 function generator 83 is coupled to a first input of a 2n-bit first adder 84. The MS n−1 bits of the n-bit NS third bus 76 are coupled to the input of a first element 80. The n-bit output of the first element 80 is simply a MS fixed constant 1-bit concatenated with the (n−1)-bit input of the first element 80. The output of the first element 80 is coupled to the LS n-bit input of the first port of a 2n-bit subtracter 81. The second bus 75 is coupled to the MS n-bit input of the first port of the 2n-bit subtracter 81. The input bits of the second port of the subtracter 81 are determined by a fixed value input from a second element 93, which is set to the 2n-bit constant fraction Q12+h (a 2n-bit approximation of the constant fraction Q=blg blg e=0.875D3BA705...$_{16}$ incremented by h). The 2n-bit output of the subtracter 81 is coupled to the second input of the 2n-bit first adder 84. The 2n-bit output of the first adder 84 is coupled to the input of a 2n-bit BXD2 function generator 88 (FIG. 3).

The n-bit second bus 75 is coupled to the inputs of a nonzero-detector n-input NOR gate 86. The output of the NOR gate 86 is coupled to a first input of a 2-input OR gate 87. The carry-out borrow 82 of the subtracter 81 is coupled to the second input of the OR gate 87. The output of the OR gate 87 is coupled to the (−) control input of a 3n-bit shifter 90. The carry-out 85 from the first adder 84 is coupled to the (+) control input of the shifter 90.

The 2n-bit output of the BXD2 function generator 88 is coupled to the LS 2n-bit input of the 3n-bit shifter 90. The MS n-bit input of the shift 90 is determined by a fixed value input from a third element 89, which clears the MS n−1 bits all to 0s and sets the LS bit to 1. The (+) and (−) control inputs of the shifter 90 determine the 1, 0, or −1 bit places of shifting of the 3n-bit output of the shifter 90. The output of the shifter 90 is coupled to a first input of a 3n-bit second adder 92. The n-bit outputs of the first, second, and third look-up tables 78, 79, and 91, respectively are coupled to the MS, NS, and LS n-bit inputs, respectively, of the second port of the 3n-bit second adder 92 wherein they constitute a 3n-bit approximation of the unsigned fraction value {bxd(u−h)} wherein u is the n-bit fraction value of the n-bit second bus 75. The 3n-bit output of the second adder 92 constitutes the output of the 3n-bit BXD3 function generator 71.

Improved Speed and Economy. The speed and economy may be improved by narrowing the 3n-bit width of the shifter 90 for including only its LS 2n+1 input bits, thereby producing only 2n+2 output bits coupled to a reduced-width (2n+2)-bit second adder 92, and by standard techniques propagating the carry-out from such a narrowed second adder 92 across the balance of the MS n−2 output bits of the first look-up table 78 (BXDT1*).

Improved Precision. Improved precision is provided by extending by about 1-5 low-order guard bits the bit-widths of the Q12 value of the second element 93, the outputs of the third look-up table 91 (BXDT3*), the BLD2 function generator 83, the first element 80, and the inputs and outputs of the BXD2 function generator 88, the subtracter 81, the first and second adders 84 and 92, respectively, and the shifter 90.

Memory Error Correction. Standard (comparatively expensive) techniques can incorporate memory error correction into the basic memory access cycle, thereby providing correction of both data and retrieved table entries without any further delay.

However, if a minor delay can be tolerated when an error in a looked-up value is detected (e.g., by incorporating economical parity checking) in the above BLD2, BXD2, BLD3, and BXD3 generators diagrammed in FIGS. 2–5, respectively, then according to the invention such unusable values can be replaced with adequate approximations of their correct values from the following relations when $u \neq 0$:

$$BLDT1^*(u) = BLDT1(u-h), \qquad (55)$$

$$BXDT1^*(u) = BXDT1(u-h), \qquad (56)$$

$$BLDT12^*(u) \approx BLD2(u-h), \qquad (57)$$

$$BXDT12^*(u) \approx BXD2(u-h), \qquad (58)$$

$$BLDT123^*(u) \approx BLD3(u-h), \qquad (59)$$

$$BXDT123^*(u) \approx BXD3(u-h). \qquad (60)$$

For the singular cases when $u=0$ there is $$BLDT1^*(0) = BLDT1(1-2h), \qquad (61)$$

$$BXDT1^*(0) = \tfrac{1}{2} + \tfrac{1}{2}BXDT1(1-h), \qquad (62)$$

$$BLDT12^*(0) \approx BLD2(1-2h), \qquad (63)$$

$$BXDT12^*(0) \approx \tfrac{1}{2} + \tfrac{1}{2}BXD2(1-h), \qquad (64)$$

$$BLDT123^*(0) \approx BLD3(1-2h), \qquad (65)$$

$$BXDT123^*(0) \approx \tfrac{1}{2} + \tfrac{1}{2}BXD3(1-h). \qquad (66)$$

These substitutions require that all other pending data values be saved during the reconfiguration generating such replacements. One of ordinary skill in the art can readily observe that only a few additional latches, data registers, subtracters, multiplexers, and data busses, etc. are needed to implement such reconfiguration capabilities. Thus, even for tables of only moderate size, the cost of this error correction is minor compared with the cost of the tables. Furthermore, there is a delay only when such an error is detected. At worst, this delay is then no more than an additional function generation time.

As should be clear to one of ordinary skill in the art, such substitutions are particularly easy for general classes of evenly spaced table look-up values. Thus this technique for error correction is substantially general.

Reduced Delay for Error Correction. The maximum delay in a generation of BLD3(u+hv) usually occurs when an error is detected in the looked-up value BLDT123*(u) with generation of BLD3(u−h) providing an approximate replacement value. The generation of BLD3(u−h) looks up the value BLDT123*(u−h). Therefore, standard techniques for interleaving memory can provide simultaneous look-up for these adjacent values, thereby reducing the maximum delay.

Function Generation by Semi-Direct Table Look-up

Figure 7:
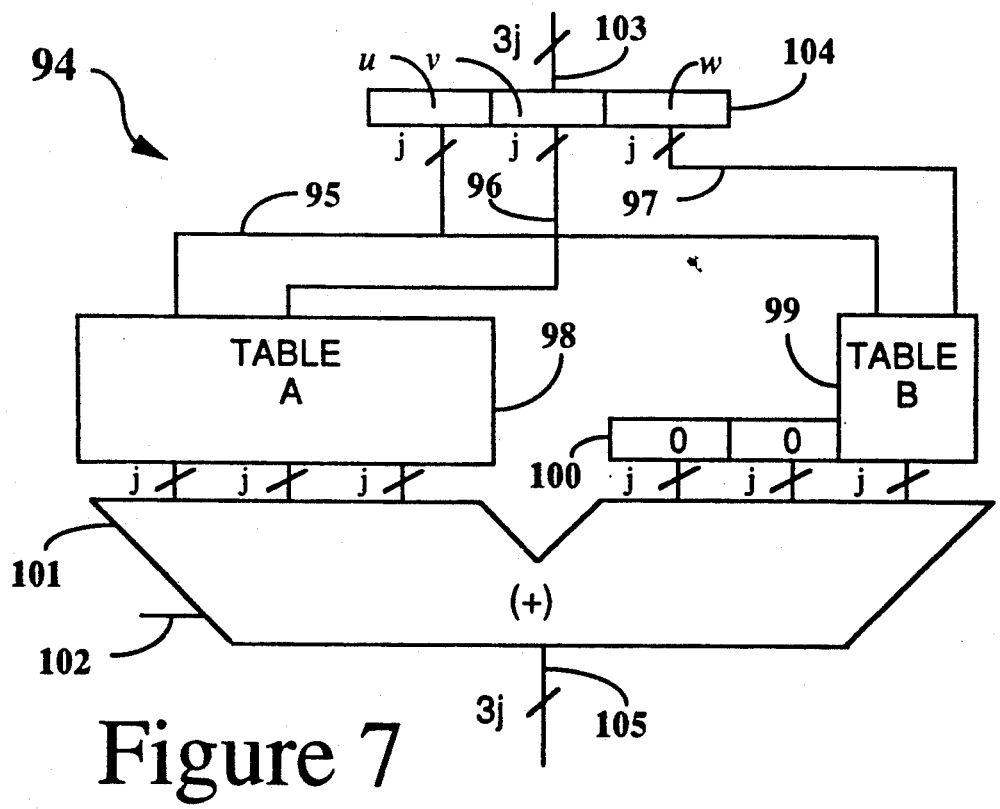
FIG. 7 is a block diagram of a general-purpose function generator employing compact look-up tables and an interpolation wherein, according to the invention, the left-right variable shifting of the interpolation computation is incorporated into a direct table look-up operation.

Introduction. TABLE B in FIG. 7 provides by direct table look-up function corresponding to an approximation of the function provided by the following group of connected elements in FIG. 1 as described above: the generator of log $f^{*'}$ 207, the data bus 210, the generator of the modified logarithmic (log*) function 208, the data bus 211, the adder 212, the data bus 213, and the antilogarithm generator 214. Thus, according to the invention, the left-right shifting is eliminated by incorporation into a direct table look-up.

The accompanying equations in this section describe a generalized operation of the invention. Special cases of the underlying concept are described and shown in the detailed examples which follow.

According to one aspect of the invention, semi-direct table look-up techniques are employed which include at least two look-ups in tables of comparatively sparse entry values and at least one addition to attain results rapidly as compared to direct computation and accurately as compared to direct look-up in tables of dense entry values.

Two or more look-up indices are assembled as arrangements of particular combinations of different "species" of digits, i.e., the digits of different portions of the argument input value instead of making the whole input value into a single look-up index, as is necessary in direct look-up. An index assembled from two different portions is thus a "hybrid" index, while an index assembled from three or more different portions may be referred to as a "chimeric" index. Each hybrid or chimeric index thus assembled is used to address its respective particular corresponding hybrid or chimeric look-up table. The values retrieved from all of the tables are then simply summed to provide the output function value. In particular, the only left-right digit-place shifts to be performed at execution time are those corresponding to shifting specific quantities by specific constant amounts of digit-places. Hence all execution-time costs of left-right digit-place shifting can be effectively eliminated simply by hard-wiring these shifts.

The relevant partitionings of argument digits and associated general functional relations that are required in order to construct the look-up tables may be derived as follows:

$$f(x) \approx f(a + b + c), \quad |a| >> |b| >> |c| \tag{67}$$

$$\approx f(a + b) + cf'(a + b) + \frac{1}{2} c^2 f''(a + b) \tag{68}$$

$$\approx f(a + b) + cf'(d + e) + \frac{1}{2} c^2 f''(a + b) \tag{69}$$

$$\approx f(a + b) + c(f'(d) + ef''(d)) + \frac{1}{2} c^2 f''(g) \tag{70}$$

$$= f(a + b) + cf'(d) + cef''(d) + \frac{1}{2} c^2 f''(g) \tag{71}$$

wherein $f(x)$ is a function of restricted range with $f'(x)$ and $f''(x)$, respectively, as first and second derivatives of restricted magnitude; a, b, c, d, e and g represent the values of individual portions of the digits of the radix-r quantity x. [In particular, the radix r or the digits may be signed. Moreover, hardware implementations may employ multi-valued logic operating on physical signals of more than two levels. For clarity, however, the following description and examples use quantities represented in terms of unsigned digits and an unsigned radix.]

The first, second, third and fourth terms of the right hand side of (71) may be referred to, respectively, as the main value and the primary, secondary and tertiary corrections in the interpolation computation.

The foregoing relations (67)–(71), as well as further ones, may be written in the following clearer alternative form:

$$f(x) = f(u_1 + h_1(v_1 + h_2 w_1)) \tag{72}$$

$$= f(u_1 + h_1 v_1) + h_1 h_2 w_1) \tag{73}$$

$$\approx f(u_1 + h_1 v_1) + h_1 h_2 w_1 f'(u_1 + h_1 v_1) + \tag{74}$$

$$(h_1 h_2)^2 w_1^2 \frac{1}{2} f''(u_1 + h_1 v_1)$$

$$= f(u_1 + h_1 v_1) + h_1 h_2 w_1 f'(u_2 + h_3 v_2) + \tag{75}$$

$$(h_1 h_2)^2 w_1^2 \frac{1}{2} f''(u_1 + h_1 v_1)$$

$$\approx f(u_1 + h_1 v_1) + h_1 h_2 w_1 (f'(u_2) + h_3 v_2 f''(u_2)) + \tag{76}$$

$$(h_1 h_2)^2 w_1^2 \frac{1}{2} f''(u_1 + h_1 v_1)$$

$$= f(u_1 + h_1 v_1) + h_1 h_2 w_1 f'(u_2) + h_1 h_2 h_3 w_1 v_2 f''(u_2) + \tag{77}$$

$$(h_1 h_2)^2 w_1^2 \frac{1}{2} f''(u_1 + h_1 v_1)$$

$$\approx f(u_1 + h_1 v_1) + h_1 h_2 w_1 f'(u_2) + h_1 h_2 h_3 w_1^* v_2^* f''(u_2^*) + \tag{78}$$

$$(h_1 h_2)^2 w_2^2 \frac{1}{2} f''(u_3)$$

$$\approx f(u_1 + h_1 v_1) + h_1 h_2 w_1 f'(u_2) + h_1 h_2 h_3 w_1^* v_2^* f''(u_2^*). \tag{79}$$

$$|h_1 h_2| << |h_3|$$

wherein $f(x)$ is a function of restricted range with $f'(x)$ and $f''(x)$, respectively, as first and second derivatives of restricted magnitude; x, $u_1$, $u_2$, $u_3$, $v_1$, $v_2$, $w_1$, and $w_2$ are unsigned fractions; $|h_i| = r^{-j_i} << 1$ for positive integers $j_1$, $j_2$, $j_3$, m, and $n = j_1 + j_2 + m$; x is an n-digit radix-r argument partitioned into a dominant portion $u_1 + h_1 v_1$ and an adjunct portion $w_1$; the dominant portion is further partitioned into a primary dominant portion $u_1$ and a secondary dominant portion $v_1$; quantities $u_1$, $v_1$, and $w_1$ possess, respectively, $j_1$, $j_2$, and m digits. The first, second and third terms of the right hand side of (79) may be referred to, respectively, as the main value and the primary and secondary corrections in the interpolation.

The most significant $(j_1 + j_2)$-digit portion of x, corresponding to $u_1 + h_1 v_1$, is also partitioned into the two quantities $u_2$ and $v_2$ possessing $j_3$ and $j_1 + j_2 - j_3$ digits, respectively. The starred quantities represent the most significant portions of their respective unstarred counterparts. Similarly, quantities $w_2$ and $u_3$ in the fourth term of (78) are merely the most significant portions of $w_1$ and $u_1 + h_1 v_1$, respectively.

The value of each term is retrieved from its own look-up table as a function of its independent variables by addressing the look-up table with an index assembled as an arrangement of the relevant portions of its independent variables. The first two terms, i.e., the main value together with the primary correction, typically generate nearly all of the digits of the output. Thus only these two tables and their respective addressing indices are sufficient in many applications. The third term, i.e, the secondary correction, helps provide a few guard digits with an economical look-up table of constant size when maximum precision for a given total table size is desired. Only very few significant digits of the third or fourth terms are needed when $f''(u)$ is of moderate magnitude. Therefore, very few of the most significant digits of each independent variable need contribute to the addressing indices for the look-up tables for these latter two terms.

The fourth term may be required to supplement the third term in providing the guard digits unless $|h_1h_2|<<|h_3|$. In the better designs, however, there usually is $j_1 \approx j_2 \approx j_3 \approx m$ which eliminates the need for the fourth term. Total table costs are minimized when $u_1$, $v_1$, and $w_1$ all have similar digit-widths in the nominal case wherein $0 \leq f'(u) < 1$ and the magnitude of $f''(u)$ is not too large.

A General Example. Referring to FIG. 7, there is shown a simple machine for performing certain functions in accordance with the invention. The functions are typically limited to restricted-range general differentiable functions possessing derivatives of restricted magnitude. A generalized semi-direct look-up table function generator 94 comprises an input data bus 103 coupled to a partitioning means 104. The partitioning means 104 partitions the signal lines of the input data bus 103 into the following three data busses: a most significant (MS)(primary dominant) second bus 95, a next most significant (NS) secondary dominant) third bus 96, and a next next most significant (or LS)(adjunct) fourth bus 97, respectively, with data bus values u, v, and w, respectively. The second bus 95 is coupled to the MS input digits of a first look-up table 98 (TABLE A) and to a (nominally MS) first set of input digits of a second look-up table 99 (TABLE B). The NS third bus 96 is coupled to the LS input digits of the first look-up table 98 (TABLE A). Finally, the LS fourth bus 97 is coupled to a (nominally LS) second set of input digits of the second look-up table 99 (TABLE B). The output digits of the first look-up table 98 (TABLE A) and the second look-up table 99 (TABLE B) are coupled to the inputs of a dual-input adder 101 as follows: The MS, NS and LS output digits of the first table 98 (TABLE A) are directed to the respective MS, NS and LS input digits of a first port of the adder 101. The output digits of the second look-up table 99 (TABLE B) are the result of a table look-up based on an arrangement of the digits of the MS and LS input data values u and w, respectively, on the second and fourth busses 95 and 97 respectively. The output digits of the second look-up table (TABLE B) are directed to the LS input digits of the second port of the adder 101. The MS and NS sets of digits of the second port of the adder 101 are determined by a fixed value input of an element 100, which is typically set to the constant value zero. The resultant full width of output digits 105 and the carry-out 102 of the adder 101 constitute the output digits of the function generator 94.

If desired, the first look-up table 98 (TABLE A) can be partitioned into two or more separate look-up tables (say TABLEs A1, A2, and A3) provided that the entire look-up index, i.e., both the second and the third data busses 95 and 96, respectively, are coupled to the input of each such table. This follows from the fact that each digit of output from a look-up table can be a fully independent function of the complete input addressing index.

The adder 101 is diagrammed as a full-width adder for clear illustration of the principle involved. As a practical matter, the speed and economy may be improved by instead making the adder 101 only wide enough to add the LS output digits of the first look-up table 98 (TABLE A) and the output digits from the second look-up table 99 (TABLE B). Standard techniques suffice for efficiently propagating the carry-out 102 from this addition through the balance of the output digits of the first look-up table 98 (TABLE A).

An important factor in relation to the present invention is an evaluation of the resultant total table cost. Total table costs decrease as $j_1$, $j_2$ and $m$ take on similar values in the foregoing set of equations. This circumstance may be examined further by assigning $j \equiv j_1 = j_2 = j_3 = m$ and $h \equiv h_1 = h_2 = h_3$. Then there if $f(u+hv+h^2w) \approx f(u+hv)+h^2wf'(u+hv) \approx f(u+hv)+h^2wf'(u)$ with shift factor $h = r^{-j} << 1$ wherein r is the radix of the number representation and j is a positive integer. The simplest such implementation takes the form $$f(u+hv+h^2w) \approx \text{TABLE } (f(u+hv);u+hv) + h^2\text{TABLE}(wf'(u);u+hw) \quad (80)$$

wherein $\text{TABLE}(g(x_1, x_2, \ldots); i(x_1, x_2, \ldots))$ refers to a look-up-table value providing an approximation of $g(x_1, x_2, \ldots)$ as a function of the addressing index $i(x_1, x_2, \ldots)$, wherein $i(x_1, x_2, \ldots)$ is assembled from relevant portions of the digits of $x_1, x_2, \ldots$.

The error $e_i$ in computing the correction value for the interpolation generating $f(u+hv+h^2w)$ is on the order of h, while the primary look-up $\text{TABLE}(f(u+hv); u+hv)$ as a function generator has an error $e_p$ whose magnitude cannot in general be much smaller than the effective error of its argument, which is on the order of $h^2$. The $h^2$-term of equation (80) is an interpolated correction to the look-up value $\text{TABLE}(f(u+hv);u+hv)$, which may be said to be an interpolation of order "one half" because $e_i \approx (e_p)^{\frac{1}{2}}$.

The correction value in such cases need be only about j digits wide. Thus total table costs for an n-digit function of an n-digit argument increase only about as fast as $4jr^{2j} = (4/3)nr^{2n/3}$ which leads rapidly to much more economical table sizes than that of direct look-up even for very modest values of n.

Implementation may also take the somewhat more general form.

$$f(u+hv+h^2w) \approx \text{TABLE}(f(u+hv-);u+hv)+h^2\psi r^{-\lambda}w\cdot +h^2\text{TABLE}(w(f'(u)-\psi r^{-\lambda});u+hw) \quad (81)$$

wherein $\psi$ and $\lambda$ are signed integer constants of small magnitude chosen in conjunction with $f$ such that $0 \leq f'(u) - \psi r^{-\lambda} < 1$. The multiplication $r^{-\lambda} \times w$ may be efficiently realized with only very few shifts. Similarly, the multiplication $\psi \times (r^{-\lambda}w)$ may be efficiently realized with only very few additions or subtractions. Such parameters permit a modest adjustment of the allowed range of $f'(u)$ without reducing the digit-width of w and thus sacrificing precision.

Hence, the total execution-time costs of scaling w by $r^{-\lambda}$, converting u and w into u+hw, looking up the additional look-up value, and summing the component values is often a good trade for the resulting considerable reduction in table costs.

Guard Digits. One or two low-order guard digits may be used in order to maintain as many digits of precision in the outputs as there are digits in the input. A third look-up table of constant size can help in this regard. The expansion $$f(u + hv + h^2w) \approx f(u + hv) + h^2wf'(u + hv) \quad (82)$$

$$\approx f(u + hv) + h^2w(f'(u) + hvf''(u)) \quad (83)$$

$$= f(u + hv) + h^2wf'(u) + h^3vwf''(u) \quad (84)$$

identifies the secondary correction term $h^3vwf''(u)$ which is desired. Fortunately, only a comparatively trivial approximation of this term is actually required. For example, if $|f''(u)|$ is less than or on the order of 1-2 then only the MS 1-3 digits of each of u, v, and w, i.e., their respective primitive portions $u^*$, $v^*$, and $w^*$, can be arranged into an addressing index for a look-up table providing 1-3 digits of the secondary correction $v^*w^*f''(u^*)$. Thus for a given $f''(u)$ the table size (but not its entries) for this term remains constant as the value of j changes.

The general form becomes $$f(u + hv + h^2w) \approx \text{TABLE}(f(u + hv); u + hv) +$$

$$h^2wr^{-\lambda}w + h^2\text{TABLE}(w(f'(u) - \psi r^{-\lambda}); u + hw) +$$

$$h^3\text{TABLE}(v^*w^*f''(u^*); u^* + r^{-i}v^* + r^{-2i}w^*) \quad (85)$$

wherein $1 \leq i \leq 3$ and the table entries are constructed with sufficient digit-width that the magnitude of the error of each term is less than $h^3r^{-j}$.

Change of Radix. The radix of the argument $u + hv + h^2w$ need not be the same as the radix of the generated function value. Thus radix conversion may be combined with the function generation at little or no additional table or execution-time costs. Examples include the binary-to-BCD (binary-coded decimal) conversion and its inverse.

This semi-direct table look-up form of interpolation uses only the economical fixed shifts and the fast operations look-up, addition, and subtraction and, in particular, does not require direct left-right variable shifting or multiplication operations.

Look-up Table Value Interpolation Using Direct Multiplication Operations

Figure 8:
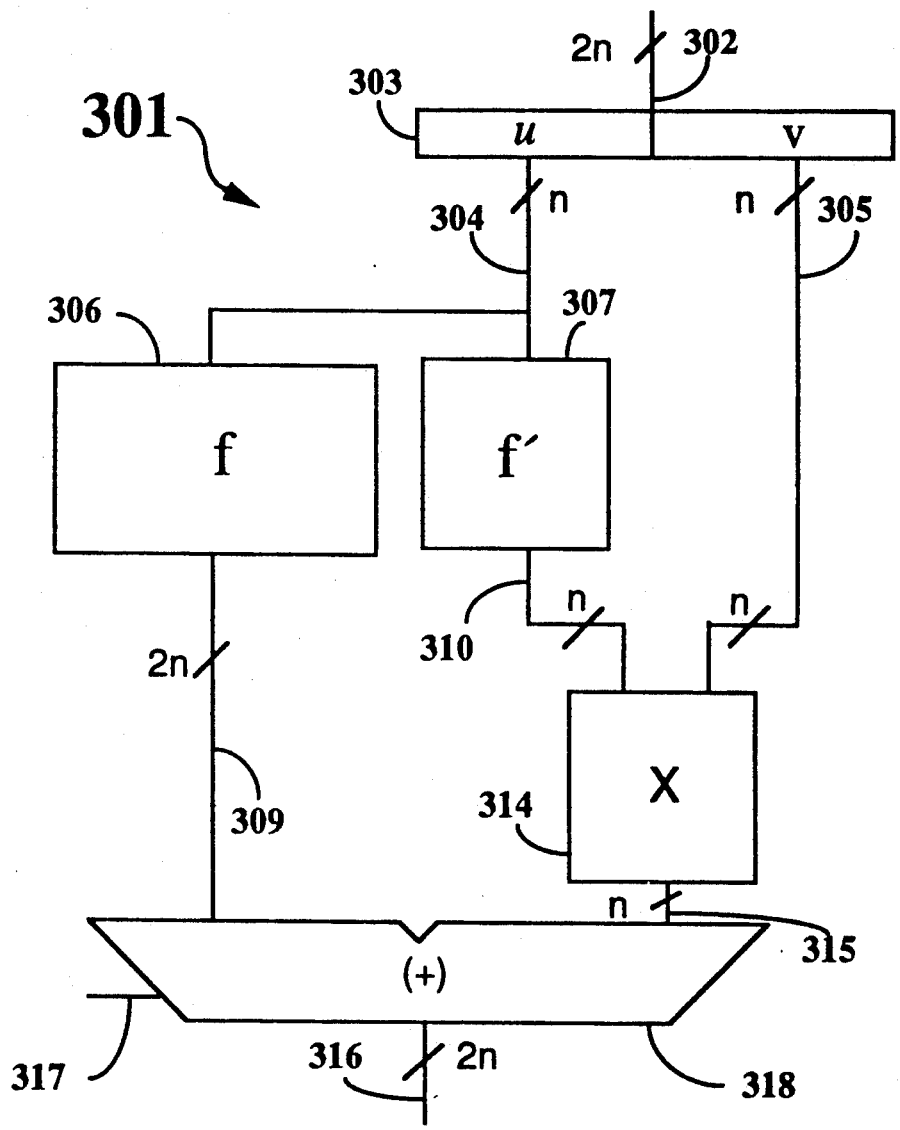
FIG. 8 is a block diagram of a general-purpose function generator employing a compact look-up table and an interpolation wherein, according to the invention, the left-right variable shifting of the interpolation computation is incorporated into a direct multiplication operation.

Introduction. When direct multiplication operations are sufficiently economical, they should not be avoided as a matter of principle. According to one aspect of the invention, the function generator 301 in FIG. 8 employing a direct multiplication operation can be equivalent to the function generator 201 in FIG. 1 as described above.

In particular, the group of connected elements consisting of the $f'$ generator 307, the data bus 310 and the multiplier 314 can incorporate all the required left-right digit-place shifting into the direct multiplier 314, thereby replacing the function provided by the following group of connected elements in the function generator 201: the log $f^{*'}$ generator 207, the data bus 210, the log* function generator 208, the data bus 211, the adder 212, the data bus 213, and the antilogarithm generator 214.

The quantities $u^*$, $v^*$, $f^*$ and $f^{*'}$ in FIG. 1 are distinguished from u, v, $f$ and $f'$, respectively, by the nonzero bias value $\xi$. However, this bias is assigned the value zero for the quantities in FIG. 8, wherein these distinctions are absent.

Basic First and Second-Order Look-up Table Value Interpolation. According to one aspect of the invention, a function generator may employ direct multiplication operations to interpolate values not found in look-up tables of comparatively sparse entry values. The following approximation of second order may be used:

$$f(x) \approx f(u + hv), |hv| < < |u|_{max} \quad (86)$$

$$\approx f(u) + hvf'(u) + h^2\frac{1}{2}v^2f''(u) \quad (87)$$

$$= f(u) + hv\left(f'(u) + hv\frac{1}{2}f''(u)\right). \quad (88)$$

Thus, for example, if $f(u)$, $\frac{1}{2}f'(u)$, and $f''(u)$ are retrieved from look-up tables as functions of an addressing index u, then approximate values of $f(u+hv)$ comparatively close to $f(u)$ can be computed using the second-order formula (88) which requires only two addition and two multiplication operations (other than the scalings by h).

Third and higher-order interpolations involve employing successively more terms in the approximating series (87).

A first-order interpolation corresponds to using only the first two terms on the right-hand side of (87), which requires only a single multiplication and a single addition. For example, a double-byte function generator——using a single multiplication operation—for execution on the Motorola 6801 microprocessor is listed hereinafter in Table 1.

A contemporaneous reference, which is not prior art and which is based on work which does not predate the continuous development of the present invention related to interpolating look-up table values using direct multiplication operations, is "An Interpolating Memory Unit for Function Evaluation: Analysis and Design," *IEEE Transactions on Computers*, March, 1989, 377-384, by A. S. Noetzel.

The foregoing techniques for function generation may be used in an exponential/logarithmic (E/L) computational system of the type described for the first time by the present inventor in the concurrently filed copending application "Method and Apparatus for Exponential/Logarithmic Computation."

Initialization of Look-Up Tables

Basic Look-up Table Initialization. When comparatively large look-up tables are required only intermittently, considerable economy and flexibility can be realized according to the invention by placing them in read-write core memory only when executing those functions which access their entries. Such tables can be copied from disk, CD-ROM, or other bulk memory.

However, evenly spaced entries may be generated faster than they can be copied. For example, a table of evenly spaced exponential function values generated according to $$t_{m+1} = axp(u_0 + (m + 1)h) \quad (89)$$

$$= axp(u_0 + mh + h) \quad (90)$$

-continued $$= (axp(u_0 + mh))axph \quad (91)$$

$$= t_m \times axph \quad (92)$$

can provide each new value at the expense of only a single multiplication operation. This multiplication may well be much faster than the value could be copied from disk or other bulk memory. Yet this method not only uses multiplication operations, but also is only an ad hoc procedure applicable only to exponential functions.

Finite-difference methods may be used in order to avoid the need for multiplication operations. In particular, an m-entry read-write memory space can be efficiently converted into a look-up table of evenly spaced values of a general differentiable function using only a very few pre-computed coefficients that are combined using but comparatively few addition operations. Thus the values required for initializing the table can be generated according to the invention as follows: Start with an initial addressing index value $x_0$ and a set of comparatively high-precision pre-calculated coefficients ($a_0$, $a_1$, $a_2$, ..., $a_K$) wherein $a_k = \Delta^k f(x_0)$ is the k-th finite-difference of a differentiable function $f(x)$ [wherein $\Delta^k f(x) \equiv \Delta^{k-1} f(x+1) - \Delta^{k-1} f(x)$ with $\Delta^0 f(x) \equiv f(x)$]. Assign initial value $x_0$ to an addressing index identified as $x_i$, and repeat the following sequence of steps m times:

1) Perform a look-up table write, addressing the look-up table with $x_i$, writing at least a most significant portion of $a_0$ as an entry.

2) Execute a succession of K additions of said coefficients, performing these additions and reassigning the values of the coefficients in the following order: $a_{K-1} = a_{K-1} + a_K$, ..., $a_2 = a_2 + a_3$, $a_1 = a_1 + a_2$, $a_0 = a_0 + a_1$.

3) Increment $x_i$.

Improved Initialization. In the foregoing table initialization, the error in succeeding values grows exponentially, which requires the use of comparatively high-precision coefficient values. Alternatively, fewer coefficients of generally less precision are required if the quantity of entries generated in a given sequence is kept comparatively short. In particular, according to the invention a long sequence of table entries can be generated as two or more shorter sequences wherein the coefficients are altered at the beginning of each shorter sequence such that the error growth during a given sequence compensates an opposing error growth of a preceding sequence.

The foregoing techniques for table initialization may be used in an exponential/logarithmic (E/L) computational system of the type described by the present inventor for the first time in the concurrently filed copending application "Method and Apparatus for Exponential/Logarithmic Computation," wherein generation of uniformly spaced table values in near real-time is desirable.

TABLE 1

© Pickett 1989

| FUNCT 3 | LDX #TABLE | (.B,A) <== f(.B,A) |
|---|---|---|
| 3 | ABX | |
| 3 | ABX | |
| 3 | ABX | |
| 4 | LDAB 2,X | |
| 10 | MUL | |
| 3 | ASLD | |
| 2 | ADCB #THRESH | |
| 2 | ANDB #1 | |
| 4 | ADCA 1,X | |
| 4 | ADCB 0,X | |

TABLE 1-continued

© Pickett 1989

| (exit) | * |
|---|---|
| ... | |
| 41 cycles | |

Function Generation on the 6801 Microprocessor

Brief Description of the 6801 Microprocessor. The Motorola 6801 microprocessor is representative of the 8-bit microprocessors possessing relatively few working registers, a few instructions which operate on 16-bit data, and a direct multiply instruction. The 6801 has two 8-bit accumulators (which a few instructions can couple into a 16-bit accumulator), one 16-bit index register, a 16-bit stack pointer, and a 16-bit program counter. Personal computers and game machines using this microprocessor are readily available. Thus easy verification is assured for the example diagrammed in Table 1 which uses the assembly language of this processor. Furthermore, the operations used in these examples are so simple that translation to virtually any other microprocessor or other data processing equipment with an unsigned multiplication capability is very direct and easy.

Basic Two-Byte Function Generator. The principle of reducing left-right shifting to a minimum and avoiding direct fixed-point multiplication operations has been used to show clearly how much new capability can be provided without such operations. Once such capabilities are understood, however, incorporation of all design alternatives are to be made according to their respective benefits relative to their costs.

In particular, the instruction of the 6801 microprocessor for a direct 8-bit $\times$ 8-bit unsigned multiplication operation can help in generating the ultra-high performance fixed-point functions which are required in an E/L processor as well as in other applications. For example, the general function generator (as in-line code) of Table 1 generates a two-byte-fraction general differentiable function $f(x)$ possessing a first derivative $f'(x)$ restricted to the interval $0 \leq f'(x) < 2$ as a function of a two-byte fractional operand x in a constant 41 machine cycles.

TABLE is the symbolic address of a three-page (i.e., $3 \times 256$ bytes) lookup table of 256 "T0, T1, T2" three-byte entries. Each of the three bytes can be viewed as separate fractional functions of their 8-bit index u, where u is the MS byte of x. However, the first two bytes are jointly defined as 
$T0(t) + hT1(t) = h^2 \quad h^{-2} f(t) + \frac{1}{2}$ and 
$T2(t) = h\frac{1}{2} \quad h^{-2}(f(t+h) - f(t)) + \frac{1}{2}$ for 
$h = 2^{-8} = 1/256$ and $t = hN$, $N = 0, 1, 2, ..., 255$. [Normal care must be taken to ensure that no value can cause overflow and roll-over.] The symbolic value THRESH is a single-byte value whose LS bit must be zero. The value for THRESH can be chosen to bias the error statistics. For example, THRESH should be close to $A2_{16}$ for $f(x) = BLDx$, while for $f(x) = BXDx$ the value should be closer to $AE_{16}$.

As a further example, this 6801 function generator can be applied to generation of the function $f(\theta) = \sin \frac{1}{2}\pi\theta$ for $0 \leq \theta < 1$.

This form of 6801 function generator using a direct multiplication operation is little if any faster than the corresponding functions generated by the Rockwell 6502 microprocessor, as described hereinafter, using E/L interpolation without any direct multiplication operation.

BLD and BXD Generation on the 6502 Microprocessor

Brief Description of the 6502 Microprocessor. The Rockwell 6502 microprocessor is representative of the 8-bit microprocessors possessing very few working registers and no direct multiply instruction. The 6502 has a single 8-bit accumulator, two 8-bit index registers, one 8-bit stack pointer, and a 16-bit program counter. Personal computers and game machines using this microprocessor are readily available. Hence easy verification is assured for the examples diagrammed in Tables 2, 3, 4-5, 6-7, and 10, which use the assembly language of this processor. Furthermore, the operations used in these examples are so simple that translation to virtually any other microprocessor or other data processing equipment is very direct and easy.

BLD1 and BXD1 on the 6502. Single-byte machine-language BLD1 and BXD1 generators are provided by direct table lookup. Two tables (0.5 kbyte) are required. Only about 4 machine cycles are required once the argument is in an index register. Each of these two functions can be derived from the other using the "byte-sized" approximation which is valid only to eight bits: $BLD1(F) \approx 1 - BXD1(1-F)$ which is equivalent to $BXD1(F) \approx 1 - BLD1(1-F)$. Thus only a single table is required. (As mentioned above, the simpler and more economical one's complement approximation of $1-f$, wherein $f$ is an unsigned fraction, actually provides a slightly more precise result than the comparatively more expensive two's-complement implementation of $1-f$.)

BLD2 and BXD2 on the 6502. Double-byte machine-language BLD2 and BXD2 generators for the Rockwell 6502 microprocessor are listed in Tables 2 and 3, respectively, which use four of the six look-up tables listed in Tables 8 and 9. Only four pages (1.0 kbyte) of tables are required to operate both BLD2 and BXD2 generators as well as both BLD1 and BXD1 generators. The close estimates of maximum execution times—41 and 38 machine cycles—included in Tables 2 and 3, respectively, show clearly that this form of evaluation of these two very desirable functions is 2-3 orders of magnitude faster than is usually done with such a microprocessor.

BLD3 and BXD3 on the 6502. Triple-byte machine-language BLD3 and BXD3 generators for the 6502 microprocessor are listed in Tables 4-5 and 6-7, respectively, which use all six of the look-up tables listed in Tables 8 and 9. A total of only six pages (1.5 kbytes) of tables are required to operate both BLD3 and BXD3 generators as well as both BLD2 and BXD2 and both BLD1 and BXD1 generators.

The source code is diagrammed in a form that is easiest to understand with the BLD2 and BXD2 operations placed wherein functionally required. The indicated timings correspond to those of in-line macros. However, if the complete macro as a single block of code is placed at each of the required locations then some of the branches will be too far away to assemble properly. Yet the indicated total execution times need not be exceeded if the various functional code segments of the BLD2 and BXD2 macros are physically distributed among the other functional code segments of BLD3 and BXD3, and a correct functional sequence of each segment is maintained.

The close estimates of maximum execution times—192 and 165 machine cycles—included in Tables 4-5 and 6-7, respectively, again show clearly that this form of evaluation of these two very desirable functions is 2-3 orders of magnitude faster than is usually done with such a microprocessor.

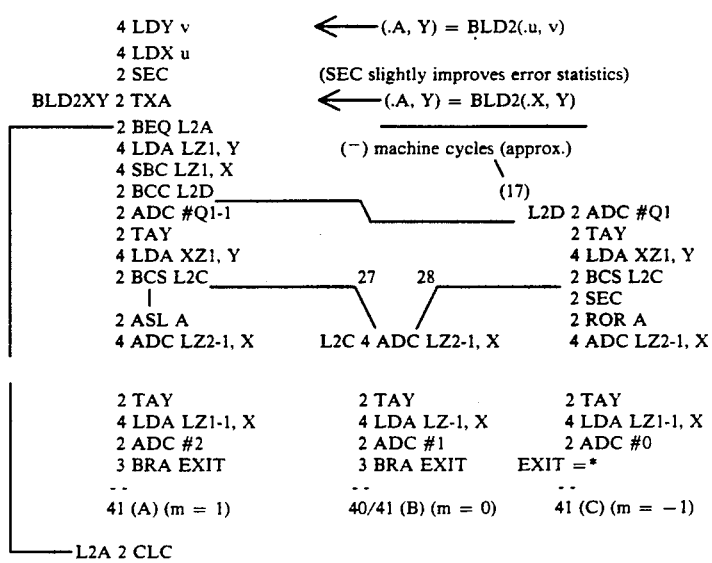

TABLE 2

© Pickett 1989

```
        4 LDY v            ←——(.A, Y) = BLD2(.u, v)
        4 LDX u
        2 SEC              (SEC slightly improves error statistics)
BLD2XY  2 TXA              ←——(.A, Y) = BLD2(.X, Y)
      ┌─2 BEQ L2A
      │ 4 LDA LZ1, Y       (⁻) machine cycles (approx.)
      │ 4 SBC LZ1, X                      \
      │ 2 BCC L2D                          (17)
      │ 2 ADC #Q1-1        _____ L2D 2 ADC #Q1
      │ 2 TAY                                   2 TAY
      │ 4 LDA XZ1, Y                            4 LDA XZ1, Y
      │ 2 BCS L2C____27    28_____  2 BCS L2C
      │    │              \    /                2 SEC
      │ 2 ASL A            \  /                 2 ROR A
      │ 4 ADC LZ2-1, X   L2C 4 ADC LZ2-1, X     4 ADC LZ2-1, X
      │
      │ 2 TAY              2 TAY                2 TAY
      │ 4 LDA LZ1-1, X     4 LDA LZ-1, X        4 LDA LZ1-1, X
      │ 2 ADC #2           2 ADC #1             2 ADC #0
      │ 3 BRA EXIT         3 BRA EXIT           EXIT =*
      │ --                 --                   --
      │ 41 (A) (m = 1)    40/41 (B) (m = 0)    41 (C) (m = −1)
      │
      └─L2A 2 CLC
```

TABLE 2-continued

© Pickett 1989

```
4 LDA LZ1, Y        =======         ========
2 ADC #Q1+1         Q1 equ $87      LZ1 equ BLDT1
2 TAY               =======         LZ2 equ BLDT2
4 LDA XZ1, Y                        XZ1 equ BXDT1
2 BCC L2B___(22)                    ========
2 ASL A
2 ADC #$8F  \___L2B 2 ADC #$8F
2 TAY               2 TAY
2 LDA #0            2 LDA #0
2 ADC #0              |
3 BRA EXIT          3 BRA EXIT
--                  --
34 (D) (m = 1)      31 (E) (m = 0)
```

TABLE 3

© Pickett 1989

```
(CLC slightly       (.A, Y) <--- BXD2(.u, v)   4 LDY v
improves error                                 4 LDA u
statistics)--------------------------------->  2 CLC
            (.A, Y)<--- BXD2(.A, Y): {BXD2AY}  2 TAX
                            (38-)              2 BEQ X2D___
                                               4 ADC LZ1, Y
                                          (11) 2 BCC X2B
                 X2B 2 SBC #Q1-2_____ 2 SBC #Q1
                     2 TAY                     2 TAY
                     4 LDA XZ1, Y              4 LDA XZ1, Y

(22)       2 BCC X2A      (22)    2 BCC X2C
X2A 2 SEC_____/    2 CLC           ___/   |
    2 ROR A              |                 2 ROL A
    4 ADC XZ2-1, X  X2C 4 ADC XZ2-1, X     4 ADC XZ2-1, X
    2 TAY               2 TAY              2 TAY
    4 LDA XZ1-1, X      4 LDA XZ1-1, X     4 LDA XZ1-1, X
    2 ADC #0            2 ADC #1           2 ADC #2
EXIT =*                 3 BRA EXIT         3 BRA EXIT
--                      --                 --
38 (C) (m = -1)         38/37 (B) (m = 0)  38 (A) (m = 1)
                    X2D 2 CLC_____
                                                    (5)
========            4 LDA LZ1, Y
LZ1 equ BLDT1       2 SBC #Q1
XZ1 equ BXDT1       2 TAY
XZ2 equ BXDT2       4 LDA XZ1, Y              machine cycles
========            2 BCS X2E___(22)            (approx.)
Q1 equ $87          2 LSR A                   /
========            2 ADC #$CF  \__X2E 2 ADC #$4F
                    2 TAY              2 TAY
                    2 LDA #0           2 LDA #0
                    3 BRA EXIT         3 BRA EXIT
                    --                 --
                    32 (E) (m = -1)    31 (D) (m = 0)
```

TABLE 4

© Pickett 1989

(.A, X, P3) ← BLD3(.P1, P2, P3): BLD3 4 LDX P2
(Part 1 of 2 Parts)                      4 LDY P3
========================                 41{BLD2XY}
"macro"      function                    2 TAX
--------     --------                    2 TYA
{BLD2XY}    (.A, Y) ← BLD2(.X, Y)        3 LDY P1
{BXD2AY}    (.A, Y) ← BXD2(.A, Y)        2 SEC
========================                 2 BEQ L3F
                                         4 SBC LZ2, Y
                                         2 TXA
<<< to Part 2 <<<_____(61)          4 SBC LZ1, Y
                                         2 TAX
                                         3 LDA P3
                       (78) 2 BCS L3C
         L3C 2 ADC #Q2-1 __/  2 ADC #Q2
             3 STA P3          3 STA P3
             2 TXA             2 TXA
             2 ADC #Q1         2 ADC #Q1
         (90)  2 BCS L3A (89)  2 BCS L3D
L3A 2 TAX __/   L3D 2 TAX __/   2 TAX
    4 LDA XZ1, X    4 LDA XZ1, X   4 LDA XZ1, X
    |               2 SEC          2 SEC
    |               2 ROR A        2 ROR A
    2 CLC           |              2 LSR A
    3 ADC P3        3 ADC P3       3 ADC P3
    2 TAY           2 TAY          2 TAY
    2 TXA           2 TXA          2 TXA
    2 ADC #1        2 ADC #0       2 ADC #0
    |       (111)   |       (112)  2 BCS L3E
L3B 38{BXDAY}__/  L3E 38{BXDAY}__/ 38{BXDAY}
    3 STA P2        |              2 SEC
    2 TYA           |              2 TAX
    2 ASL A         |              2 ROR A
    5 ROL P2        2 TAX          2 TAX
    |               2 TYA          2 TYA
                                   2 ROR A 3 LDY P1        3 LDY P1       3 LDY P1
    4 ADC LZ3-1, Y  4 ADC LZ3-1, Y 4 ADC LZ3-1, Y 3 STA P3        3 STA P3       3 STA P3
    3 LDA P2        2 TXA          2 TXA
    4 ADC LZ2-1, Y  2 ADC LZ2-1, Y 4 ADC LZ2-1, Y 2 TAX           2 TAX          2 TAX
    4 LDA LZ1-1, Y  4 LDA LZ1-1, Y 4 LDA LZ1-1, Y 2 ADC #2        2 ADC #1       2 ADC #0
    6 RTS           6 RTS          6 RTS
    ---             ---            ---
    192 cycles      178 cycles     191 cycles
    (m = 1)         (m = 0)        (m = -1)

TABLE 5

© Pickett 1989

(.A, X, P3) ← BLD3(.P1, P2, P3) (Part 2 of 2 Parts)
>>>from Part 1>>>_L3F 2 ADC #QL2-1
                  (61)   2 TAY
                         2 TXA
========                 2 ADC #QL1
LZ1 equ BLDT1            2 TAX
LZ2 equ BLDT2            2 TYA
LZ3 equ BLDT3            2 BCC L3G (76)
========                 38{BXDAY}__\_L3G 38{BXDAY}
L1Z equ $FE              3 STA P2              |
L2Z equ $8D              2 TYA                 |
L3Z equ $F2              2 ASL A               |
========                 5 ROL P2              2 TAX
QL1 equ $88              |                     2 TYA
QL2 equ $CF              |                     |
========                 |                     |

TABLE 5-continued

© Pickett 1989

Q1 equ $87      4 ADC #L3Z       4 ADC #L3Z
Q2 equ $5D      3 STA P3         3 STA P3
========        2 LDA P2         2 TXA
                2 ADC #L2Z       4 ADC #L2Z
                2 TAX            2 TAX
                4 LDA #L1Z+1     4 LDA #L1Z
                2 ADC #2         2 ADC #1
                6 RTS            6 RTS
                ---              ---
                150 cycles       145 cycles
                (m = 1)          (m = 0)

TABLE 6

© Pickett 1989

BXD3 4 LDX P2  (.A, X, P3) ← BXD3(.P1, P2, P3)
     4 LDY P3           (Part 1 of 2 Parts)
     41{BLD2XY}  ========================
     3 STA P3   "macro"     function
     2 TYA      --------    --------
     5 LSR P2   {BLD2XY}    (.A, Y) ← BLD2(.X, Y)
     3 ADC P2   {BXD2AY}    (.A, Y) ← BXD2(.A, Y)
     2 TAY      ========================
     3 LDA P1
     2 BEQ X3CX____>>> to Part 2 >>>
     3 ADC P3     (68)            ========
     2 TAX                        XZ1 equ BXDT1
     2 TYA                        XZ2 equ BXDT2
     2 BCC X3D___(77)             XZ3 equ BXDT3
     2 ADC #Q2NH-1\_X3D 2 ADC #Q2NH ========
     2 TAY           2 TAY        Q1NH equ $79
     2 TXA           2 TXA        Q2NH equ $23
     2 ADC *Q1NH     2 ADC *Q1NH  ========
     2 BCS X3E_(85)  2 BCS X3F_(86)
     38{BXD2AY}\_X3E 38{BXD2AY}\_X3F 38{BXD2AY}
     |               |              2 SEC
     |               |              2 ROR A
     3 STA P2        2 TAX          2 TAX
     2 TYA           2 TYA          2 TYA
     2 ASL A         2 TYA          2 TYA
     5 ROL P2        2 CLC          2 ROR A
     3 LDY P1        3 LDY P1       3 LDY P1
     4 ADC XZ3-1, Y  4 ADC LZ3-1, Y 4 ADC
                                    LZ3-1, Y
     3 STA P3        3 STA P3       3 STA P3
     3 LDA P2        2 TXA          2 TXA
     4 ADC XZ2-1, Y  4 ADC XZ2-1, Y 4 ADC
                                    XZ2-1, Y
     2 TAX           2 TAX          2 TAX
     4 LDA LZ1-1, Y  4 LDA XZ1-1, Y 4 LDA
                                    XZ1-1, Y
     2 ADC #1        2 ADC #1       2 ADC #0
     6 RTS           6 RTS          6 RTS
     ---             ---            ---
     165 cycles      159 cycles     164 cycles
     (m = 1)         (m = 0)        (m = -1)

TABLE 7

© Pickett 1989

(.A, X, P3) ← BXD3(.P1, P2, P3) (Part 2 of 2 Parts)
>>> from Part 1 >>>___X3C3 ADC P3    ========
                   (68)    2 TAX     X1Z equ $FF
                           2 TYA     X2Z equ $4E
                   (78)_2 BCS X3A    X3Z equ $CB
X3A 2 ADC #Q2NH-1__/  2 ADC #Q2NH    ========
    2 TAX             2 TAX
    2 TYA             2 TYA
    2 ADC #Q1NH       2 ADC #Q1NH
    |         (88)    2 BCS X3B
X3B 38{BXD2AY}___/    38 {BXD2AY}
    |                 2 SEC
    |                 2 ROR A

TABLE 7-continued

© Pickett 1989

| | |
|---|---|
| 2 TAX | 2 TAX |
| 2 TYA | 2 TYa |
|  | 2 ROR A |
| | | | |
| 2 ADC #X3Z | 2 ADC #X3Z |
| 3 STA P3 | 3 STA P3 |
| 2 TXA | 2 TXA |
| 4 ADC #X2Z | 4 ADC #X2Z |
| 2 TAX | 2 TAX |
| 4 LDA #X1Z | 4 LDA #X1Z |
| 2 ADC #1 | 2 ADC #0 |
| 5 RTS | 6 RTS |
| --- | --- |
| 149 cycles (m = 0) | 156 cycles (m = −1) |

TABLE 8

| table | addr | 00 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| BLDT1 | xx00 | 00 | 01 | 02 | 0.4 | 05 | 07 | 08 | 09 | 0B | 0C | 0E | 0F | 10 | 12 | 13 | 15 |
| | xx10 | 16 | 17 | 19 | 1A | 1B | 1D | 1E | 1F | 21 | 22 | 23 | 25 | 26 | 27 | 28 | 2A |
| | xx20 | 2B | 2C | 2E | 2F | 30 | 31 | 33 | 34 | 35 | 36 | 38 | 39 | 3A | 3B | 3D | 3E |
| | xx30 | 3F | 40 | 41 | 43 | 44 | 45 | 46 | 47 | 49 | 4A | 4B | 4C | 4D | 4E | 50 | 51 |
| | xx40 | 52 | 53 | 54 | 55 | 57 | 58 | 59 | 5A | 5B | 5C | 5D | 5E | 60 | 61 | 62 | 63 |
| | xx50 | 64 | 65 | 66 | 67 | 68 | 69 | 6A | 6C | 6D | 6E | 6F | 70 | 71 | 72 | 73 | 74 |
| | xx60 | 75 | 76 | 77 | 78 | 79 | 7A | 7B | 7C | 7D | 7E | 7F | 80 | 81 | 83 | 84 | 85 |
| | xx70 | 86 | 87 | 88 | 89 | 8A | 8B | 8C | 8C | 8D | 8E | 8F | 90 | 91 | 92 | 93 | 94 |
| | xx80 | 95 | 96 | 97 | 98 | 99 | 9A | 9B | 9C | 9D | 9E | 9F | A0 | A1 | A2 | A2 | A3 |
| | xx90 | A4 | A5 | A6 | A7 | A8 | A9 | AA | AB | AC | AD | AD | AE | AF | B0 | B1 | B2 |
| | xxA0 | B3 | B4 | B5 | B5 | B6 | B7 | B8 | B9 | BA | BB | BC | BC | BD | BE | BF | C0 |
| | xxB0 | C1 | C2 | C2 | C3 | C4 | C5 | C6 | C7 | C8 | C8 | C9 | CA | CB | CC | CD | CD |
| | xxC0 | CE | CF | D0 | D1 | D1 | D2 | D3 | D4 | D5 | D6 | D6 | D7 | D8 | D9 | DA | DA |
| | xxD0 | DB | DC | DD | DE | DE | DF | E0 | E1 | E1 | E2 | E3 | E4 | E5 | E5 | E6 | E7 |
| | xxE0 | E8 | E8 | E9 | EA | EB | EB | EC | ED | EE | EF | EF | F0 | F1 | F2 | F2 | F3 |
| | xxF0 | F4 | F5 | F5 | F6 | F7 | F7 | F8 | F9 | FA | FA | FB | FC | FD | FD | FE | FF |
| BLDT2 | xx00 | 00 | 70 | DF | 4D | B9 | 24 | 8E | F6 | 5D | C2 | 26 | 89 | EB | 4B | AA | 07 |
| | xx10 | 63 | BE | 18 | 71 | C8 | 1E | 72 | C6 | 18 | 69 | B9 | 08 | 55 | A2 | ED | 37 |
| | xx20 | 80 | C7 | 0E | 53 | 98 | DB | 1D | 5E | 9E | DD | 1B | 58 | 93 | CE | 08 | 40 |
| | xx30 | 78 | AE | E4 | 18 | 4C | 7E | B0 | E0 | 10 | 3E | 6C | 98 | C4 | EF | 19 | 41 |
| | xx40 | 69 | 90 | B6 | DC | 00 | 23 | 46 | 67 | 88 | A8 | C7 | E5 | 02 | 1E | 3A | 55 |
| | xx50 | 6E | 87 | A0 | B7 | CD | E3 | F8 | 0C | 1F | 32 | 43 | 54 | 64 | 74 | 82 | 90 |
| | xx60 | 9D | A9 | B4 | BF | C9 | D2 | DB | E3 | EA | F0 | F5 | FA | FE | 02 | 04 | 06 |
| | xx70 | 08 | 08 | 08 | 07 | 06 | 04 | 01 | FD | F9 | F4 | EF | E8 | E2 | DA | D2 | C9 |
| | xx80 | C0 | B6 | AB | 9F | 93 | 87 | 79 | 6C | 5D | 4E | 3E | 2E | 1D | 0B | F9 | E7 |
| | xx90 | D3 | BF | AB | 96 | 80 | 6A | 53 | 3C | 24 | 0B | F2 | D8 | BE | A3 | 88 | 6C |
| | xxA0 | 50 | 33 | 15 | F7 | D8 | B9 | 99 | 79 | 58 | 37 | 15 | F3 | D0 | AD | 89 | 65 |
| | xxB0 | 40 | 1A | F5 | CE | A7 | 80 | 58 | 30 | 07 | DD | B3 | 89 | 5E | 33 | 07 | DB |
| | xxC0 | AE | 81 | 53 | 25 | F7 | C8 | 98 | 68 | 38 | 07 | D6 | A4 | 72 | 3F | 0C | D8 |
| | xxD0 | A4 | 70 | 3B | 05 | D0 | 9A | 63 | 2C | F4 | BC | 84 | 4B | 12 | D9 | 9F | 64 |
| | xxE0 | 29 | EE | B3 | 77 | 3A | FD | C0 | 82 | 44 | 06 | C7 | 88 | 48 | 08 | C8 | 87 |
| | xxF0 | 46 | 04 | C2 | 80 | 3D | FA | B7 | 73 | 2F | EA | A5 | 60 | 1A | D4 | 8D | 47 |
| BLDT3 | xx00 | 00 | 9C | CA | 8C | E5 | D8 | 68 | 98 | 69 | DF | FD | C4 | 38 | 5B | 2F | B8 |
| | xx10 | F6 | EE | A1 | 11 | 42 | 34 | EC | 6A | B1 | C3 | A3 | 52 | D3 | 28 | 53 | 57 |
| | xx20 | 34 | ED | 85 | FD | 57 | 95 | BA | C6 | BC | 9E | 6D | 2C | DC | 7F | 17 | A6 |
| | xx30 | 2D | AE | 2B | A5 | 1F | 99 | 16 | 97 | 1E | AC | 43 | E5 | 93 | 4E | 18 | F3 |
| | xx40 | E1 | E2 | F7 | 24 | 68 | C6 | 3F | D4 | 87 | 58 | 4A | 5E | 95 | F0 | 71 | 19 |
| | xx50 | EA | E4 | 08 | 59 | D8 | 85 | 61 | 6F | AF | 23 | CB | A9 | BE | 0B | 92 | 53 |
| | xx60 | 4F | 88 | FF | B4 | AA | E1 | 59 | 15 | 15 | 5A | E6 | B9 | D4 | 38 | E7 | E1 |
| | xx70 | 28 | BB | 9D | CE | 4F | 22 | 46 | BD | 88 | A8 | 1E | EA | 0E | 8A | 60 | 8F |
| | xx80 | 1A | 00 | 43 | E4 | E3 | 41 | FF | 1F | 9F | 83 | C9 | 74 | 83 | F9 | D4 | 17 |
| | xx90 | C2 | D5 | 52 | 3A | 8C | 4A | 74 | 0B | 11 | 85 | 68 | BB | 7F | B5 | 5C | 76 |
| | xxA0 | 04 | 06 | 7C | 69 | CB | A4 | F4 | BD | FE | B9 | ED | 9D | C7 | 6E | 91 | 31 |
| | xxB0 | 4E | EA | 05 | 9F | BA | 55 | 71 | 10 | 30 | D4 | FB | A6 | D6 | 8B | C6 | 87 |
| | xxC0 | CF | 9F | F6 | D6 | 3F | 32 | AE | B5 | 47 | 65 | 0F | 45 | 09 | 5A | 39 | A7 |
| | xxD0 | A4 | 31 | 4D | FA | 38 | 08 | 6A | 5E | E5 | FF | AD | EF | C6 | 33 | 35 | CC |
| | xxE0 | FB | C0 | 1D | 12 | 9F | C4 | 83 | DB | CD | 59 | 81 | 43 | A1 | 9B | 31 | 65 |
| | xxF0 | 35 | A3 | AF | 5A | A3 | 8C | 14 | 3C | 04 | 6D | 77 | 23 | 70 | 60 | F2 | 27 |

TABLE 9

| table | addr | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| BXDT1 | xx00 | 00 | 00 | 01 | 02 | 02 | 03 | 04 | 04 | 05 | 06 | 07 | 07 | 08 | 09 | 09 | 0A |
| | xx10 | 0B | 0C | 0C | 0D | 0E | 0E | 0F | 10 | 11 | 11 | 12 | 13 | 14 | 14 | 15 | 16 |
| | xx20 | 17 | 17 | 18 | 19 | 1A | 1A | 1B | 1C | 1D | 1E | 1E | 1F | 20 | 21 | 21 | 22 |
| | xx30 | 23 | 24 | 25 | 25 | 26 | 27 | 28 | 29 | 29 | 2A | 2B | 2C | 2D | 2D | 2E | 2F |
| | xx40 | 30 | 31 | 32 | 32 | 33 | 34 | 35 | 36 | 37 | 37 | 38 | 39 | 3A | 3B | 3C | 3D |

TABLE 9-continued

| table | addr | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| | xx50 | 3D | 3E | 3F | 40 | 41 | 42 | 43 | 43 | 44 | 45 | 46 | 47 | 48 | 49 | 4A | 4B |
| | xx60 | 4B | 4C | 4D | 4E | 4F | 50 | 51 | 52 | 53 | 54 | 55 | 56 | 56 | 57 | 58 | 59 |
| | xx70 | 5A | 5B | 5C | 5D | 5E | 5F | 60 | 61 | 62 | 63 | 64 | 65 | 66 | 67 | 68 | 69 |
| | xx80 | 6A | 6B | 6C | 6C | 6D | 6E | 6F | 70 | 71 | 72 | 73 | 74 | 75 | 77 | 78 | 79 |
| | xx90 | 7A | 7B | 7C | 7D | 7E | 7F | 80 | 81 | 82 | 83 | 84 | 85 | 86 | 87 | 88 | 89 |
| | xxA0 | 8A | 8B | 8C | 8E | 8F | 90 | 91 | 92 | 93 | 94 | 95 | 96 | 97 | 98 | 9A | 9B |
| | xxB0 | 9C | 9D | 9E | 9F | A0 | A1 | A3 | A4 | A5 | A6 | A7 | A8 | A9 | AB | AC | AD |
| | xxC0 | AE | AF | B0 | B2 | B3 | B4 | B5 | B6 | B7 | B9 | BA | BB | BC | BD | BF | C0 |
| | xxD0 | C1 | C2 | C4 | C5 | C6 | C7 | C8 | CA | CB | CC | CD | CG | D0 | D1 | D2 | D4 |
| | xxE0 | D5 | D6 | D8 | D9 | DA | DB | DD | DE | DF | E1 | E2 | E3 | E5 | E6 | E7 | E8 |
| | xxF0 | EA | EB | EC | EE | EF | F0 | F2 | F3 | F5 | F6 | F7 | F9 | FA | FB | FD | FE |
| BXDT2 | xx00 | 00 | B1 | 63 | 16 | C9 | 7D | 31 | E5 | 9B | 50 | 06 | BD | 74 | 2B | E3 | 9C |
| | xx10 | 55 | 0F | C9 | 83 | 3E | FA | B6 | 73 | 30 | ED | AB | 6A | 29 | E9 | A9 | 6A |
| | xx20 | 2B | ED | AF | 72 | 35 | F9 | BE | 82 | 48 | 0E | D5 | 9C | 63 | 2B | F4 | BD |
| | xx30 | 87 | 51 | 1C | E8 | B4 | 80 | 4D | 1B | E9 | B8 | 87 | 57 | 28 | F9 | CA | 9D |
| | xx40 | 6F | 43 | 17 | EB | C0 | 96 | 6C | 43 | 1A | F2 | CA | A4 | 7D | 57 | 32 | 0E |
| | xx50 | EA | C7 | A4 | 82 | 60 | 3F | 1F | FF | E0 | C2 | A4 | 86 | 6A | 4E | 32 | 17 |
| | xx60 | FD | E4 | CB | B2 | 9B | 84 | 6D | 57 | 42 | 2E | 1A | 07 | F4 | E2 | D1 | C0 |
| | xx70 | B0 | A1 | 92 | 84 | 76 | 6A | 5E | 52 | 47 | 3D | 34 | 2B | 23 | 1C | 15 | 0F |
| | xx80 | 09 | 05 | 01 | FD | FB | F9 | F7 | F7 | F7 | F8 | F9 | FB | FE | 02 | 06 | 0B |
| | xx90 | 11 | 17 | 1E | 26 | 2F | 38 | 42 | 4D | 58 | 64 | 71 | 7F | 8D | 9C | AC | BD |
| | xxA0 | CE | E0 | F3 | 06 | 1A | 2F | 45 | 5C | 73 | 8B | A4 | BD | D8 | F3 | 0F | 2B |
| | xxB0 | 49 | 67 | 86 | A5 | C6 | E7 | 09 | 2C | 50 | 74 | 99 | BF | E6 | 0E | 36 | 5F |
| | xxC0 | 89 | B4 | E0 | 0C | 3A | 68 | 97 | C5 | F7 | 28 | 5B | 8E | C1 | F6 | 2C | 62 |
| | xxD0 | 99 | D1 | 0A | 44 | 7F | BA | F6 | 34 | 72 | B0 | F0 | 31 | 72 | B5 | F8 | 3C |
| | xxE0 | 81 | C7 | 0E | 55 | 9E | E7 | 32 | 7D | C9 | 16 | 64 | B3 | 02 | 53 | A5 | F7 |
| | xxF0 | 4A | 9F | F4 | 4A | A1 | F9 | 52 | AC | 07 | 63 | BF | 1D | 7C | DB | 3C | 9D |
| BXDT3 | xx00 | 00 | AF | DA | 81 | A3 | 42 | 5E | F7 | 0D | A0 | B2 | 42 | 51 | DF | EC | 79 |
| | xx10 | 86 | 14 | 22 | B2 | C3 | 55 | 6B | 02 | 1D | BA | DC | 81 | AA | 59 | 8C | 45 |
| | xx20 | 83 | 48 | 93 | 65 | BE | 9F | 08 | F9 | 73 | 75 | 02 | 18 | B8 | E3 | 99 | DA |
| | xx30 | A6 | FF | E4 | 57 | 56 | E3 | FE | A7 | DF | A6 | FD | E3 | 5A | 61 | FA | 24 |
| | xx40 | E0 | 2E | 0F | 83 | 8B | 26 | 55 | 1A | 73 | 62 | E6 | 01 | B3 | FB | DC | 54 |
| | xx50 | 64 | 0D | 50 | 2C | A2 | B2 | 5D | A3 | 86 | 04 | 1E | D6 | 2B | 1E | AF | DE |
| | xx60 | AD | 1B | 29 | D8 | 27 | 17 | AA | DE | B5 | 2F | 4C | 0D | 73 | 7D | 2D | 82 |
| | xx70 | 7D | 1F | 68 | 59 | F1 | 32 | 1B | AE | EB | D1 | 63 | 9F | 88 | 1C | 5D | 4B |
| | xx80 | E6 | 2F | CD | 23 | 29 | DF | 46 | 5E | 28 | A4 | D3 | B5 | 4B | 94 | 93 |
| | xx90 | 47 | B0 | D0 | A6 | 33 | 78 | 75 | 2A | 99 | C1 | A4 | 41 | 99 | AD | 7D | 0A |
| | xxA0 | 54 | 5B | 21 | A5 | E9 | ED | B0 | 35 | 7B | 82 | 4C | D9 | 29 | 3E | 17 | B4 |
| | xxB0 | 18 | 41 | 31 | E8 | 67 | AE | BE | 98 | 3B | A8 | E1 | E5 | B5 | 52 | BB | F3 |
| | xxC0 | F9 | CE | 72 | E6 | 2B | 41 | 28 | E2 | 6F | CF | 03 | 0B | E9 | 9C | 25 | 86 |
| | xxD0 | BD | CD | B6 | 77 | 12 | 88 | D9 | 05 | 0D | F2 | B5 | 55 | D4 | 32 | 70 | 8E |
| | xxE0 | 8D | 6E | 31 | D7 | 60 | CD | 1F | 56 | 73 | 76 | 61 | 33 | EE | 92 | 1F | 97 |
| | xxF0 | FA | 48 | 82 | AA | BE | C1 | B3 | 94 | 65 | 77 | DA | 80 | 18 | A3 | 22 | 96 |

Fixed-Point Sine Function Generation

In the evaluation of fixed-point sine and cosine functions, once the usual range reduction is complete, the task remaining is to generate a reduced-range sine function such as the unsigned fraction $f(\theta) = \sin \frac{1}{2}\pi\theta$ as a function of a fixed-point unsigned fraction argument $\theta$.

Derivation of a method for generation of a two-byte binary fixed-point form of $\sin \frac{1}{2}\pi\theta$ as a function of a two-byte unsigned fraction $\theta = u^* + hv^* = u^* - h + h(1+v^*) = u + hv$, where $0 \leq v^* < 1$ and $h = 2^{-8}$, can proceed as follows.

The slope of this function ranges between zero and $\pi/2 \approx 1.57$. When the slope is not less than one, i.e., for $1 \leq \frac{1}{2}\pi \cos \frac{1}{2}\pi(u^* - h) = 1 + \alpha$ with $0 \leq \alpha < 0.57 \ldots$, there is $$\sin \frac{1}{2}\pi\theta = \sin \frac{1}{2}\pi(u^* + hv^*) \tag{93}$$

$$= \sin \frac{1}{2}\pi(u^* - h + h(1 + v^*)) \tag{94}$$

$$= \sin \frac{1}{2}\pi(u + hv) \approx \sin \frac{1}{2}\pi u + hv \frac{d}{du} \sin \frac{1}{2}\pi u \tag{95}$$

$$\approx \sin \frac{1}{2}\pi u + hv \frac{1}{2}\pi \cos \frac{1}{2}\pi u \tag{96}$$

$$= X^* + hv \frac{1}{2}\pi \cos \frac{1}{2}\pi u, \tag{97}$$

-continued $$X^* = X^*(u^*) = \sin \frac{1}{2}\pi(u^* - h)$$

$$= X^* + h(1 + v^*)(1 + \alpha), \tag{98}$$

$$0 \leq \alpha \equiv \alpha(u^*) < .57$$

$$= X^* + hbxpblg((1 + v^*)(1 + \alpha)) \tag{99}$$

$$= X^* + hbxp(blg(1 + v^*) + blg(1 + \alpha)) \tag{100}$$

$$= X^* + hbxp(BLDv^* + BLD\alpha) \tag{101}$$

$$= X^* + hbxp(BLDv^* + W), \tag{102}$$

$$0 \leq W \equiv W(u^*) = BLD\alpha < 1$$

$$= X^* + hbxp(m \cdot g), m = 0, 1; 0 \leq g < 1 \tag{103}$$

$$= X^* + h2^m bxpg \tag{104}$$

$$= X^* + h2^m(1 + BXDg). \tag{105}$$

When the slope $f'(\theta)$ is less than one, its logarithm is potentially a very negative value. Hence, addition of the fraction $blg(1+v^*) \equiv BLD v^*$ can still leave a very negative value whose exponentiation then requires considerable shifting. But when $0 \leq f'(\theta) < 1$, the logarithm of the quantity $1 + f'(\theta)$ conveniently remains a fraction, which almost completely eliminates the need for such shifting. Yet the effect of this extraneous added unit value is efficiently compensated by a separate economical subtraction. Thus evaluation may be partitioned into the two regions where this special treatment of the slope is, or is not, required. This special treatment is shown in detail hereinafter.

When the slope is less than one, i.e., for $0 \leq \frac{1}{2}\pi \cos \frac{1}{2}\pi(u^* - h) \equiv a \equiv a(u^*) < 1$, there is $$\sin \frac{1}{2} \pi \theta = \sin \frac{1}{2} \pi(u^* + hv^*) \qquad (106)$$

$$= \sin \frac{1}{2} \pi(u^* - h + h(1 + v^*)) \qquad (107)$$

$$= \sin \frac{1}{2} \pi(u + hv) \qquad (108)$$

$$\approx \sin \frac{1}{2} \pi u + hv \frac{1}{2} \pi \cos \frac{1}{2} \pi u \qquad (109)$$

$$= X^* + hv \frac{1}{2} \pi \cos \frac{1}{2} \pi u. \qquad (110)$$

$$X^* \equiv X^*(u^*) = \sin \frac{1}{2} \pi(u^* - h)$$

$$= X^* + hv\alpha, \ 0 \leq \alpha < 1$$

$$= X^* + h(1 + v^*)\alpha$$

$$= X^* + h(1 + v^*)(-1 + 1 + \alpha) \qquad (111)$$

$$= X^* - h(1 + v^*) + h(1 + v^*)(1 + \alpha) \qquad (112)$$

$$= X^* - h(1 + v^*) + hbxpblg((1 + v^*)(1 + \alpha)) \qquad (113)$$

$$\qquad (114)$$

$$= X^* - h(1 + v^*) + hbxp(blg(1 + v^*) + blg(1 + \alpha))$$

$$= X^* - h(1 + v^*) + hbxp(BLDv^* + BLD\alpha) \qquad (115)$$

$$= X^* - h(1 + v^*) + hbxp(BLDv^* + W). \qquad (116)$$

$$0 \leq W \equiv W(u^*) = BLD\alpha < 1$$

$$= X^* - h(1 + v^*) + hbxp(m \cdot g). \qquad (117)$$

$$m = 0, 1, 0 \leq g < 1$$

$$= X^* - h(1 + v^*) + h2^m bxpg \qquad (118)$$

$$= X^* - h(1 + v^*) + h2^m(1 + BXDg) \qquad (119)$$

$$= \{\{X^*\} - h(1 + v^*) + h2^m(1 + BXDg)\} \qquad (120)$$

$$= \{X - h(1 + v^*) + h2^m(1 + BXDg)\} \qquad (121)$$

$$= \{X1 + hX2 - h(1 + v^*) + h2^m(1 + BXDg)\} \qquad (122)$$

where $X1 = X1(t)$ and $X2 = X2(t)$ are defined jointly as $$X1(t) + hX2(t) = h^2 \left\lfloor h^{-2} \sin\left(\frac{1}{2}\pi t\right) + \frac{1}{2} \right\rfloor \qquad (123)$$

$$= \sin\left(\frac{1}{2}\pi t\right) + h^2 \epsilon_0, \ -\frac{1}{2} < \epsilon_0 < \frac{1}{2} \qquad (124)$$

and where $\lfloor y \rfloor$ and $\{y\}$, respectively, refer to the signed-integer and unsigned-fraction portions of y; and $t = Nh$ for $N = -1$, and $N = 0, 1, 2, \ldots$, while $(X1(t) + hX2(t) - X1(t-h) - hX2(t-h))/h < 1$. Double-wide value X is defined as $X \equiv X1 + hX2$, with $X(u^*) = \{X^*(u^*)\}$ except at $u^* = 0$. Although only the unsigned-fraction portion of $X^*(0)$ is placed in the table, its integer portion, i.e., $-1$, is compensated simply by ignoring the overflow-carry which occurs for every value of $v^*$ when $u^* = 0$. The lookup tables X, BLD, W, and BXD, are initialized with their pre-calculated values. [Any of these table values, either double-wide or single-wide, may be assembled from partial values retrieved from two or more appropriately constructed tables.]

Each function value is efficiently generated in the following steps:

1) Look up X (or construct it from individually looked-up values X1 and X2) as a function of u*, placing this value in an accumulator register R;

2) Compare u* with threshold value $u^*_t = 91_{16}$ where $u^*_t$ is the value of u* at the discontinuity in the LC table values, and if $u^*_t \leq u^*$ then subtract $h(1+v^*)$ from R;

3) Look up fraction BLD v* as a function of v*;

4) Look up fraction W as a function of u*;

5) Addition: m.g = BLD v* + W, producing fraction g and overflow-carry status m which is either 1 or 0;

6) Look up fraction BXD g as a function of g and prefix a 1-bit, producing bxp g;

7) If m = 1 then shift bxp g one bit place to the left, producing bxp(m.f); and

8) Add, modulo one (i.e., ignoring any high-order overflow-carry), the byte-aligned value h bxp(m.f) to R, producing an output function value that is good to about 13+ bits.

Using almost the same tables, an additional bit of precision is available at the cost of only modestly increased execution time. This alternative organization is based on partitioning the evaluation according to whether $v^* = 0$, $0 < v^* < \frac{1}{2}$, or $\frac{1}{2} \leq v^* < 1$. When $v^* = 0$ no interpolation is required. In the other cases, defining w as the fraction portion of 2v* and $\overline{w} \equiv 1 - w$, there are the alternatives $u^* + hv^* = u^* + h\frac{1}{2}(1 + w)$ and $u^* + hv^* = (u^* + h) - h\frac{1}{2}(1 + \overline{w})$ when there is or is not, respectively, $v^* < \frac{1}{2}$. Note that in both of these latter cases the factor of one half prevents the need for the left shift that loses a bit of precision. Evaluation can be similarly partitioned into regions where the expression for the derivative can also be put into the form $\frac{1}{2}(1 + \text{fraction})$, instead of its present 1 + fraction form, which then gains yet another bit of precision.

Table 10 lists the in-line code required for generating this function on the Rockwell 6502 microprocessor. Five pages (1.25 kbyte) of lookup tables are required although two of these (BLDT1 and BXDT1 of Tables 8 and 9, respectively) are among the basic set of tables often included in an E/L computational system. The other three are listed explicitly in hexadecimal form in Table 11. Table 12 provides an alternative LC look-up table computed from the binary logarithm of the differences in the values of the SN1 and SN2 look-up tables. The byte-sized approximation mentioned above allows BLDT1 and BXDT1 to be generated from a single table at small execution-time cost.

The close estimate of 48 machine cycles maximum execution times shows clearly that this form of generation of such a function is 2-3 orders of magnitude faster than is usually done on such a microprocessor.

TABLE 10

© Pickett 1989

```
===============
Function              table     description
(.A, Y) <— sin((.X, Y)*pi/2)   ----     ----------
                      SN1       sin table (high byte)
SINP2  2 CPX *$91     SN2       sin table (low byte)
       2 BCC S2A      LC        log cos table
  (5)  3 STY V        LZ1       equ BLDT1
       4 LDA LC, X    XZ1       equ BXDT1
       4 ADC LZ1, Y   ===============
       2 TAY          V         equ scratch store
       4 LDA XZ1, Y   ===============
       2 BCC S2G
       2 ASL A
       2 BCC S2E_____(28)
       4 ADC SN2, X              S2E 4 ADC SN2, X
       2 BCC S2B__(34)____(35)___ 2 BCS S2C
       |    S2B 2 SEC            |
       3 SBC V   S2C 3 SBC V___/  3 SBC V 2 TAY         2 TAY        2 TAY
       4 LDA SN1, X  4 LDA SN1, X 4 LDA SN1, X
       2 SBC #-3     2 SBC #-2    2 SBC #-1
       3 BRA EXIT    EXIT =*      3 BRA EXIT
       --           --           --
       47 cycles    47 cycles    48 cycles
                    S2G 4 ADC SN2, X
                        2 BCC NC1_____(24)
                        |           NC1 2 SEC
                        3 SBC V    (31)  3 SBC V
  (5)                   2 TAY            2 TAY
```

TABLE 10-continued

© Pickett 1989

```
S2A 2 CLC        4 LDA SN1, X    4 LDA SN1, X
    4 LDA LC, X  2 SBC #-1       2 SBC #0
    4 ADC LZ1, Y 3 BRA EXIT      3 BRA EXIT
    2 TAY        --              --
    4 LDA XZ1, Y 44 cycles       47 cycles
    2 BCC S2F_____(24)
    2 ASL A
    2 BCC S2D____(28)
    4 ADC SN2, X  S2D 4 ADC SN2, X   S2F 4 ADC SN2, X 2 TAY        2 TAY           2 TAY
    4 LDA SN1, X 4 LDA SN1, X    4 LDA SN1, X
    2 ADC #3     2 ADC #2        2 ADC #1
    3 BRA EXIT   3 BRA EXIT      3 BRA EXIT
    --          --              --
    42 cycles   43 cycles       39 cycles
```

TABLE 11

© Pickett 1989

| table | addr | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| SN1 | xx00 | FE | 00 | 01 | 03 | 04 | 06 | 07 | 09 | 0A | 0C | 0E | 0F | 11 | 12 | 14 | 15 |
| | xx10 | 17 | 19 | 1A | 1C | 1D | 1F | 20 | 22 | 24 | 25 | 27 | 28 | 2A | 2B | 2D | 2E |
| | xx20 | 30 | 31 | 33 | 35 | 36 | 38 | 39 | 3B | 3C | 3E | 3F | 41 | 42 | 44 | 45 | 47 |
| | xx30 | 48 | 4A | 4B | 4D | 4E | 50 | 51 | 53 | 54 | 56 | 57 | 59 | 5A | 5C | 5D | 5F |
| | xx40 | 60 | 61 | 63 | 64 | 66 | 67 | 69 | 6A | 6C | 6D | 6E | 70 | 71 | 73 | 74 | 75 |
| | xx50 | 77 | 78 | 7A | 7B | 7C | 7E | 7F | 80 | 82 | 83 | 84 | 86 | 87 | 88 | 8A | 8B |
| | xx60 | 8C | 8E | 8F | 90 | 92 | 93 | 94 | 95 | 97 | 98 | 99 | 9B | 9C | 9D | 9E | 9F |
| | xx70 | A1 | A2 | A3 | A4 | A6 | A7 | A8 | A9 | AA | AB | AD | AE | AF | B0 | B1 | B2 |
| | xx80 | B3 | B5 | B6 | B7 | B8 | B9 | BA | BB | BC | BD | BE | BF | C0 | C1 | C2 | C3 |
| | xx90 | C4 | C5 | C6 | C7 | C8 | C9 | CA | CB | CC | CD | CE | CF | D0 | D1 | D2 | D3 |
| | xxA0 | D3 | D4 | D5 | D6 | D7 | D8 | D9 | D9 | DA | DB | DC | DD | DD | DE | DF | E0 |
| | xxB0 | E1 | E1 | E2 | E3 | E3 | E4 | E5 | E6 | E6 | E7 | E8 | E8 | E9 | EA | EA | EB |
| | xxC0 | EB | EC | ED | ED | EE | EE | EF | EF | F0 | F1 | F1 | F2 | F2 | F3 | F3 | F4 |
| | xxD0 | F4 | F4 | F5 | F5 | F6 | F6 | F7 | F7 | F7 | F8 | F8 | F9 | F9 | FA | FA | FA |
| | xxE0 | FA | FB | FB | FB | FB | FC | FC | FC | FC | FD | FD | FD | FD | FE | FE | FE |
| | xxF0 | FE | FE | FE | FF | FF | FF | FF | FF | FF | FF | FF | FF | FF | FF | FF | FF |
| SN2 | xx00 | 6E | 00 | 92 | 24 | B6 | 48 | DA | 6C | FE | 90 | 21 | B3 | 44 | D5 | 66 | F7 |
| | xx10 | 87 | 18 | A8 | 38 | C7 | 56 | E5 | 74 | 02 | 90 | 1E | AB | 38 | C4 | 50 | DC |
| | xx20 | 67 | F1 | 7C | 05 | 8E | 17 | 9F | 27 | AE | 34 | BA | 3F | C3 | 47 | CB | 4D |
| | xx30 | CF | 50 | D1 | 50 | CF | 4D | CB | 48 | C3 | 3E | B9 | 32 | AA | 22 | 99 | 0F |
| | xx40 | 84 | F8 | 6B | DD | 4E | BE | 2D | 9B | 08 | 74 | DF | 49 | B2 | 1A | 80 | E6 |
| | xx50 | 4A | AD | 10 | 70 | D0 | 2F | 8C | E8 | 43 | 9C | F5 | 4C | A1 | F6 | 49 | 9A |
| | xx60 | EB | 3A | 88 | D4 | 1F | 68 | B0 | F7 | 3C | 80 | C2 | 03 | 42 | 80 | BC | F7 |
| | xx70 | 30 | 68 | 9E | D2 | 05 | 36 | 66 | 94 | C1 | EB | 14 | 3C | 62 | 86 | A8 | C9 |
| | xx80 | E8 | 05 | 20 | 3A | 52 | 68 | 7D | 8F | A0 | AF | BC | C7 | D1 | D8 | DE | E2 |
| | xx90 | E4 | E4 | E2 | DE | D9 | D1 | C7 | BC | AE | 9F | 8E | 7A | 65 | 4D | 34 | 18 |
| | xxA0 | FB | DB | BA | 96 | 70 | 48 | 1E | F2 | C4 | 94 | 62 | 2D | F7 | BE | 83 | 46 |
| | xxB0 | 07 | C6 | 82 | 3C | F4 | AA | 5E | 10 | BF | 6C | 17 | BF | 66 | 0A | AB | 4B |
| | xxC0 | E8 | 83 | 1C | B3 | 47 | D9 | 68 | F5 | 80 | 09 | 8F | 13 | 95 | 14 | 91 | 0C |
| | xxD0 | 84 | FA | 6E | DF | 4E | BA | 24 | F1 | 54 | B4 | 13 | 6E | C8 | 1F | 73 | |
| | xxE0 | C5 | 15 | 62 | AD | F5 | 3B | 7F | C0 | FE | 3B | 74 | AC | E1 | 13 | 43 | 71 |
| | xxF0 | 9C | C4 | EB | 0E | 30 | 4E | 6B | 85 | 9C | B1 | C4 | D4 | E1 | EC | F5 | FB |
| LC | xx00 | A7 | A7 | A7 | A7 | A7 | A7 | A7 | A7 | A6 | A6 | A6 | A6 | A6 | A6 | A6 | A5 |
| | xx10 | A5 | A5 | A5 | A5 | A5 | A4 | A4 | A3 | A3 | A2 | A2 | A1 | A1 | A1 | A1 | A0 |
| | xx20 | A0 | A0 | 9F | 9F | 9E | 9E | 9D | 9D | 9C | 9C | 9B | 9A | 9A | 99 | 99 | 98 |
| | xx30 | 97 | 97 | 96 | 95 | 94 | 94 | 93 | 92 | 91 | 91 | 90 | 8F | 8E | 8D | 8C | 8B |
| | xx40 | 8A | 8A | 89 | 88 | 87 | 86 | 85 | 84 | 83 | 82 | 80 | 7F | 7E | 7D | 7C | 7B |
| | xx50 | 7A | 78 | 77 | 76 | 75 | 73 | 72 | 71 | 6F | 6E | 6D | 6B | 6A | 69 | 67 | 66 |
| | xx60 | 64 | 63 | 61 | 60 | 5E | 5C | 5B | 59 | 58 | 56 | 54 | 52 | 52 | 4F | 4D | 4B |
| | xx70 | 4A | 48 | 46 | 44 | 42 | 40 | 3E | 3C | 3A | 38 | 36 | 34 | 32 | 30 | 2D | 2B |
| | xx80 | 39 | 27 | 25 | 22 | 20 | 1D | 1B | 19 | 16 | 14 | 11 | 0F | 0C | 09 | 07 | 04 |
| | xx90 | 01 | FF | FE | FD | FB | FA | F8 | F7 | F5 | F4 | F2 | F1 | EF | EE | EC | EB |
| | xxA0 | E9 | E8 | E6 | E5 | E3 | E1 | E0 | DE | DC | DB | D9 | D7 | D6 | D4 | D2 | D0 |
| | xxB0 | CE | CD | CB | C9 | C7 | C5 | C3 | C2 | C0 | BE | BC | BA | B8 | B6 | B4 | B2 |
| | xxC0 | B0 | AE | AC | AA | A8 | A5 | A3 | A1 | 9F | 9D | 9B | 98 | 96 | 94 | 92 | 8F |

TABLE 11-continued

© Pickett 1989

| table | addr | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
|  | xxD0 | 8D | 8B | 88 | 86 | 84 | 81 | 7F | 7C | 7A | 77 | 75 | 72 | 70 | 6D | 6B | 68 |
|  | xxE0 | 65 | 63 | 60 | 5D | 5B | 58 | 55 | 52 | 4F | 4D | 4A | 47 | 44 | 41 | 3E | 3B |
|  | xxF0 | 38 | 35 | 32 | 2F | 2C | 28 | 25 | 22 | 1F | 1B | 18 | 15 | 11 | 0E | 0B | 07 |

TABLE 12

© Pickett 1989

| table | addr | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| LC' | xx00 | A7 | A7 | A7 | A7 | A7 | A7 | A7 | A6 | A6 | A6 | A6 | A6 | A6 | A6 | A6 | A5 |
|  | xx10 | A5 | A5 | A5 | A4 | A4 | A4 | A4 | A3 | A3 | A3 | A2 | A2 | A1 | A1 | A1 | A0 |
|  | xx20 | A0 | 9F | 9F | 9E | 9E | 9D | 9D | 9C | 9C | 9B | 9B | 9A | 99 | 99 | 98 | 98 |
|  | xx30 | 97 | 96 | 95 | 94 | 93 | 93 | 92 | 91 | 90 | 8F | 8E | 8E | 8D | 8C | 8B |
|  | xx40 | 8A | 89 | 88 | 87 | 86 | 85 | 84 | 83 | 82 | 81 | 80 | 7F | 7E | 7D | 7B | 7A |
|  | xx50 | 79 | 78 | 77 | 75 | 74 | 73 | 71 | 70 | 6F | 6D | 6C | 6B | 69 | 68 | 66 | 65 |
|  | xx60 | 63 | 62 | 60 | 5F | 5D | 5C | 5A | 58 | 57 | 55 | 53 | 52 | 50 | 4E | 4C | 4A |
|  | xx70 | 49 | 47 | 45 | 43 | 41 | 3F | 3D | 3B | 39 | 37 | 35 | 33 | 31 | 2F | 2C | 2A |
|  | xx80 | 28 | 26 | 23 | 21 | 1F | 1C | 1A | 17 | 15 | 12 | 10 | 0D | 0B | 08 | 06 | 05 |
|  | xx90 | 00 | FF | FD | FC | FA | F9 | F8 | F6 | F5 | F3 | F2 | F0 | EF | ED | EC | EA |
|  | xxA0 | E8 | E7 | E5 | E4 | E2 | E0 | DF | DD | DB | DA | D8 | D6 | D5 | D3 | D1 | CF |
|  | xxB0 | CE | CC | CA | C8 | C6 | C4 | C3 | C1 | BF | BD | BB | B9 | B7 | B5 | B3 | B1 |
|  | xxC0 | AF | AD | AB | A9 | A7 | A4 | A2 | A0 | 9E | 9C | 9A | 97 | 95 | 93 | 91 | 8E |
|  | xxD0 | 8C | 8A | 87 | 85 | 82 | 80 | 7E | 7B | 79 | 76 | 74 | 71 | 6F | 6C | 69 | 67 |
|  | xxE0 | 64 | 61 | 5F | 5C | 59 | 56 | 54 | 51 | 4E | 4B | 48 | 45 | 42 | 3F | 3C | 39 |
|  | xxF0 | 36 | 33 | 30 | 2D | 2A | 27 | 24 | 20 | 1D | 1A | 16 | 13 | 10 | 0C | 09 | 05 |

Computer Instructions for Generating Functions

The foregoing function generators are very efficient when implemented in machine code. However, much of the execution time is still expended in retrieving and decoding the instructions. Thus, the performance can be improved by incorporating the machine code sequence for the function-generating table look-up and value interpolation into a shorter code sequence employing specialized instructions or even into a single special instruction, thereby considerably increasing the speed of the function generation.

Alternatively, special instructions for higher-order interpolation can execute as rapidly as standard machine code executes lower-order interpolation, thereby providing the economy of smaller look-up tables.

The general-purpose function-generating capability is further enhanced by allowing the generation of multiple functions from multiple look-up tables, wherein the functions and the look-up table entry values may be specified at execution time.

This generalized function-generalizing capability is particularly useful in implementing the E/L computational system described for the first time by the present inventor in the concurrently filed copending application entitled "Method and Apparatus for Exponential/Logarithmic Computation."

Figure 9A:
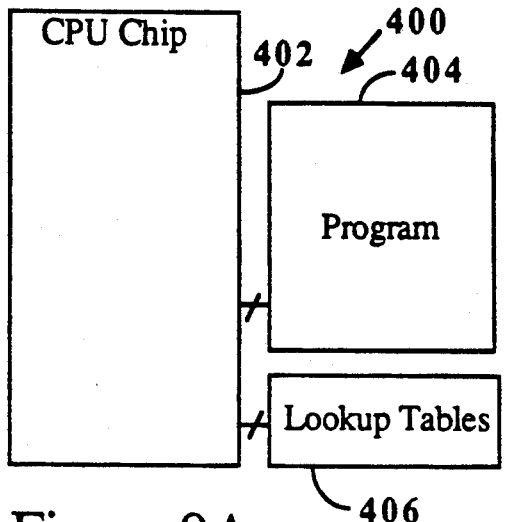
FIG. 9A is a block diagram of a first configuration for a general-purpose microprocessor employing, according to the invention, a program and look-up tables that are off-chip.

FIG. 9A is a block diagram of a first configuration 400 for a general-purpose microprocessor chip 402 employing, according to the invention, a program 404 and look-up tables 406 that are off-chip.

Figure 9B:
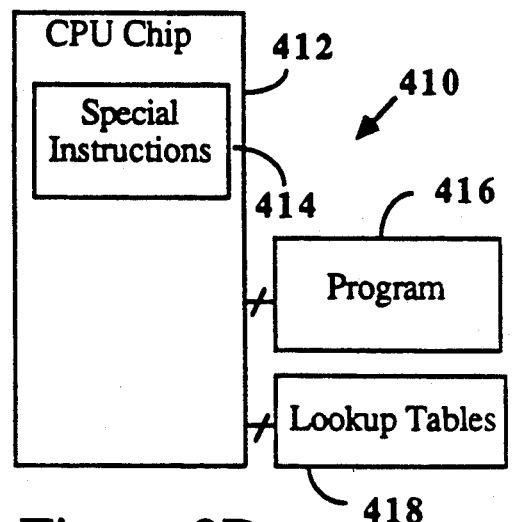
FIG. 9B is a block diagram of a second configuration for a general-purpose microprocessor employing, according to the invention, incorporated special instructions and a smaller program and look-up tables that are off-chip.

FIG. 9B is a block diagram of a second configuration 410 for a general-purpose microprocessor chip 412 employing, according to the invention, incorporated special instructions 414 which allow the program code 416 to be smaller and faster in accessing off-chip look-up tables 418.

Figure 9C:
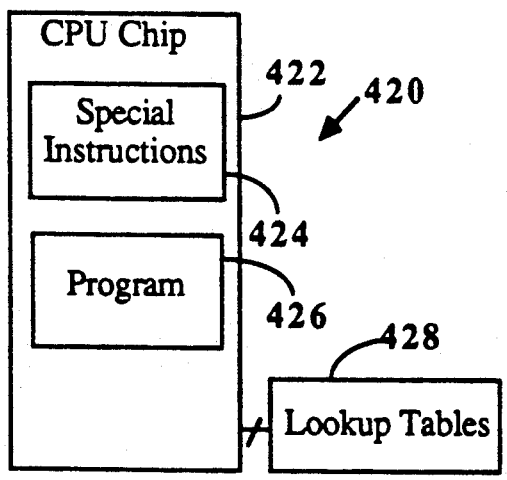
FIG. 9C is a block diagram of a third configuration for a general-purpose microprocessor employing, according to the invention, incorporated special instructions and an on-chip smaller program and off-chip look-up tables.

FIG. 9C is a block diagram of a third configuration 420 for a general-purpose microprocessor chip 422 employing, according to the invention, incorporated special instructions 424 which allow the program code 426 to be small enough to fit on-chip. The off-chip look-up tables 428 provides the economy of a smaller chip size.

Figure 9D:
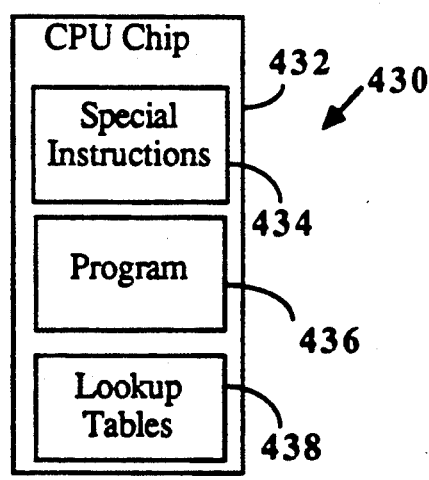
FIG. 9D is a block diagram of a fourth configuration for a general-purpose microprocessor employing, according to the invention, incorporated special instructions and a smaller program and look-up tables which are both on-chip.

FIG. 9D is a block diagram of a fourth configuration 430 for a general-purpose microprocessor chip 432 employing, according to the invention, incorporated special instructions 434 and a smaller program 436 and look-up tables 438 which are both on-chip for maximum speed.

The attached Appendices A, B and C provide additional disclosure supplementing the foregoing description. The Appendices are not essential to an understanding of the invention.

The invention has now been explained with reference to specific embodiments. Other embodiments will be apparent to those of ordinary skill in this art. The invention is therefore not intended to be limited except as indicated by the appended claims.

APPENDIX A

Notation

Notation for Number Representations.

Binary Numbers

1) The decimal subscript 2 may be used to indicate binary numbers. Examples are $1110_2$ and $11000_2$.

2) Eight (8) digits between a comma and the radix point or another comma indicates a binary number. Parentheses may be used to avoid ambiguity in some contexts. Examples are (1 0,0 1 1 0 0 0 0 1.0 0 1 0 1 0 0 1 1 1) and (,0 0 1 0 1 1 0 0.).

3) Computer programs may also denote binary numbers with a trailing "B", e.g., as in 101010111000010100B, etc. where such cannot be interpreted as a hexadecimal value.

Decimal Numbers

1) Decimal notation is the normal default. With nothing to indicate otherwise, numbers such as 10, 237.8372 and 0.0011 are to be considered decimal numbers.

2) Subscript numbers used to indicate the radix are decimal unless otherwise explicitly indicated. Examples are: $24_{10} = 18_{16}$, $14 = 1110_2$, $18_{16} = 11000_2$.

3) Three (3) digits between a comma and the radix point or another comma indicates a decimal number. Parentheses may be used to avoid ambiguity in some contexts. Examples are (123,456) and (0.123,45).

Hexadecimal Numbers

1) The decimal subscript 16 may be used to indicate hexadecimal numbers. Examples are $1110_{16}$, $349_{16}$, and $ACF9_{16}$.

2) Two (2) or four (4) digits between a comma and the radix point or another comma indicates a hexadecimal number. Parentheses may be used to avoid ambiguity in some contexts. Examples are (12,34.56), (,1234.56), (,12.), (,0012.), and (0.1234, D5).

3) Computer programs may denote hexadecimal numbers in such forms as 0ADE4H or $ADE4.

Notation for logarithms and exponentials. The expression $a^u$ is universally accepted as unambiguous notation for the base-$a$ exponential of $u$ unless specifically defined otherwise. Similarly, the expression $\log_a u$ is universally accepted as unambiguous notation for the base-$a$ logarithm of $u$. These two functions being mutually inverse with one using a superscript and the other a subscript suggests greater symmetry between these superscripts and subscripts than is realized in practice. In contexts where the base of the logarithm is restricted to but a single value, no ambiguity in that restricted context results from merely omitting the subscript in the interest of less-cluttered notation. This is a frequent custom for the natural logarithm, the decimal logarithm, the binary logarithm, and for other logarithms as well. On the other hand, simply omitting superscripted exponents is out of the question. They must be retained in some form—though perhaps not superscripted.

A conversational familiarity with exponentials and logarithms is invited here. This familiarity is to allow some extension to the sort of unambiguous but non-unique notation which permits $e^z$ and exp z to be synonymous functions. In the following sections a few expressions are dignified as named functions. Some of these newly named functions are different from exponentials and logarithms despite being intimately related to them and are collectively referred to as diff-exponentials and diff-logarithms, respectively.

Extended Exponential Notation. Frequent occasion to dispense with the superscripting of an exponent arises as when the expression for the exponent becomes too unwieldy. For the natural, i.e., base-$e$ exponential there is the universally accepted notational identity exp $u \equiv e^u$. Extensions of this popular convention to include exponentials of bases which are constant, variable, integer, real, binary, decimal, or hexadecimal, can be defined as follows:

$axpu \equiv a^u$, $a$ = constant, say (125)

$bxpu \equiv b^u$, $b$ = 2, usually (127)

$cxpu \equiv c^u$, $c$ = constant, say (128)

$dxpu \equiv d^u$, $d$ = 10, say (129)

$expu \equiv e^u$, $e$ = natural base, usually (130)

$hxpu \equiv h^u$, $h$ = 16, say (131)

$mxpu \equiv m^u$, $m$ = integer base, usually (132)

$vxpu \equiv v^u$, $v$ = real variable, say (133)

$wxpu \equiv w^u$, $w$ = real variable, say (134)

This notation easily extends to further parameters denoted by other letters and symbols.

Extended Logarithmic Notation. This general form of superscript-free notation for exponentials immediately suggests a corresponding general form of subscript-free notation for multiple logarithms as follows:

$algu \equiv \log_a u$, $a$ = constant, say (135)

$blgu \equiv \log_b u$, $b$ = 2, usually (136)

$clgu \equiv \log_c u$, $c$ = constant, say (137)

$dlgu \equiv \log_d u$, $d$ = 10, usually (138)

$elgu \equiv \log_e u$, $e$ = natural base, say (139)

$hlgu \equiv \log_h u$, $h$ = 16, perhaps (140)

$mlgu \equiv \log_m u$, $m$ = integer variable, say (141)

$vlgu \equiv \log_v u$, $v$ = real variable, say (142)

$wlgu \equiv \log_w u$, $w$ = real variable, say. (143)

This is a consistent set of extensions and alternatives to the following more restricted combination of alternative forms which are likely to remain popular:

$\log u \equiv \log_{10} u$ (144)

$\ln u \equiv \log_e u$ (145)

$\lg u \equiv \log_2 u$. (146)

Then over appropriate ranges of $u$ there is:

axp alg u = alg axp u = u (147)

bxp blg u = blg bxp u = u (148)

cxp clg u = clg cxp u = u (149)

dxp dlg u = dlg dxp u = u (150)

exp elg u = elg exp u = u (151)

hxp hlg u = hlg hxp u = u (152)

mxp mlg u = mlg mxp u = u (153)

vxp vlg u = vlg vxp u = u (154)

wxp wlg u = wlg wxp u = u (155)

which gives a clear notation for the inverse relations between logarithms and exponentials.

The equivalent chain rules for logarithms $(\log_u v)(\log_v w)\log_w u = 1$ (156)

$\log_u w = (\log_u v)\log_v w$ (157)

take the simpler and more mnemonic forms $(ulgv)(vlgw)wlgu = 1$ (158)

-continued $$ulgw = (ulgv)vlgw \qquad (159)$$

where "ulg" is to mean "$\log_u$."

Definitions for Exponentials and Logarithms

Diff-Functions: Diff-Exponentials and Diff-Logarithms. The functional expressions $-1+\exp z \equiv e^z-1 = e^z(1-e^{-z})$ and $\ln(1+z)$ frequently accompany general use of the exp and ln functions. These occasions are so prominent in the discussion of the design of E/L systems that these expressions are designated as the named functions $\text{exd } z \equiv e^z - 1 \equiv -1 + \exp z$ and $\text{eld } z \equiv \ln(1+z) \equiv \text{elg}(1+z)$. These and similar functions of other bases are simply called diff-exponentials and diff-logarithms—due to their definitions differing but slightly from their respective exponential and logarithmic functions. The following diff-functions are easily defined:

$$axdu \equiv -1 + axpu \equiv a^u - 1, a = \text{constant, say} \qquad (160)$$

$$bxdu \equiv -1 + bxpu \equiv b^u - 1, b = 2, \text{usually} \qquad (161)$$

$$dxdu \equiv -1 + dxpu \equiv d^u - 1, d = 10, \text{say} \qquad (162)$$

$$exdu \equiv -1 + expu \equiv e^u - 1, e = \text{natural base, usually} \qquad (163)$$

$$hxdu \equiv -1 + hxpu \equiv h^u - 1, h = 16, \text{usually} \qquad (164)$$

$$mxdu \equiv -1 + mxpu \equiv m^u - 1, m = \text{integer base, say} \qquad (165)$$

$$vxdu \equiv -1 + vxpu \equiv v^u - 1, v = \text{real base, usually} \qquad (166)$$

$$wxdu \equiv -1 + wxpu \equiv w^u - 1, w = \text{real base, usually} \qquad (167)$$

$$aldu \equiv alg(1+u) \equiv \log_a(1+u), a = \text{constant, say} \qquad (168)$$

$$bldu \equiv blg(1+u) \equiv \log_b(1+u), b = 2, \text{usually} \qquad (169)$$

$$dldu \equiv dlg(1+u) \equiv \log_d(1+u), d = 10, \text{usually} \qquad (170)$$

$$eldu \equiv elg(1+u) \equiv \log_e(1+u), e = \text{natural base, say} \qquad (171)$$

$$hldu \equiv hlg(1+u) \equiv \log_h(1+u), h = 16, \text{say} \qquad (172)$$

$$mldu \equiv mlg(1+u) \equiv \log_m(1+u), m = \text{integer base, say} \qquad (173)$$

$$vldu \equiv vlg(1+u) \equiv \log_v(1+u), v = \text{real base, say} \qquad (174)$$

$$wldu \equiv wlg(1+u) \equiv \log_w(1+u), w = \text{real base, say} \qquad (175)$$

Then over appropriate range of u there is:

$$\text{axd ald } u = \text{ald axd } u = u \qquad (176)$$

$$\text{bxd bld } u = \text{bld bxd } u = u \qquad (177)$$

$$\text{dxd dld } u = \text{dld dxd } u = u \qquad (178)$$

$$\text{exd eld } u = \text{eld exd } u = u \qquad (179)$$

$$\text{hxd hld } u = \text{hld hxd } u = u \qquad (180)$$

$$\text{mxd mld } u = \text{mld mxd } u = u \qquad (181)$$

$$\text{vxd vld } u = \text{vld vxd } u = u \qquad (182)$$

$$\text{wxd wld } u = \text{wld wxd } u = u \qquad (183)$$

which provides a clear notation for the inverse relations between the diff-logarithms and diff-exponentials.

Abbreviations

C-FLP conventional floating point.
EC-FLP equivalent conventional floating point.
E-FLP exponentials floating point.
FXP fixed point.
LS least significant.
MS most significant.
NS next most significant.
PDOE product difference of exponentials.

Notation $\{x\} = x - \lfloor x \rfloor = x \bmod 1$, the unsigned fractional portion of x.

$\lfloor x \rfloor$ = floor (x)≡integer(x) The largest (signed) integer not greater than x.

$\hat{x} \equiv x_{C\text{-}FLP}$ Conventional floating point value x.

$x \equiv x_{E\text{-}FLP}$ Exponential floating point value x.

Glossary diff-exponential The base-a diff-exponential axd x of argument x is defined as axd $x \equiv -1 + \text{axp } x \equiv a^x - 1$.

diff-logarithm The base-a diff-logarithm ald x of argument x is defined as ald $x \equiv \text{alg}(1+x) \equiv \log_a(1+x)$.

PDOE Product difference of exponentials. Refers to the expansion of $e^u - e^v$ in a product series of $u-v$ and exponentials of $u-v$ and $u+v$.

APPENDIX B

First and Second Order E/L Interpolation

Derivation of Interpolation Equations for the Function $f(x)$.

$$f(u+hv) \approx f(u) + hvf'(u) + h^2 \frac{1}{2} v^2 f''(u) \qquad (184)$$

$$\equiv f + hvf' + h^2 \frac{1}{2} v^2 f', f \equiv f(u) = f(u^* - h\xi) \qquad (185)$$

$$= f + h\psi r^{-\lambda} v + hv(f' - \psi r^{-\lambda}) + h^2 \frac{1}{2} v^2 f' \qquad (186)$$

$$= f + h\psi r^{-\lambda}\xi + h\psi r^{-\lambda}v^* + hv(f' - \psi r^{-\lambda}) + h^2 \frac{1}{2} v^2 f' \qquad (187)$$

$$= f + h\psi r^{-\lambda}\xi + (+\alpha - \alpha)h\psi r^{-\lambda}\xi + h\psi r^{-\lambda}v^* + \qquad (188)$$

$$\quad hv(f' - \psi r^{-\lambda}) + h^2 \frac{1}{2} v^2 f'$$

$$= (f + h(1-\alpha)\psi r^{-\lambda}\xi) + h\alpha\psi r^{-\lambda}\xi + h\psi r^{-\lambda}v^* + \qquad (189)$$

$$\quad hv(f' - \psi r^{-\lambda}) + h^2 \frac{1}{2} v^2 f'$$

$$= X + h\alpha\psi r^{-\lambda}\xi + h\psi r^{-\lambda}v^* + \qquad (190)$$

$$\quad hv(f' - \psi r^{-\lambda})\left(1 + h\frac{1}{2} v \frac{f'}{f' - \psi r^{-\lambda}}\right),$$

$$X = X(u^*) = (f + (1-\alpha)h\psi r^{-\lambda}\xi)$$

$$= X + h\alpha\psi r^{-\lambda}\xi + h\psi r^{-\lambda}v^* + \qquad (191)$$

$$\quad hs_w rxp\left(rlg|v| + rlg|f' - \psi r^{-\lambda}| + \right.$$

$$\quad \left. rlg\left(1 + h\frac{1}{2} v \frac{f'}{f' - \psi r^{-\lambda}}\right)\right).$$

$$s_w = s_v s_y, s_v = \text{sign } v, s_y = \text{sign}(f' - \psi r^{-\lambda})$$

$$= X + h\alpha\psi r^{-\lambda}\xi + h\psi r^{-\lambda}v^* + \qquad (192)$$

-continued $$hs_w rxp\left(V + Y + rlg\left(1 - h\frac{1}{2}v\frac{f'}{f - \psi r^{-\lambda}}\right)\right).$$

$$V = rlg|v|, Y = rlg|f - \psi r^{-\lambda}|$$

$$= X + ha\psi r^{-\lambda}\xi + h\psi r^{-\lambda}v^* + hs_w rxp\left(V + Y + \right.$$ (193)

$$\left. q_r\ln\left(1 + h\frac{1}{2}v\frac{f'}{f - \psi r^{-\lambda}}\right)\right)$$

$$\approx X + ha\psi r^{-\lambda}\xi + h\psi r^{-\lambda}v^* + \tag{194}$$

$$hs_w rxp\left(V + Y + hq_r\frac{1}{2}v\frac{f'}{f - \psi r^{-\lambda}}\right) \tag{195}$$

$$= X + ha\psi r^{-\lambda}\xi + h\psi r^{-\lambda}v^* + hs_w rxp\left(V + Y + \right. \tag{196}$$

$$\left. hs_w s_c rxp\left(Q_r + V - Y + rlg\left|\frac{1}{2}f'\right|\right)\right), s_c = \text{sign} f'$$

$$= X + ha\psi r^{-\lambda}\xi + h\psi r^{-\lambda}v^* + hs_w rxp W. \tag{197}$$

$$W = W^* + hC^*, W^* = V + Y.$$

$$C^* = s_w s_c rxp\left(Q_r + V - Y + rlg\left|\frac{1}{2}f'\right|\right)$$

Derivation of Interpolation Equations for the Function rlg $f(Z)$.

$$rlg f(Z) = rlg f(u + hv) \tag{198}$$

$$= rlg f(u) + hv(rlg f(u))' + h^2 \frac{1}{2}v^2(rlg f(u))'' + \ldots \tag{199}$$

$$\approx rlg f + hv(rlg f)' + h^2 \frac{1}{2}v^2(rlg f)'', f \equiv f(u) \tag{200}$$

$$= X + hv(rlg f)' + h^2 \frac{1}{2}v^2(rlg f)'', X \equiv X(u) = rlg f \tag{201}$$

$$\approx X + hvq_r\frac{f'}{f} + h^2\frac{1}{2}v^2 q_r\left(\frac{f''}{f} - \frac{f'f'}{ff}\right), q_r \equiv rlg e \tag{202}$$

$$= X + hvq_r\frac{f'}{f} + h^2\frac{1}{2}v^2 q_r\frac{f'f'}{ff}\left(\frac{f''f}{f'f'} - 1\right) \tag{203}$$

$$= X + hvq_r\frac{f'}{f} + h^2 v^2 q_r\frac{f'^2}{f^2}\left(\frac{1}{2}\left(\frac{f''f}{f'f'} - 1\right)\right) \tag{204}$$

$$= X + hvq_r\frac{f'}{f}\left(1 + hv\frac{f'}{f}\left(\frac{1}{2}\left(\frac{f''f}{f'f'} - 1\right)\right)\right) \tag{205}$$

$$= X + hs_w\left|vq_r\frac{f'}{f}\right|\left(1 + hv\frac{f'}{f}\left(\frac{1}{2}\left(\frac{f''f}{f'f'} - 1\right)\right)\right). \tag{206}$$

$$s_w = (\text{sign} v)(\text{sign} q_r)(\text{sign} f)(\text{sign} f')$$

$$= X + \tag{207}$$

$$hs_w rxp rlg\left(\left|vq_r\frac{f'}{f}\right|\left(1 + hv\frac{f'}{f}\left(\frac{1}{2}\left(\frac{f''f}{f'f'} - 1\right)\right)\right)\right)$$

$$= X + \tag{208}$$

$$hs_w rxp\left(rlg\left|v\frac{f'}{f}\right| + rlg\left(1 + hv\frac{f'}{f}\left(\frac{1}{2q_r}\left(\frac{f''f}{f'f'} - 1\right)\right)\right)\right)$$

$$= X +$$

$$hs_w rxp\left(rlg\left|v\frac{f'}{f}\right| + q_r\ln\left(1 + hv\frac{f'}{f}\left(\frac{1}{2}\left(\frac{f''f}{f'f'} - 1\right)\right)\right)\right)$$

$$\approx X + hs_w rxp\left(W^* + hvq_r\frac{f'}{f}\left(\frac{1}{2}\left(\frac{f''f}{f'f'} - 1\right)\right)\right), \tag{209}$$

$$W^* = rlg\left|vq_r\frac{f'}{f}\right| = V + Q_r - X + Y.$$

$$V = rlg|v|, Q_r = rlg|q_r|, Y = rlg|f|$$

$$= X + \tag{210}$$

$$hs_w rxp\left(W^* + hs_w\left|vq_r\frac{f'}{f}\right|s_c\left|\frac{1}{2}\left(\frac{f''f}{f'f'} - 1\right)\right|\right).$$

$$s_c = \text{sign}\left(\frac{f''f}{f'f'} - 1\right)$$

$$= X + \tag{211}$$

$$hs_w rxp\left(W^* + hs_w s_c rxp rlg\left(\left|vq_r\frac{f'}{f}\right|\left(\frac{1}{2}\left|\frac{f''f}{f'f'} - 1\right|\right)\right)\right)$$

$$= X + \tag{212}$$

$$hs_w rxp\left(W^* + hs_w s_c rxp\left(rlg\left|vq_r\frac{f'}{f}\right| + rlg\left(\frac{1}{2}\left|\frac{f''f}{f'f'} - 1\right|\right)\right)\right)$$

$$= X + \tag{213}$$

$$hs_w rxp\left(W^* + hs_w s_c rxp\left(W^* + rlg\left(\frac{1}{2}\left|\frac{f''f}{f'f'} - 1\right|\right)\right)\right)$$

$$= X + hs_w rxp W, W = W^* + hC^*(W^*, u). \tag{214}$$

$$C^*(W^*, u) = s_w s_c rxp(W^* + D^*), \tag{215}$$

$$D^* \equiv D^*(u) = rlg\left(\frac{1}{2}\left|\frac{f''f}{f'f'} - 1\right|\right) \tag{216}$$

APPENDIX C

Basic BLD and BXD Generators

Brief Definitions. A number of function definitions are used in the following discussion of binary functions including: blg $u \equiv \log_2 u$, bxp $u \equiv 2^u$, bld $u \equiv \log_2(1+u)$, and bxd $u \equiv 2^u - 1$. When $0 \leq F < 1$, there is the further convention BLD F$\equiv$bld F, and BXD F$\equiv$bxd F such that $0 \leq$ BLD F$<1$ and $0 \leq$ BXD F$<1$.

Semishift Functions: BXD and BLD. Regarding elementary terminology, an unsigned binary number is a number which is said to be in binary notation or in weighted binary notation. These terms are alternative abbreviations of the fact that the number is being represented as a sum of exponentially weighted binary states arrayed in order left-to-right by decreasing weight. The term binary state usually is generally interchangeable with binary digit or bit. The exponential function involved is appropriately of base two—the binary exponential. The inverse of this binary exponential is the binary logarithm—the base-two logarithm.

When such a bit pattern of some quantity x is left shifted N bit places its associated numerical value is multiplied by the factor bxp N. When right shifted N bit places its value is similarly multiplied by the factor bxp(−N). If a left shift is defined to be a positive shift there is then no difficulty in referring to a right shift as a negative shift, i.e., N can be signed.

Further generalizing such signed integer N to the extent of incrementing it by some positive fraction F allows the bit pattern of x bxp(N.F) to be interpreted as the bit pattern of the quantity x shifted that fraction F of a bit place in addition to the shift of the integer N bit places. The idea that there is a unique computable shift associated with any multiplicative increase or decrease in a binary number provides a generally useful way of operationally relating binary exponentials and binary logarithms to standard binary representations of numbers.

Thus when $x=2^{N.F}\times 1$ there is N.F = blg x. Hence x is the value which results from shifting the value one by N.F bit places and blg x is the operation on x which identifies how far x has been shifted away from the value one. An E/L processor makes use of the fact that a sequence of such generalized shifts need not be executed individually. The total amount of shift required may instead be derived simply as the arithmetic sum of the individual amounts of shift and then executed as a single "shift" through possibly a non-integer quantity of bit places. There is the usual way of effecting integer bit places of shift while realization of a fractional bit place of shift—called a semishift—necessarily rests on the binary exponential function whereby such semishifts are sensibly defined. Therefore E/L multiplication and division have their respective equivalences to an executed shift (i.e., fixed-point exponential) of the sum or difference of the extracted shift contents (i.e., logarithms) represented by the fixed-point format values of their respective E/L arguments.

This view clarifies the necessity of the two qualitatively different procedures comprising efficient evaluation of the binary exponential function on most binary computers. The first procedure—an evaluation of a polynomial, rational fraction, or continued fraction, etc.—corresponds to the semishift while the second performs the shift through integer quantities of bit places. Similarly, the inverse of the binary exponential—the binary logarithm—requires a corresponding pair of qualitatively different procedures which are the respective inverses of those two procedures required for the binary exponential. Thus the binary fixed-point logarithm function can be interpreted as the quantity of bit places of shift which must be applied to the (bit array pattern having the associated) value one in order to yield (a bit array pattern associated with) its argument value.

The point of view taken here is that, by presuming a fixed-point representation, the base-dependent quantity of shift is the corresponding base-dependent logarithm of the shifted value (even though the shifted item is sometimes argued to be the digit pattern rather than its associated numerical value). Hence, a shift of a numerical digit pattern is equated to an analytic function of that numerical argument. This establishes the base-dependent shift as a base-dependent numerical operation and rationalizes the meaning of a fractional digit place of shift. Base-e digit places, both whole and fractional, are thus also defined, though the natural logarithm is much less appropriate in an integer-radix architecture.

The binary "diff-exponential" function of x is the name given to the decremented binary exponential function of argument x, bxd $x \equiv -1+$ bxp $x \equiv 2^x-1$. This function may be viewed as giving the numerical value which must be combined additively (as opposed to multiplicatively) with the value one in order to shift that value one through x bit places.

The binary "diff-logarithm" function of x—the inverse of the binary diff-exponential function—is the binary logarithm of an incremented argument, i.e., bld $x \equiv blg(1+x) \equiv \log_2(1+x)$. This function may be viewed as giving the shift difference between $1+x$ and the value one as a function of this arithmetic difference x.

Semishifts in E/L Processors. A binary E/L processor requires efficient generation of fixed-point forms of the two functions $$\text{BXD } F = \text{bxd } F, \ 0 \leq \text{BXD } F < 1 \text{ for } 0 \leq F < 1 \quad (217)$$

$$\text{BLD } F = \text{bld } F, \ 0 \leq \text{BLD } F < 1 \text{ for } 0 \leq F < 1 \quad (218)$$

in order, respectively, to execute and to extract semishifts.

Sesquishift Transformations. Evaluations of bxd(U+V), bld(U+V), bxd(U−V), and bld(U−V) for any two unsigned fractional register values U and V are particularly important to binary E/L processors and need to be as efficient as possible. For the first two cases, the addition of the two fractional register values U and V yields a fractional register value F which is the correct sum if no overflow carry occurs. With no overflow there are the direct equivalences BXD F≡bxd F and BLD F≡bld F. The generation of a carry, on the other hand, signals that the correct sum is 1+F. A shift of an amount such as this—which is somewhat outside the positive fraction unit interval—is called a sesquishift. It should be clear that such a sesquishift cannot be directly effected and extracted, respectively, with the BXD and BLD semishift functions. The basic function definitions provide the following elementary transformations to separate the integer bit place shift from the fractional bit place shift:

$$bxd(1 + F) = -1 + 2bxpF \quad (219)$$

$$= 1 + 2BXDF \quad (220)$$

$$bld(1 + F) = 1 + BLD\tfrac{1}{2} F. \quad (221)$$

$$bld(1+F) = 1 + BLD\tfrac{1}{2}F. \quad (221)$$

For the second two cases, bxd(U−V) and bld(U−V), the subtraction of the two unsigned fractional register values U and V yields an unsigned fractional register value F, which is the correct difference if no underflow borrow occurs. With no underflow borrow there are the direct equivalences BXD F≡bxd F and BLD F≡bld F. On the other hand, the generation of a borrow flags that the correct difference is −1+F and direct use of the BXD and BLD functions (which require nonnegative fractional arguments) is of course inapplicable. The basic function definitions again provide efficient transformations to separate the integer bit place shift from the fractional bit place shift:

$$bxd(-1+F) \equiv -\tfrac{1}{2}BXD\ F \qquad (222)$$

$$bld(-1+F) \equiv blg\ F \equiv \log_2 F \qquad (223)$$

$$bld(-\tfrac{1}{2}+G) \equiv -1 + BLD(2G). \qquad (224)$$

For $bld(-1+F) = blg\ F$, the location of the most significant 1-bit of F is not known, in general, yet F must be normalized before BLD can be applied. [Fortunately, F can be normalized systematically.] The foregoing cases illustrate the general usefulness of viewing the BXD and BLD functions, respectively, as executing or extracting a semishift when dealing with real-world binary values in registers. In particular, when adding or subtracting fractional register values whose sum or difference, respectively, is to be converted into an executed generalized shift (i.e., exponential), the overflow carry and underflow borrow from such addition or subtraction operations, respectively, determine the integer bit place shift required.

Fixed-point forms of the fractional BXD and BLD functions of fractional operands provide fundamental data format conversions: BXD F converts a binary E/L data format fraction F into the maximally efficient hidden-bit form of binary conventional floating-point data format fraction G. BLD G is the reverse conversion. These two functions must each be valid to at least n bits (i.e., $|error| < 2^{-n}$) in order to ensure that their respective converted E/L or conventional floating-point values will retain n bits of precision.

BLD1 and BXD1 Generators

The first order approximations of the nonnegative fractional functions BLD(x) and BXD(x) of a nonnegative fractional argument operand x are indicated by BLD1(x) and BXD1(x). These comparatively low-precision forms of this pair of functions are usually generated by ultrafast direct table look-up as functions of the fractional look-up index x.

Basic BLD2 and BXD2 Generators

When fixed-point approximations of smooth continuous functions are desired, as is the case here with BXD F and BLD F where $0 \leq F < 1$, interpolation between comparatively sparse table entries permits a drastic reduction in the number of table entries, provided that 1) the maximum magnitude of the function's relevant derivatives or differences will not unduly amplify interpolation errors, 2) there is an economical way to access whatever values of such derivatives or differences as are required for the interpolation computation, and 3) any vital operations such as addition, subtraction, multiplication, division, etc. are made available as needed.

In the present situation both the BLD F and the BXD F functions are to be constructed. Examination of the foregoing trio of conditions for these two functions yields the following observations:

1) The slope of BXD F ranges from $q^{-1}$ to $2q^{-1}$ (i.e., 0.693 ... to 1.386 ...) as F goes from 0 to 1 while the slope of BLD F ranges from q to $\tfrac{1}{2}q$ (i.e., 1.442 ... to 0.721 ...) as F goes from 0 to 1. These maximums are small enough to avoid serious amplification of interpolation errors.

2) The k-th derivatives of BXD F and BLD F are, respectively, $(1 + BXD\ F)/q^k = 1 + bxd(F - kQ)$ and $(-1)^{k+1}q(k-1)!/(1+F)^k = (-1)^{k+1}(k-1)!(1 + bxd(Q - kBLD\ F))$. These expressions being directly computable and particularly simple for small k avoids the necessity of extracting their more error-prone finite-difference approximations from table entry differences.

3) In principle, access to the multiply and divide operations can be realized as follows: The BXD F and BLD F functions, respectively, constitute the difficult portions of the binary exponential and logarithm functions. Direct table look-up of these two functions to some economically small n bits of width provides the basis for the construction of the blg x and bxp x functions from which the E/L operations blg, bxp, FLOAT, FIX, multiply, divide, etc. may be realized. These operations are then sufficient for evaluating interpolation calculations to about n bits of significance.

This means that if direct table look-up is provided for 2n-bit wide entries of BXD and BLD as functions of n-bit wide arguments, then the required n-bit wide interpolation correction values can be evaluated as an E/L calculation. Thus the BXD and BLD table values themselves can be used to yield both BXD2(F2) and BLD2(F2) as second order 2n-bit wide functions of a 2n-bit wide fractional argument F2. Similarly, such 2n-bit wide BXD2 and BLD2 functions provide the basis for evaluating the 2n-bit wide correction value required in the interpolation of 3n-bit wide BXD F and BLD F table values that are functions of but n-bit wide arguments. Although these sequences can be continued indefinitely to provide successively higher and higher precision, performance deficits or increased hardware costs grow rapidly beyond about two or three such stages of interpolation within interpolation.

Definition of Components. F2 is a 2n-bit wide double register binary fraction with most significant (MS) and least significant (LS) registers u and x, respectively, as n-bit wide single register binary fractions and $h = 2^{-n}$ such that $F2 = u + hx$ for $0 \leq F2 < 1$, $0 \leq u < 1$, $0 \leq x < 1$, and integer $h^{-2}F2$, $uh^{-1}$, $xh^{-1}$.

BLDT1(t), BLDT2(t), BXDT1(t), and BXDT2(t) are considered to be available as four n-bit wide logic functions of an n-bit wide argument t where BLDT1 and BLDT2 are defined jointly, as are BXDT1 and BXDT2, according to $$BLDT1(t) + hBLDT2(t) = h^2 \lfloor h^{-2}bldt \rfloor \qquad (225)$$

$$= bldt + h^2\epsilon_0,\ 0 \leq \epsilon_0 < 1 \qquad (226)$$

$$BXDT1(t) + hBXDT2(t) = h^2 \lfloor h^{-2}bxdt \rfloor \qquad (227)$$

$$= bxdt + h^2\epsilon_0', \qquad (228)$$

$$0 \leq \epsilon_0' < 1$$

where $\lfloor z \rfloor$ refers to the integer portion of z and $t = hN$ for $N = 0, 1, 2, \ldots, (h^{-1} - 1)$. For $Q = blg\ blg\ e$, i.e., $Q = (\ln 2)^{-1}q$ where $q = (\ln 2)^{-1}$, Q1 is an n-bit fraction such that $$Q1 = h \lfloor h^{-1}Q \rfloor \qquad (229)$$

$$= Q + h\epsilon_1,\ 0 \leq \epsilon_1 < 1. \qquad (230)$$

The quantities $h^2\epsilon_0$, $h^2\epsilon'_0$, and $h\epsilon_1$ are truncation errors. Thus, as is characteristic of the errors of truncated evenly spaced transcendental function values (and of numerous other truncated function values as well), $\epsilon_0$, $\epsilon'_0$, and $\epsilon_1$ can be presumed to be uncorrelated (pseudo) random variables from uniform density distributions.

Basic NDN Interpolation for BLD2. Given a double-register 2n-bit binary fraction F2=u+hv, there are several ways to generate BLD2(F2) as a 2n-bit approximation of BLD(u+hx) using the BLDT1, BLDT2, and BXDT1 look-up table functions—rather than direct multiplication and division—in the first order interpolation of BLDT1 and BLDT2 values.

The NDN (normalize-denormalize) method, which requires extensive shifting, most directly illustrates the fundamental principle involved for generating the BLD2 function. It starts with the relation BLD $u \approx$ BLDT1(u)+hBLDT2(u) with no interpolation required when x=0. For $0 \leq u < 1$ and $0 < x$ there is the following expression for the interpolation calculation as a function of x:

$$BLD(u + hx) = BLDu + bld(hq^{-1}2^R), \quad (231)$$

$$R = blgx + Q - BLDu \quad$$

where q=blg e≡1/ln 2 and Q=blg blg e=blg q≡(ln 2)$^{-1}$ ln q.

This exact interpolation expression bld(h q$^{-1}$2$^R$) is now in a form that may be expanded in a continued exponential to yield $$bld(h\, q^{-1}2^R) = h2^{R'} - h\tfrac{1}{2}2^R - h\tfrac{1}{2}2^{R'} \ldots ,$$
$$R' = R - blg(6/5). \quad (232)$$

An approximation of first order in h requires evaluation of but the first term, i.e., $$bld(hq^{-1}2^R) \approx h2^R \quad (233)$$

$$= hbxp(blgx + Q - BLDu). \quad (234)$$

Any binary fixed-point nonzero fractional value x can be considered to be equivalent to $2^k(1+g)$ for some k and some g uniquely extracted such that $-n \leq k \leq -1$ and $0 \leq g < 1$. Thus (109) may be evaluated as follows:

$$hbxp(blgx + Q - BLDu)$$

$$= hbxp(blg(2^k(1 + g)) + Q - BLDu) \quad (235)$$

$$= hbxp(k + blg(1 + g) + Q - BLDu) \quad (266)$$

$$= hbxp(k + bldg + Q - BLDu), 0 \leq g < 1 \quad (237)$$

$$\approx hbxp(k + BLDg + Q - BLDu) \quad (238)$$

$$= hbxpw \quad (239)$$

$$= hbxp(\lfloor w \rfloor + \{w\}) \quad (240)$$

$$= h(bxp\lfloor w \rfloor)bxp\{w\} \quad (241)$$

$$\equiv h2^{\lfloor w \rfloor}bxp\{w\} \quad (242)$$

$$\equiv h2^{\lfloor w \rfloor}(1 + bxd\{w\}) \quad (243)$$

$$\equiv h2^{\lfloor w \rfloor}(1 + BXD\{w\}). \quad (244)$$

Using BLDT1(u) for BLD u, BLDT1(g) for BLD g, Q1 for Q, and BXDT1{w} for BXD{w}, this sequence provides the required interpolation correction value to at least about n bits of precision which is to be added to BLDT1(u)+hBLDT2(u) when 0<x.

Basic NDN Interpolation for BXD2. In close parallel with the NDN method for generating BLD2(F2) as a 2n-bit approximation of BLD(u+hx), the generation of BXD2(F2) as a 2n-bit approximation of BXD(u+hx) can use the BXDT1, BXDT2, and BLDT1 look-up table functions—rather than direct multiplication and division—in the first order interpolation of BXDT1 and BXDT2.

The NDN method most directly illustrates the fundamental principle involved. It starts with the observation that BXD u$\approx$BXDT1(u)+hBXDT2(u) with no interpolation required when x=0. For $0 \leq u < 1$ and $0 < x$, the expression for the interpolation calculation as a function of x can take the following form;

$$BXD(u+hx) = BXD\, u+(bxp\, u)\, bxd\, hx. \quad (245)$$

This exact interpolation expression (bxp u) bxd hx may be expanded using the exponential series for bxd hx to yield $$(bxpu)bxdhx = (bxpu)hxbxp\left(-Q + h\tfrac{1}{2}x + \ldots\right) \quad (246)$$

$$= hbxp\left(blgx - Q + u + h\tfrac{1}{2}x + \ldots\right). \quad (247)$$

An approximation of first order in h requires evaluation of only $$(bxp\, u)\, bxd\, hx \approx h\, bxp(blg\, x - Q + u). \quad (248)$$

With binary fixed-point x of the form $2^k(1+g)$ where $-n \leq k \leq -1$ and $0 \leq g < 1$, the required value h bxp(u−Q+blg x) may be evaluated as follows:

$$hbxp(blgx - Q + u)$$

$$= hbxp(blg(2^k(1 + g)) - Q + u) \quad (249)$$

$$= hbxp(k + blg(1 + g) - Q + u) \quad (250)$$

$$= hbxp(k + bldg - Q + u), 0 \leq g < 1 \quad (251)$$

$$\approx hbxp(k + BLDg - Q + u) \quad (252)$$

$$= hbxpw \quad (253)$$

$$= hbxp(\lfloor w \rfloor + \{w\}) \quad (254)$$

$$= h(bxp\lfloor w \rfloor)bxp\{w\} \quad (255)$$

$$\equiv h2^{\lfloor w \rfloor}bxp\{w\} \quad (256)$$

$$\equiv h2^{\lfloor w \rfloor}(1 + bxd\{w\}) \quad (257)$$

-continued $$= h2 \lfloor^w \rfloor (1 + BXD\{w\}). \quad (258)$$

Note that in (244) and (258) the w comprises different terms. Using BLDT1(g) for BLD g, Q1 for Q, and BXDT1{w} for BXD{w}, this sequence provides the required interpolation correction value to at least about n bits of precision which is to be added to BXDT1(u) +hBXDT2(u) when 0<x.

NDN Numerical Examples. Table 13 is an example 32-bit evaluation of the function value BLD(0.85B4,0017) using the normalize-denormalize (NDN) method with 16-bit table lookup indices. This example shows clearly the effectiveness of using the NDN method for first order interpolation of BLD look-up table values. Eight significant hexadecimal digits (equivalent to almost ten decimal digits) of the binary diff-logarithm function BLD2 are generated. The large amount of shifting required is apparent, first for the normalization and then again for the denormalization.

Table 14 is an example 32-bit evaluation of the function value BXD(0.9B32,0019) using the NDN method with 16-bit table lookup indices. This example shows the equal effectiveness of using the same NDN method of first order interpolation of BXD look-up table values. Eight significant hexadecimal digits of the inverse functional transformation BXD2 are generated. The large amount of shifting required, first for the normalization and then again for the denormalization, is as apparent here as it was for BLD2 above.

As may be readily verified at least one normalizing shift is always required either for BLD2 or for BXD2 and that on the average only two more will be needed. Thus this method provides rather high average performance in generating both functions.

These examples are atypically severe challenges for the NDN method because only a tiny percentage of all possible argument values have such a small value for the LS half of its digits. It is similarly atypical for the BLD and BXD transformations to yield results also having such a small value for the LS half of its digits. This shows that rather than having been picked at random, the present values are the result of a search for an instructive example requiring near worst-case amounts of shifting. Nevertheless, a generator capable of handling all possible cases will encounter the necessity of handling the worst of such cases.

TABLE 13

Calculate BLD(.85B4, 0017):
```
       .0000, 0017 ; hx
              .0017 ; scale by 1/h (i.e., word align)
                    (normalize)
   (0)   .00000000, 00010111
  (-1)   .00000000, 00101110
  (-2)   .00000000, 01011100
  (-3)   .00000000, 10111000
  (-4)   .00000001, 01110000
  (-5)   .00000010, 11100000
  (-6)   .00000101, 11000000
  (-7)   .00001011, 10000000
  (-8)   .00010111, 00000000
  (-9)   .00101110, 00000000
 (-10)   .01011100, 00000000
 (-11)   .10111000, 00000000
 (-12)  1.01110000, 00000000
```

TABLE 13-continued

```
 (-12)   1.7000,
          <BLD>
 (-12)   .8608, ; BLD(.7000,)
         +.875D. ; + Q1
<BLD> —→ -.9B32, ; -BLD(u)
         -----
 (-12)   0.7233,
        / <BXD>
(-12+0)  .5CC2, ; BXD(.7233)
 (-12)  1.5CC2, ; (prefix 1)
         (denormalize)
```

```
 (-12)   1.01011100, 11000010,
 (-11)   .10101110, 01100001, 0
 (-10)   .01010111, 00110000, 1
  (-9)   .00101011, 10011000, 0
  (-8)   .00010101, 11001100, 0
  (-7)   .00001010, 11100110, 0
  (-6)   .00000101, 01110011, 1
  (-5)   .00000010, 10111001, 1
  (-4)   .00000001, 01011100, 1
  (-3)   .00000000, 10101110, 0
  (-2)   .00000000, 01010111, 0
  (-1)   .00000000, 00101011, 1
   (0)   .00000000, 00010101, 1
         .0016. ; (rounded)
         .0000. 0016, ; scale by h (i.e., word align)
        +.9B32, 0003, ; +BLD(.85B4, 0000)
```

.9B32, 0019, ; = Calculated Value
BLD(.85B4, 0017) = .9B32, 0018, F760 (Check Value)

TABLE 14

Calculate BXD(.9B32, 0019):
```
       .0000, 0019 ; hx
              .0019 ; scale by 1/h (i.e., word align)
                    (normalize)
   (0)   .00000000, 00011001
  (-1)   0.00000000, 00110010
  (-2)   0.00000000, 01100100
  (-3)   0.00000000, 11001000
  (-4)   0.00000001, 10010000
  (-5)   0.00000011, 00100000
  (-6)   0.00000110, 01000000
  (-7)   0.00001100, 10000000
  (-8)   0.00011001, 00000000
  (-9)   0.00110010, 00000000
 (-10)   0.01100100, 00000000
 (-11)   0.11001000, 00000000
 (-12)  1.10010000, 00000000
```

```
 (-12)   1.9000,
          <BLD>
 (-12)   .A4D3, ; BLD(.9000,)
        +.9B32, ; + u
         -.875D, ; -Q1
         -----
 (-12)   0.B8A3,
        / <BXD>
(-12+0)  .A610, ; BXD(.B8A8,)
 (-12)  1.A610, ; prefix 1
         (denormalize)
```

TABLE 14-continued

```
 (-12)    1.1 0 1 0 0 1 1 0, 0 0 0 1 0 0 0 0,
 (-11)    .1 1 0 1 0 0 1 1, 0 0 0 0 1 0 0 0, 0
 (-10)    .0 1 1 0 1 0 0 1, 1 0 0 0 0 1 0 0. 0
  (-9)    .0 0 1 1 0 1 0 0, 1 1 0 0 0 0 1 0, 0
  (-8)    .0 0 0 1 1 0 1 0, 0 1 1 0 0 0 0 1, 0
  (-7)    .0 0 0 0 1 1 0 1, 1 1 1 0 0 1 1 0, 0
  (-6)    .0 0 0 0 0 1 0 1, 0 1 1 1 0 0 1 1, 1
  (-5)    .0 0 0 0 0 0 1 1, 0 1 0 0 1 1 0 0, 0
  (-4)    .0 0 0 0 0 0 0 1, 1 0 1 0 0 1 1 0, 0
  (-3)    .0 0 0 0 0 0 0 0, 1 1 0 1 0 0 1 1, 0
  (-2)    .0 0 0 0 0 0 0 0, 0 1 1 0 1 0 0 1, 1
  (-1)    .0 0 0 0 0 0 0 0, 0 0 1 1 0 1 0 0, 1
   (0)    .0 0 0 0 0 0 0 0, 0 0 0 1 1 0 1 0, 0
          .001A, ; (rounded)
          .0000, 001A. ; scale by h (i.e., word align)
<BXD>→  +.85B3, FFFC, ; +BXD(.9B32, 0000)
          .85B4, 0016, ; = Calculated Value
BLD(.85B4, 0017) = .85B4, 0017, 0918 (Check Value)
```

Elimination of Shifting

The foregoing NDN form of interpolation calculation for BXD2 and BLD2 has been determined to be inefficient, because the evaluation of blg x requires normalization, which requires extensive searching and left shifting. Similarly, bxp w requires denormalization. When w is as negative as blg x can be, then extensive right shifting is also required. Close analysis shows that if the blg x terms in (231) and (247) are replaced (in some algebraically appropriate way) with something more like $blg(1+x) = bld\ x \equiv BLD\ x$, then the normalization of $1+x$ requires no left shifting. Hence, the corresponding denormalization requires only comparatively trivial shifting in the subsequent interpolation calculation. Thus a double economy can be realized. Major progress toward enhanced efficiency is provided by elementary transformations and alternative partitioning of the argument. Four important examples are described hereinafter.

High Order Decrement (HOD). The first way to replace the blg x term with something more efficient is also the simplest. This method is based on the elementary identity $u+hx \equiv u'+h(1+x)$ where $u'=u-h$. Thus the substitution of u' and $1+x$ for u and x, respectively, in the interpolation equations allows the direct use of $blg(1+x) \equiv BLD\ x$ which needs no normalization of x. It has as its special case $u=0$ (rather than $x=0$). This method yields one bit less precision than the original NDN method.

Low Order Complement (LOC). The second efficient method is almost as simple. This method is based on the elementary identity $u+hx \equiv u''-h(2-x) = u''-h(1+1-x) = u''-h(1+e,ovs/x/$ ) where $u''=u+2h$ and $\bar{x}\equiv 1-x$. It has special cases $u''=1$ and $u''=1+h$ as well as $x=0$. This method also yields one bit less precision than the original NDN method.

Half And Half (HAH)(½HOD+½LOC). This third efficient method is sometimes most important. It uses a combination of both preceding methods though in slightly modified form. There is $u+hx=u+h\frac{1}{2}(1+v)$ for $\frac{1}{2}\leq x<1$ and $u+hx=u'-h\frac{1}{2}(1+\bar{v})$ for $0<x<\frac{1}{2}$ with $u'=u+h$ and $v\equiv\{2x\}$ where $\{z\}$ is the fraction portion of z. For $x=0$ there is $u+hx=u$. This method requires an added initial single bit place of shift and an added initial single bit test beyond that required for either of the preceding two methods. The precision of the original NDN method is retained together with almost all the efficiency of the best of the preceding two methods in that both of the additional operations can be combined at minimal cost.

High-Low Decrement (HLD). Modified error statistics and fine-tuned efficiency are but two of the many reasons for modifying the foregoing methods, especially by scaling, perturbing, and rounding the several variables in each decomposition. This may entail shifted placement or biased construction of the look-up tables. Look-up table values of an incremented or decremented variable may be retrieved more efficiently when accessed as a function of the unmodified variable. For example, a High-Low Decrement (HLD) method can be based on $u+hx=u'+h(1+v')+h^2 \approx u'+h(1+v')$ with $u'=u-h$ and $v'=v-h$. Actual generation of the primed variables is not required if the BLDT1 and BLDT2 functions of the primed variables can be indexed as functions of the unprimed variables. If the $h^2$ term is discarded in the interest of maximum efficiency then much of its proper effect can be reinstated by precomputed perturbation of Q1.

Efficient BXD2 and BLD2 with HOD

Efficient BLD2 with HOD. For $u+hx \equiv u'+h(1+x)$ with $u'=u-h$, there is $bld(u+hx) \equiv bld(u'+h(1+x)) \approx bld\ u'+h\ q(1+x)/(1+u')) = bld\ u'+h\ bxp(Q-bld(1+u')+blg(1+x)) = bld\ u'+h\ bxp(Q-bld\ u'+bld\ x)$. The expression $h\ bxp(Q-bld\ u'+bld\ x)$ requires no normalization of x and never more than a single bit place of denormalizing shift, either left or right, though a single bit of precision will be lost whenever that shift is to the left.

The evaluation must proceed somewhat differently in the special case when $u=0$. The interpolation expression now takes the simpler form $h\ bxp(Q-bld(-h)+bld\ x)=h\ bxp(Q'+bld\ x)$ where $Q'=Q-bld(-h)$. Once this expression is evaluated it can be added to the precomputed 2n-bit wide unsigned fraction portion of the (negative) value $bld(-h)$. This addition must generate a carry-out from this 2n-bit addition for every value of x including $x=0$. This carry-out is $+1$ which must be added to $-1$ that is the integer portion of $bld(-h)$. This integer addition need not be explicit, for if the carry always occurs then the sum of these two integers is always zero as required. The precomputed n-bit value $Q1' \approx Q'$ may be incremented by h and/or the fractional part of $bld(-h)$ may be incremented by $h^2$ as necessary to ensure that, for a given value of n, this carry always occurs.

Efficient BXD2 with HOD. For $u+hx \equiv u'+h(1+x)$ with $u'=u-h$, there is $bxd(u+hx) \equiv bxd(u'+h(1+x)) \approx bxd\ u'+h(1+x)q^{-1}\ bxp\ u'=bxd\ u'+h\ bxp(u'-Q+blg(1+x))=bxd\ u'+h\ bxp(u-Q'+bld\ x)$ where $Q'=Q+h$. The expression $h\ bxp(u-Q'+bld\ x)$ requires no normalization of x and never more than a single bit place of denormalizing shift, either left or right, though a single bit of precision will be lost whenever that shift is to the left. The decrement to the register containing u can be postponed until after this calculation as the compensating $Q'$ can be precomputed.

The evaluation must proceed but slightly differently in the special case when $u=0$. For $u'=-h$ the integer parts of bld u' and bxd u' are both $-1$, whereas the integer parts of both are 0 when $u+0$. These $-1$ values need not be stored for look-up, provided that whenever $u'=-h$ the interpolation correction is always large enough to generate a high order carry (which is considered to be added to the −1). The integer portion of the final result then always remains 0 as required. The interpolation expression now takes the simpler form h bxp(bld x−Q″) where Q″=Q+h−bxd(−h). Once this expression is evaluated it can be added to the precomputed 2n-bit wide unsigned fraction portion of the (negative) value bxd(−h). This addition must generate a carry-out from this 2n-bit addition for every value of x including x=0. This carry is +1 which must be added to the −1 that is the integer part of bxd(−h). This integer addition need not be explicit, for if the carry always occurs then the sum of these two integers is always zero as required. The precomputed n-bit value Q1″≃Q″ may be incremented by h and/or the fractional part of bxd(−h) may be incremented by h² as necessary to ensure that, for a given value of n, this carry always occurs.

HOD Numerical Examples. Table 15 is an example 32-bit evaluation of the function value BLD(0.85B4,0017) using the high-order-decrement (HOD) method with 16-bit table lookup indices. This example shows clearly both the effectiveness and the efficiency of using the HOD method for first order interpolation of BLD look-up table values. Eight significant hexadecimal digits (equivalent to almost ten decimal digits) of the binary diff-logarithm function BLD2 are generated. No normalizing shifting is required and never more than a single bit place of denormalizing shifting is required. A single bit of significance is lost whenever that shift is to the left.

Table 16 is an example 32-bit evaluation of the function value BXD(0.9B32,0019) using the HOD method with 16-bit table lookup indices. This example shows the equal effectiveness and efficiency of using the same HOD method of first order interpolation of BXD look-up table values. Eight significant hexadecimal digits of the inverse functional transformation BXD2 are generated. Here again no normalizing shifting is required and never more than a single bit place of denormalizing shifting is required. A single bit of significance is lost when that shift is to the left.

Table 17 is an example 32-bit evaluation of the function value BLD(0.0000,85B4) using the HOD method with 16-bit table lookup indices. This example demonstrates proper handling of the special case of the HOD method as it applies to BLD2 generation. Special handling of this case often allows use of the rounded value of BLDT1(−h) for slightly improved precision.

Table 18 is an example 32-bit evaluation of the function value BXD(0.0000, C0E5) using the HOD method with 16-bit table lookup indices. This example demonstrates proper handling of the special case of the HOD method as it applies to BXD2 generation.

Thus this HOD method is extremely efficient in that hardly any data shifting is required either in the BLD2 or the BXD2 generator. Even the special case u=0 is simple to detect and to treat properly for each generator. The look-up table costs of these particular examples may not fit the economics of some applications, as they imply the use of four look-up tables of 64k double-byte entries per look-up table for a total of one half Mbyte of look-up tables. Yet the alternative of direct look-up would instead call for look-up tables 64k times larger which corresponds to more than 34 Gigabytes.

TABLE 15

```
                    u  + hx
Calculate BLD(.85B4, 0017):
       <-h>/        <BLD>
       .85B3        .0021, ; BLD(x)
        /           +.875D, ; + Q1
<BLD>──→           −.9B31, ; −BLD(u−h)
       (−1)  +.EC4D,
                    <BXD>
       (−1)    .E568, ; BXD(.EC4D,)
       (−1)   1.E568, ; prefix 1
       (0)     .F2B4, ; de-normalization is a left shift of
                  |   ; −1 bit place (i.e., 1 bit right shift})
              .0000, .F2B4 ; scale by h (i.e., word align)
       +.9B31, .0D64 ; +BLD(.85B3, 0000)

.9B32, 0018 = Calculated Value
BLD(.85B4, 0017) = .9B32, 0018, F760 (Check Value)
```

TABLE 16

```
                    u  +hx
Calculate BXD(.9B32, 0019):
       <-h>/        <BLD>
       .9B31,       .0024, ; BLD(x)
                   −.876D, ; −Q1
          ──→      +.9B31, ; +(u−h)
                    0.13F8,
                  /  <BXD>
       (0)    .0E38, ; BXD(.13F8,)
       (0)   1.0E38, ; prefix 1
       (0)   1.0E38 ; de-normalization
                  |    is a 0-bit left shift
              .0001, 0E38 ; scale by h (i.e., word align)
<BXD>──→     +.85B2, F1DD ; + BXD(.9B31, 0000)

.85B3, 0015 = Calculated Value
BXD(.9B32, 0019) = .85B4, 0017, 0918 (Check Value)
```

TABLE 17

```
                    n  + hx
Calculate BLD(.0000, 85B4):
       <-h>/         <BLD>
       (−1)+.FFFF    .9B32, ; BLD(x)
        /           +.875D, ; + Q1
<BLD>──→−(−1+.FFFF,) ; −BLD(u−h), rounded
                    1.2290,
                  /  <BXD>
       (1)   .191D, ; BXD(.2291,)
                |
       (1)  1.191D, ; prefix 1
       (0)  2.22dA, ; (de-normalization is
                |    a 1-bit left shift)
              .0002, 323A ; scale by h (i.e., word align)
       −1+.FFFE, 8EAB ; +BLD(−1+.FFFF, 0000)

.0000, C0E5 = Calculated Value
BLD(.0000, 85B4) = .0000, C0E4, 5E7D (Check Value)
```

TABLE 18

```
                    u + hx
Calculate BXD(.0000, C0E5):
      <-h>/      <BLD>
    -1+.FFFF,    .CF6B, ; BLD(x)
              -.875D, ; - Q1
         ┌→  -1+.FFFF, ; +(u-h)
         │   ─────────
         │   0.480D,
         │  / <BXD>
         │  (0) .3725, ; BXD(.480D,)
         │  (0) 1.3725, ; prefix 1
         │  (0) 1.3725 ; (de-normalization)
         │    |  is a 0-bit shift)
         │  .0001, 3725 ; scale by h (i.e., word align)
<BXD>────→ -1+.FFFF, 4E8E ; +BXD(-1+.FFFF, 0000)
            ─────────
            .0000, 85B3 = Calculated Value
BXD(.0000, C0E5) = .0000, 85B4, 6FF3 (Check Value)
```

What is claimed is:

1. In an apparatus for generating an output signal which approximates a designated differentiable function of an input argument signal, said apparatus including:
   means coupled to receive said input argument signal for partitioning between a most significant dominant portion and a next most significant adjunct portion;
   means comprising random access memory coupled to receive said dominant portion for mapping into a primary function signal in accordance with a primary map comprising said designated function of said dominant portion;
   means coupled to receive said dominant portion and said adjunct portion for mapping into a correction signal in accordance with a correction map; and
   means coupled to receive said primary function signal and said correction signal for adding to produce said output signal;
   an improvement wherein:
   said primary map comprises said designated function of a primary combination comprising said dominant portion and a predetermined bias related to a maximum magnitude of said adjunct portion.

2. The improvement as set forth in claim 1 wherein said correction map comprises a logarithmic map.

3. The improvement as set forth in claim 1 wherein said correction map comprises an antilogarithmic map.

4. The improvement as set forth in claim 1 further comprising:
   means coupled to receive said dominant portion for mapping into a secondary function signal in accordance with a secondary map comprising a logarithm of a magnitude of a signal comprising a first derivative of said designated function of said primary combination.

5. The improvement as set forth in claim 1 further comprising:
   means coupled to receive said adjunct portion for mapping into an adjunct function signal in accordance with an adjunct map comprising a logarithmic function of a magnitude of an adjunct combination comprising said adjunct portion and a second predetermined bias which is related to a maximum magnitude of a first derivative of said designated function of said input argument signal.

6. The improvement as set forth in claim 5 further comprising:
   means coupled to receive a signal comprising a logarithm for mapping into said correction signal in accordance with a correction map comprising an antilogarithm corresponding to said logarithm.

7. The improvement as set forth in claim 6 further comprising:
   means comprising combinatorial logic coupled to receive said input argument signal for attaching a sign to said correction signal.

8. Apparatus for generating an output signal which approximates a designated differentiable function of an input argument signal, comprising:
   means coupled to receive said input argument signal for partitioning between a most significant dominant portion and a next most significant adjunct portion;
   means comprising random access memory coupled to receive said dominant portion for mapping into a primary function signal in accordance with a primary map comprising said designated function of a primary combination comprising said dominant portion and a negative of a scaled predetermined bias, wherein said predetermined bias is selected to restrict an adjunct function signal and said scaling is related to a maximum magnitude of said adjunct portion;
   means coupled to receive said dominant portion for mapping into a secondary function signal in accordance with a secondary map comprising a logarithmic function of a magnitude of a signal comprising a first derivative of said designated function of said primary combination;
   means coupled to receive said adjunct portion for mapping into said adjunct function signal in accordance with an adjunct map comprising said logarithmic function of a magnitude of an adjunct combination comprising said predetermined bias and said adjunct portion;
   means coupled to receive said adjunct function signal and said secondary function signal for adding to produce a secondary sum;
   means coupled to receive said secondary sum for mapping into a primary correction signal in accordance with a primary correction map comprising an exponential function, corresponding to said logarithmic function, of said secondary sum; and
   means coupled to receive said primary function signal and said primary correction signal for adding to produce said output signal.

9. The apparatus as set forth in claim 124 wherein said means mapping said dominant portion into said secondary function signal comprises means for mapping said secondary function signal into a constant signal.

10. The apparatus as set forth in claim 8 wherein said means mapping said dominant portion into said secondary function signal comprises means for combining a portion of said dominant portion and a constant bias to produce said secondary function signal.

11. The apparatus as set forth in claim 8 wherein said means mapping said dominant portion into said secondary function signal comprises means for combining a portion of said primary function signal and a constant bias to provide said secondary function signal.

12. The apparatus as set forth in claim 8 wherein said means mapping said dominant portion into said secondary function signal comprises means for combining a portion of said dominant portion and a portion of said primary function signal to provide said secondary function signal.

13. The apparatus as set forth in claim 8 wherein said means mapping said dominant portion into said secondary function signal comprises means for combining a constant signal, a portion of said dominant portion and a portion of said primary function signal to provide said secondary function signal.

14. The apparatus as set forth in claim 8 wherein said means producing output signal comprises:
  means comprising combinatorial logic coupled to receive said dominant portion and said adjunct combination for attaching a sign to said correction signal in accordance with a sign map comprising a sign of a product of said first derivative of said designated function of said primary combination and said adjunct combination to produce a signed primary correction signal; and
  means coupled to receive said signed primary correction signal and said primary function signal for adding to produce said output signal.

15. The apparatus as set forth in claim 8 wherein said mapping means producing said primary function signal comprises:
  random access memory coupled to receive said dominant portion as an addressing index, said random access memory containing selected values of said primary function signal.

16. The apparatus as set forth in claim 8 wherein said means producing said secondary function signal comprises:
  random access memory coupled to receive said dominant portion as an addressing index, said random access memory containing selected values of said secondary function signal.

17. The apparatus as set forth in claim 8 wherein said means for producing said adjunct function signal comprises:
  random access memory coupled to receive said adjunct portion as an addressing index, said random access memory containing selected values of said adjunct function signal.

18. The apparatus as set forth in claim 8 wherein said means producing said correction signal comprises:
  random access memory coupled to receive said secondary combination as an addressing index signal, said random access memory containing selected signals of said correction function of possible ones of said secondary combination.

19. The apparatus as set forth in claim 8 further comprising:
  means coupled to receive said output signal for restricting a least significant portion thereof to produce a restricted output signal.

20. The apparatus as set forth in claim 8 further comprising:
  means coupled to receive said primary function signal for detecting an erroneous primary function signal;
  means coupled to receive said dominant portion for biasing to produce a biased dominant portion;
  means coupled to receive said biased dominant portion for generating an approximate primary function signal corresponding to said primary combination, using primary function signals, exclusive of said erroneous primary function signal, from said primary map means; and
  means coupled to receive said approximate primary function signal for replacing said erroneous primary function signal by said approximate primary function signal.

21. The apparatus as set forth in claim 8 wherein said designated function is twice differentiable and said means producing said secondary sum comprises:
  means coupled to receive said secondary function signal for extracting a most significant portion to produce a primitive secondary function signal;
  means coupled to receive said adjunct function signal for extracting a most significant portion to produce a primitive adjunct function signal;
  means coupled to receive said dominant portion for mapping into a primitive tertiary function signal in accordance with a primitive tertiary function map comprising said logarithmic function of a magnitude of a signal comprising one half of a second derivative of said designated function of said primary combination;
  means coupled to receive said primitive tertiary function signal, said primitive secondary function signal and said primitive adjunct function signal for combining with a second bias related to said logarithmic function to produce a tertiary combination;
  means coupled to receive said tertiary portion for mapping into a secondary correction signal in accordance with a secondary map comprising an exponential function, corresponding to said logarithmic function, of said tertiary combination; and
  means coupled to receive said adjunct function signal, said secondary function signal and said secondary correction signal for combining to produce said secondary sum.

22. The apparatus as set forth in claim 21 wherein said means producing said secondary correction signal comprises:
  means coupled to receive said dominant portion and said adjunct portion for attaching a sign to said secondary correction signal in accordance with a sign map comprising a sign of a product of a factor related to said logarithmic function, said adjunct combination and a ratio of said second derivative of said designated function of said primary combination divided by said first derivative of said designated function of said primary combination, to produce a signed secondary correction signal; and
  means coupled to receive said adjunct function signal, said secondary function signal and said signed secondary correction signal for combining to produce said secondary sum.

23. Apparatus for generating an output signal g which approximates a designated differentiable function $f$ of an input argument signal x in accordance with an approximation $g(x) \approx f(x)$ wherein $$g(x) = f(u^* - \xi) + axp(alg\ f'(u^* - \xi) + alg(\xi + v^*))$$

wherein, regarding notation: $axp(y) \equiv a^y$ and $alg(y) \equiv \log_a(y)$ wherein $a > 0$, and wherein $x \approx u^* + v^*$, $|v^*| << |u^*|_{max}$, said designated function $f$ has generally variable slope $f'$ which is restricted to ensure that $f'(u^* - \xi)$ is positively displaced from zero to restrict a corresponding value alg $f'(u^* - \xi)$ and predetermined bias $\xi$ is restricted to ensure that $\xi + v^*$ is positively displaced from zero to restrict a corresponding value $alg(\xi + v^*)$, comprising:
  means coupled to receive said input argument signal x for partitioning between a most significant dominant portion $u^*$ and a next most significant adjunct portion $v^*$;

means comprising random access memory coupled to receive said dominant portion u* for mapping into a primary function signal $f^*$ in accordance with a primary map $f^* = f(u^* - \xi)$;

means coupled to receive said dominant portion u* for mapping into a secondary function signal c in accordance with a secondary map $c = alg\, f'(u^* - \xi)$;

means coupled to receive said adjunct portion v* for mapping into an adjunct function signal d in accordance with an adjunct map $d = alg(\xi + v^*)$;

means coupled to receive said secondary function signal c and said adjunct function signal d to produce a first combination signal $w = c + d$;

means coupled to receive said first combination signal w for mapping into a correction signal y in accordance with a correction map $y = axp(w)$; and means coupled to receive said primary function signal $f^*$ and said correction signal y for combining to produce said output signal g as a second combination $g = f^* + y$.

24. The apparatus as set forth in claim 23 wherein:
said primary map further comprises a negative of a predetermined bias P; and
said correction map further comprises said predetermined bias P;
whereby said correction signal y is displaced without altering said output signal g.

25. Apparatus for generating an output signal g which approximates a designated differentiable function f of an input argument signal x in accordance with an approximation $g(x) \approx f(x)$ wherein $$g(x) = f(u^* - \xi) + K\xi + Kv^* + axp\{alg(f'(u^* - \xi) - K) + alg(\xi + v^*)\}$$

wherein, regarding notation: $axp(y) \equiv a^y$ and $alg(y) \equiv \log_a(y)$ wherein $a > 0$, and wherein $x \approx u^* + v^*$, $|v^*| << |u^*|_{max}$, wherein said designated function f is characterized by slope f' which is restricted to ensure that $f'(u^* - \xi) - K$ is positively displaced from zero to restrict a corresponding value $alg(f'(u^* - \xi) - K)$, K is selected for simultaneous scaling of v* and biasing of $f'(u^* - \xi)$, and predetermined bias $\xi$ is restricted to ensure that $\xi + v^*$ is positively displaced from zero to restrict a corresponding value $alg(\xi + v^*)$, comprising:

means coupled to receive said input argument signal x for partitioning between a most significant dominant portion u* and a next most significant adjunct portion v*;

means comprising random access memory coupled to receive said dominant portion u* for mapping into a primary function signal $f^*$ in accordance with a primary map $f^* = f(u^* - K\xi)$;

means coupled to receive said dominant portion u* for mapping into a secondary function signal c in accordance with a secondary map $c = alg(f'(u^* - \xi) - K)$;

means coupled to receive said adjunct portion v* for mapping into an adjunct function signal d in accordance with an adjunct map $d = alg(\xi + v^*)$;

means coupled to receive said secondary function signal c and said adjunct function signal d to produce a first combination signal $w = c + d$;

means coupled to receive said first combination signal w for mapping into a principal correction signal y in accordance with a correction map $y = axp(w)$;

means coupled to receive said adjunct portion v* for scaling to produce an adjunct correction $Kv^*$; and means coupled to receive said primary function signal $f^*$, said correction signal y and said adjunct correction $Kv^*$ for combining to produce said output signal g as a second combination $g = f^* + y + Kv^*$.

26. Apparatus for generating an output signal g which approximates a designated differentiable function f of an input argument signal x in accordance with an approximation $g(x) \approx f(x)$ wherein $$g(x) = f(u^* - \xi) + K\xi + Kv^* + s \cdot axp\,(alg|\xi + v^*| + alg|f'(u^* - \xi) - K|)$$

wherein, regarding notation: $axp(y) \equiv a^y$ and $alg(y) \equiv \log_a(y)$ wherein $a > 0$, and wherein $x \approx u^* + v^*$, $|v^*| << |u^*|_{max}$, wherein said designated function f is characterized by slope f' which is restricted to ensure that $|f'(u^* - \xi) - K|$ is positively displaced from zero to restrict a corresponding value $alg|f'(u^* - \xi) - K|$, wherein K is selected for simultaneous scaling of v* and biasing of $f'(u^* - \xi)$, predetermined bias $\xi$ is restricted to ensure that $|\xi + v^*|$ is positively displaced from zero to restrict a corresponding value $alg|\xi + v^*|$, and $s = \text{sign}\{(\xi + v^*)(f'(u^* - \xi) - K)\}$, comprising:

means coupled to receive said input argument signal x for partitioning between a most significant dominant portion u* and a next most significant adjunct portion v*;

means comprising random access memory coupled to receive said dominant portion u* for mapping into a primary function signal $f^*$ in accordance with a primary map $f^* = f(u^* - \xi) + K\xi$;

means coupled to receive said dominant portion u* for mapping into a secondary function signal c in accordance with a secondary map $c = alg|f'(u^* - \xi) - K|$;

means coupled to receive said adjunct portion v* for mapping into an adjunct function signal d in accordance with an adjunct map $d = alg|\xi + v^*|$;

means coupled to receive said secondary function signal c and said adjunct function signal d for combining to produce a first combination signal $w = c + d$;

means coupled to receive said first combination signal w for mapping into an unsigned principal correction signal y in accordance with a correction map $y = axp(w)$;

means comprising combinatorial logic coupled to receive said dominant portion u* and said adjunct portion v* for producing a sign signal s in accordance with a relation $s = \text{sign}\{(\xi + v^*)(f'(u^* - \xi) - K)\}$;

means coupled to receive said sign signal s and said unsigned principal correction signal y for attaching a sign to produce a signed principal correction signal sy;

means coupled to receive said adjunct portion v* for scaling to produce an adjunct correction signal $Kv^*$; and means coupled to receive said primary function signal $f^*$, said signed principal correction signal sy and said adjunct correction $Kv^*$ for combining to produce said output signal g as a second combination $g = f^* + sy + Kv^*$.

27. Apparatus for generating a radix-$r_2$ output signal g which approximates a designated differentiable function $f$ of a radix-$r_1$ input argument signal x in accordance with an approximation $g(x) \approx f(x)$ wherein $$g(x) = f(u^* - h\xi) + h \, axp(alg(\xi + v^*) + alg \, f'(u^* - h\xi))$$

wherein, regarding notation: $axp(y) \equiv a^y$ and $alg(y) \equiv log_a(y)$ wherein $a > 0$, and wherein $x \approx u^* + hv^*$, $h = r_1^{-n}$ wherein n is a positive integer, $|h| < < 1$, $|hv^*| < < |u^*|_{max}$, wherein said designated function $f$ is characterized by slope $f'$ which is restricted to ensure that $f'(u^* - h\xi)$ is positively displaced from zero to restrict a corresponding value $alg(f'(u^* - \xi))$, and predetermined bias $\xi$ is restricted to ensure that $\xi + v^*$ is positively displaced from zero to restrict a corresponding value $alg(\xi + v^*)$, comprising:

means coupled to receive said input argument signal x for partitioning between a most significant dominant portion u* and an unscaled next most significant adjunct portion v* which is consistent with a relation $x = u^* + hv^*$;

means comprising random access memory coupled to receive said dominant portion u* for mapping into a radix-$r_2$ primary function signal $f^*$ in accordance with a primary map $f^* = f(u^* - h\xi)$;

means coupled to receive said dominant portion u* for mapping into a secondary function signal c in accordance with a secondary map $c = alg \, f'(u^* - h\xi)$;

means coupled to receive said adjunct portion v* for mapping into an adjunct function signal d in accordance with an adjunct map $d = alg(\xi + v^*)$;

means coupled to receive said secondary function signal c and said adjunct function signal d for combining to produce a first combination signal $w = c + d$;

means coupled to receive said first combination signal w for mapping into an unscaled correction signal y in accordance with an unscaled correction map $y = axp(w)$;

means coupled to receive said unscaled correction signal y for scaling to produce a scaled radix-$r_2$ correction signal hy; and means coupled to receive said primary function signal $f^*$ and said scaled correction signal hy for combining to produce said output signal g as a radix-$r_2$ second combination $g = f^* + hy$.

28. Apparatus for generating a radix-$r_2$ output signal g which approximates a designated differentiable function $f$ of a radix-$r_1$ input argument signal x in accordance with an approximation $g(x) \approx f(x)$ wherein $$g(x) = f(u^* - h\xi) + hK\xi + hKv^* + haxp(alg(\xi + v^*) + alg(f'(u^* - h\xi) - K))$$

wherein, regarding notation: $axp(y) \equiv a^y$ and $alg(y) \equiv log_a(y)$ wherein $a > 0$, and wherein $x \approx u^* + hv^*$, $h = r_1^{-n}$ wherein n is a positive integer, $|h| < < 1$, $|hv^*| < < |u^*|_{max}$, wherein said designated function $f$ is characterized by slope $f'$ which is restricted to ensure that $f'(u^* - h\xi) - K$ is positively displaced from zero to restrict a corresponding value $alg(f'(u^* - h\xi) - K)$, K is selected for simultaneous scaling of hv* and biasing of $f'(u^* - h\xi)$, and predetermined bias $\xi$ is restricted to ensure that $\xi + v^*$ is positively displaced from zero to restrict a corresponding value $alg(\xi + v^*)$, comprising:

means coupled to receive said input argument signal x for partitioning between a most significant dominant portion u* and a next most significant adjunct portion v* which is consistent with a relation $x = u^* + hv^*$;

means comprising random access memory coupled to receive said dominant portion u* for mapping into a radix-$r_2$ primary function signal $f^*$ in accordance with a primary map $f^* = f(u^* - h\xi) + hK\xi$;

means coupled to receive said dominant portion u* for mapping into a secondary function signal c in accordance with $c = alg(f'(u^* - h\xi) - K)$ as a secondary map;

means coupled to receive said adjunct portion v* for mapping into an adjunct function signal d in accordance with an adjunct map $d = alg(\xi + v^*)$;

means coupled to receive said secondary function signal c and said adjunct function signal d for combining to produce a first combination signal $w = c + d$;

means coupled to receive said first combination signal w for mapping into an unscaled principal correction signal y in accordance with an unscaled correction map $y = axp(w)$;

means coupled to receive said unscaled correction signal y for scaling to produce a scaled radix-$r_2$ correction signal hy;

means coupled to receive said adjunct portion v* for scaling to produce a radix-$r_2$ adjunct correction signal hKv*; and means coupled to receive primary function signal $f^*$, said scaled principal correction signal hy and said adjunct correction signal hKv* for combining to produce said output signal g as a second combination $g = f^* + hy + hKv^*$.

29. Apparatus for generating a radix-$r_2$ output signal g which approximates a designated differentiable function $f$ of a radix-$r_1$ input argument signal x in accordance with an approximation $g(x) \approx f(x)$ wherein:

$$g(x) = f(u^* - h\xi) + hK\xi + hKv^* + hs \cdot axp(alg|\xi + v^*| + alg|f'(u^* - h\xi) - K|)$$

wherein, regarding notation: $axp(y) \equiv a^y$ and $alg(y) \equiv log_a(y)$ wherein $a > 0$, and wherein $x \approx u^* + hv^*$, $h = r_1^{-n}$ wherein n is a positive integer, $|h| < < 1$, $|hv^*| < < |u^*|_{max}$, wherein said designated function $f$ is characterized by slope $f'$ which is restricted to ensure that $|f'(u^* - h\xi) - K|$ is positively displaced from zero to restrict a corresponding value $alg|f'(u^* - h\xi) - K|$, $s = sign\{(\xi + v^*)(f'(u^* - h\xi) - K)\}$, K is selected for simultaneous scaling of v* and biasing of $f'(u^* - h\xi)$, and predetermined bias $\xi$ is restricted to ensure that $|\xi + v^*|$ is positively displaced from zero to restrict a corresponding value $alg|\xi + v^*|$, comprising:

means coupled to receive said input argument signal x for partitioning between a most significant dominant portion u* and a next most significant adjunct portion v* which is consistent with a relation $x = u^* + hv^*$;

means comprising random access memory coupled to receive said dominant portion u* for mapping into a radix-$r_2$ primary function signal $f^*$ in accordance with a primary map $f^* = f(u^* - h\xi) + hK\xi$;

means coupled to receive said dominant portion u* for mapping into a secondary function signal c in accordance with a secondary map $c = alg|f'(u^* - h\xi) - K|$;

means coupled to receive said adjunct portion v* for mapping into an adjunct function signal d in accordance with an adjunct map $d = alg|\xi + v^*|$;

means coupled to receive said secondary function signal c and said adjunct function signal d for combining to produce a first combination signal $w = c + d$;

means coupled to receive said first combination signal w for mapping into an unscaled unsigned principal correction signal y in accordance with an unscaled correction map $y = axp(w)$;

means comprising combinatorial logic coupled to receive said dominant portion u* and said adjunct portion v* for mapping into a sign signal s in accordance with a sign map $s = sign\{\xi + v^*)f'(u^* - h\xi)\}$;

means coupled to receive said sign signal s and said unscaled unsigned principal correction signal y for scaling to produce a scaled signed radix-$r_2$ principal correction signal hsy;

means coupled to receive said adjunct portion v* for scaling to produce a scaled radix-$r_2$ adjunct correction hKv*; and means coupled to receive said primary function signal f*, said scaled signed principal correction signal hsy and said scaled adjunct correction hKv* for combining to produce said output signal g as a second combination $g = f^* + hsy + hKv^*$.

30. The apparatus as set forth in claim 29 wherein said radix $r_2$ equals radix $r_1$.

31. The apparatus as set forth in claim 29 wherein said value a and said radix $r_2$ equal said radix $r_1$.

32. The apparatus as set forth in claim 29 wherein said value a, said radix $r_1$ and said radix $r_2$ equal two.

33. Apparatus for generating an output signal which approximates a designated differentiable function of an input argument signal, comprising:

means coupled to receive said input argument signal for partitioning between a most significant dominant portion and a next most significant adjunct portion;

means comprising random access memory coupled to receive said dominant portion for mapping into said output primary function signal in accordance with a primary map comprising said designated function of said dominant portion;

means coupled to receive said dominant portion for extracting a most significant primary dominant portion;

means coupled to receive said primary dominant portion and said adjunct portion for arranging into a hybrid signal as a hybrid arrangement;

means coupled to receive said hybrid signal for mapping into a hybrid correction signal in accordance with a hybrid correction map comprising selected hybrid correction function signals of a hybrid correction function for said designated function, said hybrid correction function signal comprising a product of said adjunct portion and a first derivative of said designated function of said primary dominant portion, each said selected hybrid correction function signal corresponding to each possible ones of said hybrid signals as an input argument, to produce a hybrid correction signal as an interpolation correction signal; and means coupled to receive said interpolation correction signal and said primary function signal for combining to produce said output signal.

34. The apparatus as set forth in claim 33 wherein said primary map comprises a negative of a predetermined bias which is related to a maximum magnitude of said first derivative of said designated function of said dominant portion; and said hybrid correction map further comprises said predetermined bias for biasing said hybrid correction signal.

35. The apparatus as set forth in claim 33 wherein said designated function is twice differentiable, further comprising:

means coupled to receive said primary dominant portion for extracting a most significant primitive primary dominant portion;

means coupled to receive a next most significant secondary dominant portion of said dominant portion for extracting a most significant primitive secondary dominant portion;

means coupled to receive said adjunct portion for extracting a most significant primitive adjunct portion;

means coupled to receive said primitive primary dominant portion, said primitive secondary dominant portion and said primitive adjunct portion for arranging into a chimeric signal as a chimeric arrangement;

means coupled to receive said chimeric signal for mapping into a chimeric correction signal in accordance with a chimeric correction map comprising selected signals of a chimeric correction function for said designated function, said chimeric correction function comprising a product of said primitive secondary dominant portion, said primitive adjunct portion and a second derivative of said designated function of said primitive primary dominant portion, each said selected chimeric correction function signals corresponding to each possible ones of said chimeric signals as an input argument; and means coupled to receive said chimeric correction signal and said hybrid correction signal for combining to generate said interpolation correction signal.

* * * * *